(12) United States Patent
Levy et al.

(10) Patent No.: US 10,994,475 B2
(45) Date of Patent: *May 4, 2021

(54) METHOD FOR SOLID FREEFORM FABRICATION

(71) Applicant: Stratasys Ltd., Rehovot (IL)

(72) Inventors: Avraham Levy, Petach-Tikva (IL); Diana Ravich, Natania (IL); Lior Zonder, Tel-Aviv (IL); Gil Shelef, Kibbutz Negba (IL); Cesar M. Manna, Rehovot (IL)

(73) Assignee: Stratasys Ltd., Rehovot (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/335,305

(22) PCT Filed: Sep. 20, 2017

(86) PCT No.: PCT/IB2017/055692
§ 371 (c)(1),
(2) Date: Mar. 21, 2019

(87) PCT Pub. No.: WO2018/055521
PCT Pub. Date: Mar. 29, 2018

(65) Prior Publication Data
US 2020/0016822 A1    Jan. 16, 2020

Related U.S. Application Data

(60) Provisional application No. 62/397,952, filed on Sep. 22, 2016.

(51) Int. Cl.
*B29C 41/22* (2006.01)
*B29C 41/46* (2006.01)
(Continued)

(52) U.S. Cl.
CPC .......... *B29C 64/118* (2017.08); *B29C 64/106* (2017.08); *B29C 64/112* (2017.08);
(Continued)

(58) Field of Classification Search
CPC ....... B29C 41/22; B29C 41/46; B29C 64/106; B29C 64/112; B29C 71/02; B29C 71/04; B29K 2033/12; B33Y 10/00; B33Y 70/00
(Continued)

(56) References Cited

U.S. PATENT DOCUMENTS 6,259,962 B1    10/2001    Gothait
6,569,373 B2    5/2003    Napadensky
(Continued)

FOREIGN PATENT DOCUMENTS

CN    1552017    12/2004
CN    103025506    4/2013
(Continued)

OTHER PUBLICATIONS

Ex Parte Quayle OA dated Aug. 12, 2019 From the US Patent and Trademark Office Re. U.S. Appl. No. 16/335,299. (11 pages).
(Continued)

*Primary Examiner* — Leo B Tentoni

(57) ABSTRACT

Methods of layerwise fabrication of a three-dimensional object, and objected obtained thereby are provided. The methods are effected by dispensing at least a first modeling formulation and a second modeling formulation to form a core region using both said first and said second modeling formulations, an inner envelope region at least partially surrounding said core region using said first modeling formulation but not said second modeling formulation, and an outer envelope region at least partially surrounding said inner envelope region using said second modeling formulations but not said first modeling formulation; and exposing
(Continued)

said layer to curing energy, thereby fabricating the object, The first and second modeling formulations are selected such they differ from one another, when hardened, by at least one of Heat Deflection Temperature (HDT), Izod Impact resistance, Tg and elastic modulus.

24 Claims, 14 Drawing Sheets
(9 of 14 Drawing Sheet(s) Filed in Color)

(51) Int. Cl.
| | |
|---|---|
| B29C 71/02 | (2006.01) |
| B29C 71/04 | (2006.01) |
| B29C 64/118 | (2017.01) |
| B33Y 10/00 | (2015.01) |
| B33Y 70/00 | (2020.01) |
| B33Y 80/00 | (2015.01) |
| B29C 64/112 | (2017.01) |
| B29C 64/106 | (2017.01) |
| B29K 33/00 | (2006.01) |
| B29K 105/00 | (2006.01) |

(52) U.S. Cl.
CPC ............... *B33Y 10/00* (2014.12); *B33Y 70/00* (2014.12); *B33Y 80/00* (2014.12); *B29K 2033/12* (2013.01); *B29K 2105/0002* (2013.01); *B29K 2995/0012* (2013.01); *B29K 2995/0077* (2013.01); *B29K 2995/0089* (2013.01)

(58) Field of Classification Search
USPC ..................... 264/236, 255, 308, 331.18, 494
See application file for complete search history.

(56) References Cited

U.S. PATENT DOCUMENTS

| | | | |
|---|---|---|---|
| 6,658,314 | B1 | 12/2003 | Gothait |
| 6,850,334 | B1 | 2/2005 | Gothait |
| 7,183,335 | B2 | 2/2007 | Napadensky |
| 7,209,797 | B2 | 4/2007 | Kritchman et al. |
| 7,225,045 | B2 | 5/2007 | Gothait et al. |
| 7,300,619 | B2 | 11/2007 | Napadensky et al. |
| 7,479,510 | B2 | 1/2009 | Napadensky et al. |
| 7,500,846 | B2 | 3/2009 | Eshed et al. |
| 7,962,237 | B2 | 6/2011 | Kritchman |
| 2010/0191360 | A1 | 7/2010 | Napadensky et al. |
| 2013/0040091 | A1 | 2/2013 | Dikovsky et al. |
| 2013/0073068 | A1 | 3/2013 | Napadensky |
| 2015/0210010 | A1 | 7/2015 | Napadensky |
| 2016/0114458 | A1* | 4/2016 | Bajaj ..................... B24B 37/26 51/298 |
| 2017/0260418 | A1* | 9/2017 | Wu ......................... B33Y 10/00 |
| 2019/0329488 | A1 | 10/2019 | Ravich et al. |
| 2020/0189179 | A1 | 6/2020 | Ravich et al. |

FOREIGN PATENT DOCUMENTS

| | | |
|---|---|---|
| CN | 104582939 | 4/2015 |
| JP | 2013-525152 | 6/2013 |
| JP | 2016-078437 | 5/2016 |
| JP | 2017-105154 | 6/2017 |
| WO | WO 2011/135496 | 11/2011 |
| WO | WO 2015/056230 | 4/2015 |
| WO | WO 2015/139095 | 9/2015 |
| WO | WO 2016/125170 | 8/2016 |
| WO | WO 2018/055521 | 3/2018 |
| WO | WO 2018/055522 | 3/2018 |

OTHER PUBLICATIONS

Grounds of Reasons of Rejection dated Sep. 23, 2019 From the Korean Intellectual Property Office Re. Application No. 10-2019-7011603 and Its Translation Into English. (5 Pages).
Notice of Reason for Rejection dated Mar. 3, 2020 From the Japan Patent Office Re. Application No. 2019-515878 and Its Translation Into English. (10 Pages).
Communication Relating to the Results of the Partial International Search dated Dec. 22, 2017 From the International Searching Authority Re. Application No. PCT/IB2017/055696. (12 Pages).
Grounds of Reasons for Rejection dated May 27, 2019 From the Korean Intellectual Property Office Re. Application No. 10-2019-7011603 and Its Translation Into English. (6 Pages).
International Preliminary Report on Patentability dated Apr. 4, 2019 From the International Bureau of WIPO Re. Application No. PCT/IB2017/055692. (8 Pages).
International Preliminary Report on Patentability dated Apr. 4, 2019 From the International Bureau of WIPO Re. Application No. PCT/IB2017/055696. (10 Pages).
International Search Report and the Written Opinion dated Feb. 15, 2018 From the International Searching Authority Re. Application No. PCT/IB2017/055696. (18 Pages).
International Search Report and the Written Opinion dated Dec. 21, 2017 From the International Searching Authority Re. Application No. PCT/IB2017/055692. (14 Pages).
Office Acton dated Jul. 15, 2019 From the Israel Patent Office Re. Application No. 265543 and Its Translation Into English. (4 Pages).
Communication Pursuant to Article 94(3) EPC dated Feb. 26, 2020 From the European Patent Office Re. Application No. 17784014.7. (3 Pages).
Notification of Office Action and Search Report dated Nov. 11, 2019 From the State Intellectual Property Office of the People's Republic of China Re. Application No. 201780072008.0 and Its Translation of Office Action Into English. (10 Pages).
Notice of Reason for Rejection dated Oct. 4, 2019 From the Japan Patent Office Re. Application No. 2019-515878 and Its Translation Into English. (9 Pages).
Communication Pursuant to Article 94(3) EPC dated Sep. 2, 2019 From the European Patent Office Re. Application No. 17784014.7. (5 Pages).
Notification of Office Action and Search Report dated Sep. 22, 2020 From the State Intellectual Property Office of the People's Republic of China Re. Application No. 201780072042.8. (8 Pages).
Office Action dated Sep. 29, 2020 From the Israel Patent Office Re. Application No. 272959 and Its Translation Into English. (5 Pages).
Translation dated Oct. 23, 2020 Notification of Office Action dated Sep. 22, 2020 From the State Intellectual Property Office of the People's Republic of China Re. Application No. 201780072042.8. (9 pages).
Communication Pursuant to Article 94(3) EPC dated Jan. 31, 2021 From the European Patent Office Re. Application No. 17784014.7. (3 pages).

\* cited by examiner

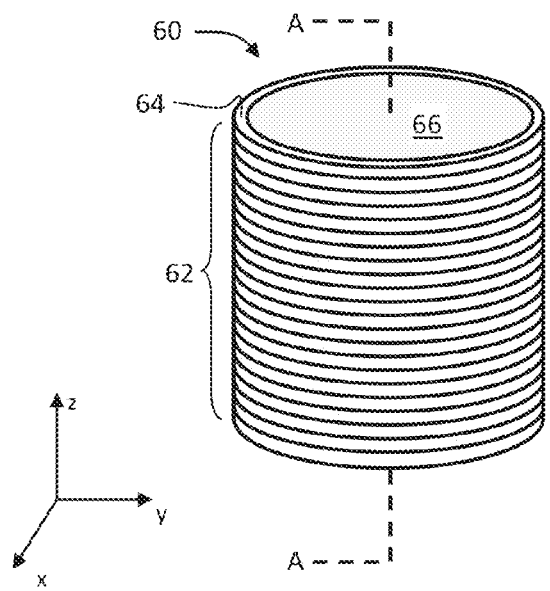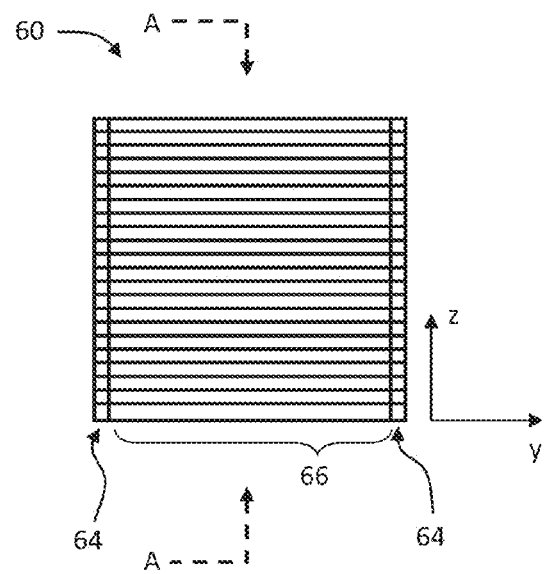
FIG. 9A　　　　　　　　　　FIG. 9B
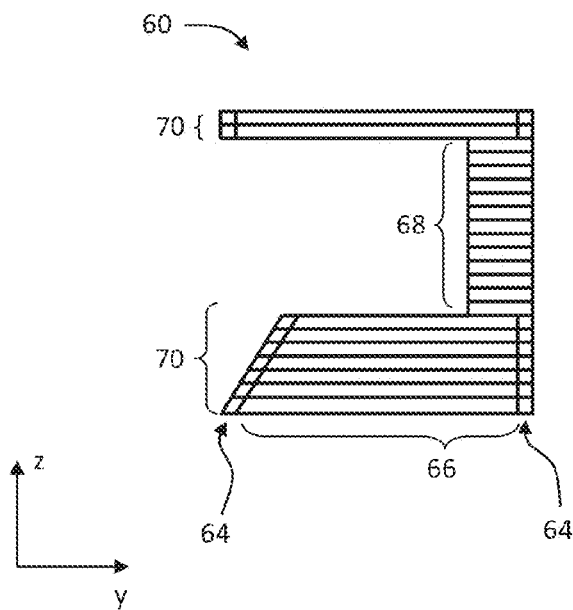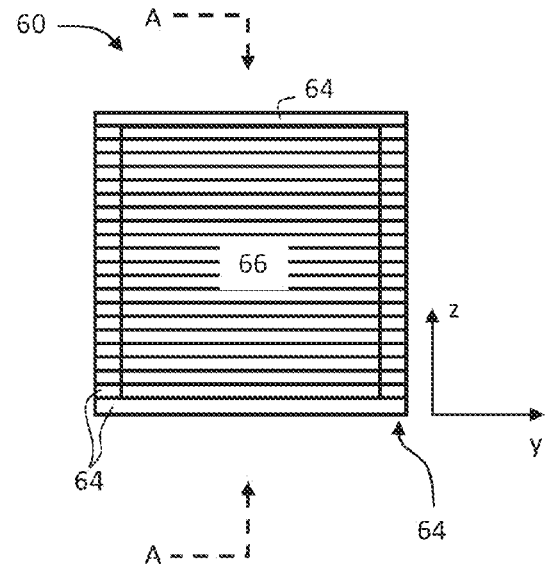
FIG. 9C　　　　　　　　　　FIG. 9D

METHOD FOR SOLID FREEFORM FABRICATION

RELATED APPLICATIONS

This application is a National Phase of PCT Patent Application No. PCT/IB2017/055692 having International filing date of Sep. 20, 2017, which claims the benefit of priority under 35 USC § 119(e) of U.S. Provisional Patent Application No. 62/397,952 filed on Sep. 22, 2016. The contents of the above applications are all incorporated by reference as if fully set forth herein in their entirety.

FIELD AND BACKGROUND OF THE INVENTION

The present invention, in some embodiments thereof, relates to Additive Manufacturing (AM) of an object, and, more particularly, but not exclusively, to methods and systems for additive manufacturing of a layered object.

Additive manufacturing is generally a process in which a three-dimensional (3D) object is manufactured utilizing a computer model of the objects. Such a process is used in various fields, such as design related fields for purposes of visualization, demonstration and mechanical prototyping, as well as for rapid manufacturing (RM).

The basic operation of any AM system consists of slicing a three-dimensional computer model into thin cross sections, translating the result into two-dimensional position data and feeding the data to control equipment which manufacture a three-dimensional structure in a layerwise manner.

Various AM technologies exist, amongst which are stereolithography, digital light processing (DLP), and three dimensional (3D) printing, 3D inkjet printing in particular. Such techniques are generally performed by layer by layer deposition and solidification of one or building materials, typically photopolymerizable (photocurable) materials.

Stereolithography, for example, is an additive manufacturing process which employs a liquid UV-curable building material and a UV laser. In such a process, for each dispensed layer of the building material, the laser beam traces a cross-section of the part pattern on the surface of the dispensed liquid building material. Exposure to the UV laser light cures and solidifies the pattern traced on the building material and joins it to the layer below. After being built, the formed parts are immersed in a chemical bath in order to be cleaned of excess building material and are subsequently cured in an ultraviolet oven.

In three-dimensional inkjet printing processes, for example, a building material is dispensed from a dispensing head having a set of nozzles to deposit layers on a supporting structure. Depending on the building material, the layers may then be cured or solidified using a suitable device.

Various three-dimensional inkjet printing techniques exist and are disclosed in, e.g., U.S. Pat. Nos. 6,259,962, 6,569,373, 6,658,314, 6,850,334, 7,183,335, 7,209,797, 7,225,045, 7,300,619, 7,479,510, 7,500,846, 7,962,237, 9,031,680 and U.S. Patent Application having Publication No. 2015/0210010, all of the same Assignee.

A printing system utilized in additive manufacturing may include a receiving medium and one or more printing heads. The receiving medium can be, for example, a fabrication tray that may include a horizontal surface to carry the material dispensed from the printing head. The printing head may be, for example, an ink jet head having a plurality of dispensing nozzles arranged in an array of one or more rows along the longitudinal axis of the printing head. The printing head may be located such that its longitudinal axis is substantially parallel to the indexing direction. The printing system may further include a controller, such as a microprocessor to control the printing process, including the movement of the printing head according to a pre-defined scanning plan (e.g., a CAD configuration converted to a Stereo Lithography (STL) format and programmed into the controller). The printing head may include a plurality of jetting nozzles. The jetting nozzles dispense material onto the receiving medium to create the layers representing cross sections of a 3D object.

In addition to the printing head, there may be a source of curing energy, for curing the dispensed building material. The curing energy is typically radiation, for example, UV radiation.

Additionally, the printing system may include a leveling device for leveling and/or establishing the height of each layer after deposition and at least partial solidification, prior to the deposition of a subsequent layer.

The building materials may include modeling materials and support materials, which form the object and the temporary support constructions supporting the object as it is being built, respectively.

The modeling material (which may include one or more material) is deposited to produce the desired object/s and the support material (which may include one or more materials) is used, with or without modeling material elements, to provide support structures for specific areas of the object during building and assure adequate vertical placement of subsequent object layers, e.g., in cases where objects include overhanging features or shapes such as curved geometries, negative angles, voids, and so on.

Both the modeling and support materials are preferably liquid at the working temperature at which they are dispensed, and subsequently hardened, typically upon exposure to curing energy (e.g., UV curing), to form the required layer shape. After printing completion, support structures are removed to reveal the final shape of the fabricated 3D object.

Several additive manufacturing processes allow additive formation of objects using more than one modeling material. For example, U.S. Patent Application having Publication No. 2010/0191360 of the present Assignee, discloses a system which comprises a solid freeform fabrication apparatus having a plurality of dispensing heads, a building material supply apparatus configured to supply a plurality of building materials to the fabrication apparatus, and a control unit configured for controlling the fabrication and supply apparatus. The system has several operation modes. In one mode, all dispensing heads operate during a single building scan cycle of the fabrication apparatus. In another mode, one or more of the dispensing heads is not operative during a single building scan cycle or part thereof.

In a 3D inkjet printing process such as Polyjet™ (Stratasys Ltd., Israel), the building material is selectively jetted from one or more printing heads and deposited onto a fabrication tray in consecutive layers according to a predetermined configuration as defined by a software file.

When a cured rigid modeling material forms the final object, the cured material should preferably exhibit heat deflection temperature (HDT) which is higher than room temperature, in order to assure its usability. Typically, the cured modeling material should exhibit HDT of at least 35° C. For an object to be stable in variable conditions, a higher HDT is desirable.

U.S. Patent Application having Publication No. 2013/0040091, by the present assignee, discloses methods and systems for solid freeform fabrication of shelled objects, constructed from a plurality of layers and a layered core constituting core regions and a layered shell constituting envelope regions.

SUMMARY OF THE INVENTION

According to an aspect of some embodiments of the present invention there is provided a method of layerwise fabrication of a three-dimensional object, the method comprising, for each of at least a few of the layers:

dispensing at least a first modeling formulation and a second modeling formulation to form a core region using both the first and the second modeling formulations, an inner envelope region at least partially surrounding the core region using the first modeling formulation but not the second modeling formulation, and an outer envelope region at least partially surrounding the inner envelope region using the second modeling formulations but not the first modeling formulation;

exposing the layer to curing energy, thereby fabricating the object, wherein each of the first modeling formulation and the second modeling formulation comprises at least one UV-curable material, and wherein the first modeling formulation and the second modeling formulation differ from one another, when hardened, by at least one of:

Heat Deflection Temperature (HDT), Izod Impact resistance, Tg and elastic modulus.

According to some of any of the embodiments described herein, an HDT of the first modeling material formulation, when hardened, is higher than an HDT of the second modeling material formulation, when hardened.

According to some of any of the embodiments described herein, an HDT of the second modeling material formulation, when hardened, is lower than 50° C. and an HDT of the first modeling material formulation, when hardened, is higher than 50° C.

According to some of any of the embodiments described herein, an IzoD Impact Resistance of the second modeling material formulation, when hardened, is higher than an Izod Impact Resistance of the first modeling material formulation, when hardened.

According to some of any of the embodiments described herein, a ratio between elastic moduli of the first modeling material formulation and the second modeling formulation, when hardened, ranges from 1 to 20, or from 1 to 10, or from 1 to 5, or from 2 to 5, or from 2 to 3, or from 2.5 to 3, or from 2.7 to 2.9.

According to some of any of the embodiments described herein, the first modeling material formulation comprises at least one curable material that is characterized, when hardened, by Tg of at least 50° C., as described herein in any of the respective embodiments.

According to some of any of the embodiments described herein, the first modeling material formulation comprises at least two curable materials, at least one of the curable materials is characterized, when hardened, by Tg of at least 80° C., as described herein in any of the respective embodiments.

According to some of any of the embodiments described herein, the first modeling material formulation comprises at least two curable materials, at least one of the curable materials is characterized, when hardened, by Tg of at least 100° C., or at least 150° C., as described herein in any of the respective embodiments.

According to some of any of the embodiments described herein, the first modeling material formulation comprises: at least one curable (meth)acrylic monomer; at least one curable (meth)acrylic oligomer; and optionally, at least one curable (meth)acrylic monomer characterized, when hardened, by Tg lower than 0° C., as described herein in any of the respective embodiments.

According to some of any of the embodiments described herein, the first modeling material formulation comprises: at least one curable (meth)acrylic monomer characterized, when hardened, by Tg of at least 85° C.; at least one curable (meth)acrylic monomer characterized, when hardened, by Tg of at least 150° C.; at least one curable (meth)acrylic oligomer, characterized, when hardened, by Tg of at least 50° C.; and optionally, at least one curable (meth)acrylic monomer characterized, when hardened, by Tg lower than 0° C., as described herein in any of the respective embodiments.

According to some of any of the embodiments described herein, the second modeling material formulation comprises at least two curable materials, at least one of the curable materials is a (meth)acrylic monomer characterized, when hardened, by Tg lower than −20° C., as described herein in any of the respective embodiments.

According to some of any of the embodiments described herein, the second modeling material formulation further comprises at least one curable (meth)acrylic monomer characterized, when hardened, by Tg of at least 70° C., as described herein in any of the respective embodiments.

According to some of any of the embodiments described herein, the second modeling material formulation further comprises at least one curable (meth)acrylic oligomer characterized, when hardened, by Tg of at least 10° C., as described herein in any of the respective embodiments.

According to some of any of the embodiments described herein, the core region comprises a voxelated combination between the first and the second modeling formulations.

According to some of any of the embodiments described herein, a thickness of the inner envelope region, as measured within a plane of the layer and perpendicularly to a surface of the object, is preferably from about 0.1 mm to about 4 mm.

According to some of any of the embodiments described herein, a thickness of the outer envelope region, as measured within a plane of the layer and perpendicularly to a surface of the object, is from about from about 150 microns to about 600 microns.

According to some of any of the embodiments described herein, the dispensing is executed to form at least one additional envelope region between the inner envelope region and the outer envelope region.

According to some of any of the embodiments described herein, the dispensing of the additional envelope region is using both the first and the second modeling formulations.

According to some of any of the embodiments described herein, a thickness of the additional envelope, as measured within a plane of the layer and perpendicularly to a surface of the object, is less than a thickness of the inner envelope region and also less than a thickness of the outer envelope region.

According to some of any of the embodiments described herein, a thickness of the additional envelope, as measured within a plane of the layer and perpendicularly to a surface of the object, is from about 70 microns to about 100 microns.

According to some of any of the embodiments described herein, a ratio between a number of voxels within the additional envelope region that are occupied by the first modeling formulation and a number of voxels within the additional envelope region that are occupied by the second modeling formulation is about 1.

According to some of any of the embodiments described herein, the method further comprises dispensing a plurality of base layers to form a base section of the object, the plurality of base layers comprising at least one outer base layer made of the second modeling formulation but not the first modeling formulation, and at least one inner base layer made of the first modeling formulation but not the second modeling formulation.

According to some of any of the embodiments described herein, an overall thickness of the at least one outer base layer along a build direction of the object approximately equals to a thickness of the outer envelope region as measured in a plane engaged by the outer envelope region and perpendicularly to a surface of the object.

According to some of any of the embodiments described herein, the plurality of base layers comprises at least one intermediate base layer between the at least one inner base layer and the at least one outer base layer, the intermediate base layer being made of both the first modeling formulation and the second modeling formulation.

According to some of any of the embodiments described herein, the method further comprises dispensing a plurality of top layers to form a top section of the object, the plurality of top layers comprising at least one outer top layer made of the second modeling formulation but not the first modeling formulation, and at least one inner top layer made of the first modeling formulation but not the second modeling formulation.

According to some of any of the embodiments described herein, an overall thickness of the at least one outer top layer along a build direction of the object approximately equals to a thickness of the outer envelope region as measured in a plane engaged by the outer envelope region and perpendicularly to a surface of the object.

According to some of any of the embodiments described herein, the plurality of top layers comprises at least one intermediate top layer between the at least one inner top layer and the at least one outer top layer, the intermediate top layer being made of both the first modeling formulation and the second modeling formulation.

According to some of any of the embodiments described herein, at least one parameter characterizing the first formulation is selected to provide a predetermined damping for the core.

According to some of any of the embodiments described herein, the at least one parameter comprises an extent of cross linking of the first modeling formulation.

According to some of any of the embodiments described herein, the at least one parameter comprises a total calculated Tg of the first formulation, as calculated by summing individual Tg values of polymeric materials included in the first modeling formulation, when hardened.

According to some of any of the embodiments described herein, relative amounts of the first and the second formulations is selected to provide a predetermined damping for the core.

According to an aspect of some embodiments of the present invention there is provided a three-dimensional object obtained in layerwise solid freeform fabrication, the object comprising a plurality of layers, at least one layer comprising:

a core region made, at least in part, of a first hardened modeling material formed of a first modeling formulation and a second modeling formulation, an inner envelope region at least partially surrounding the core region and being made, at least in part, of a second hardened modeling material formed of the first modeling formulation but not the second modeling formulation, and an outer envelope region at least partially surrounding the inner envelope region and being made, at least in part, of a third hardened modeling material formed of the second modeling formulation but not the first modeling formulation;

wherein each of the first modeling formulation and the second modeling formulation comprises at least one UV-curable material, and wherein the first modeling formulation and the second modeling formulation differ from one another, when hardened, by at least one of:

Heat Deformation Temperature (HDT), Izod Impact resistance and elastic modulus.

According to some of any of the embodiments described herein, the core region comprises a voxelated combination between a hardened material formed of the first modeling material formulation and a hardened material formed of the second modeling material formulation.

According to some of any of the embodiments described herein, the object further comprises at least one additional envelope region between the inner envelope region and the outer envelope region.

According to some of any of the embodiments described herein, the additional envelope region is made, at least in part, of a fourth hardened modeling material formed of both the first and the second modeling formulations.

According to some of any of the embodiments described herein, a ratio between a number of voxels within the additional envelope region that are occupied by a hardened material formed of the first modeling formulation and a number of voxels within the additional envelope region that are occupied by a hardened material formed of the second modeling formulation is about 1.

According to some of any of the embodiments described herein, the object further comprises a plurality of base layers forming a base section of the object, the plurality of base layers comprising at least one outer base layer made of a hardened material formed of the second modeling formulation but not the first modeling formulation, and at least one inner base layer made of a hardened material formed of the first modeling formulation but not the second modeling formulation.

According to some of any of the embodiments described herein, an overall thickness of the at least one outer base layer along a build direction of the object approximately equals to a thickness of the outer envelope region as measured in a plane engaged by the outer envelope region and perpendicularly to a surface of the object.

According to some of any of the embodiments described herein, the plurality of base layers comprises at least one intermediate base layer between the at least one inner base layer and the at least one outer base layer, the intermediate base layer being made of a hardened material formed of both the first modeling formulation and the second modeling formulation.

According to some of any of the embodiments described herein, the object further comprises a plurality of top layers forming a top section of the object, the plurality of top layers comprising at least one outer top layer made of a hardened modeling material formed of the second modeling formulation but not the first modeling formulation, and at least one inner top layer made of a hardened modeling material formed of the first modeling formulation but not the second modeling formulation.

According to some of any of the embodiments described herein, an overall thickness of the at least one outer top layer along a build direction of the object approximately equals to a thickness of the outer envelope region as measured in a plane engaged by the outer envelope region and perpendicularly to a surface of the object.

According to some of any of the embodiments described herein, the plurality of top layers comprises at least one intermediate top layer between the at least one inner top layer and the at least one outer top layer, the intermediate top layer being made of hardened material formed of both the first modeling formulation and the second modeling formulation.

According to some of any of the embodiments described herein, the first modeling material formulation and the second modeling material formulations are as described herein in any of the respective embodiments and any combination thereof.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF SEVERAL VIEWS OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

Figure 1A:
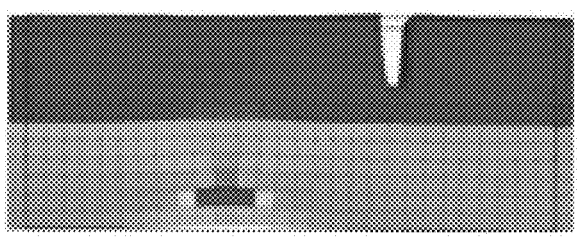
Figure 1B:
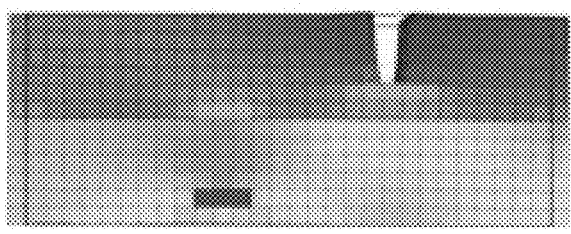
Figure 1C:
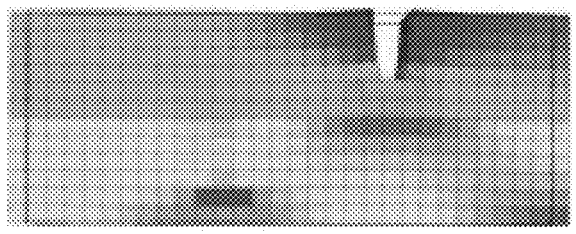
Figure 1D:
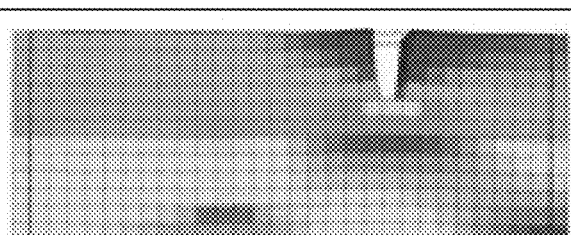
Figure 1E:
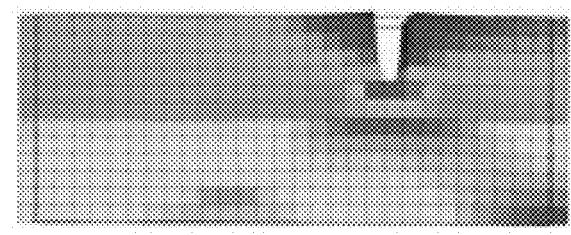
Figure 1F:
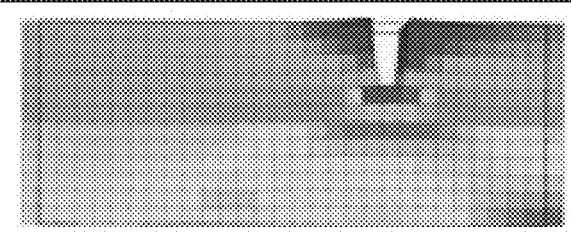
Figure 1G:
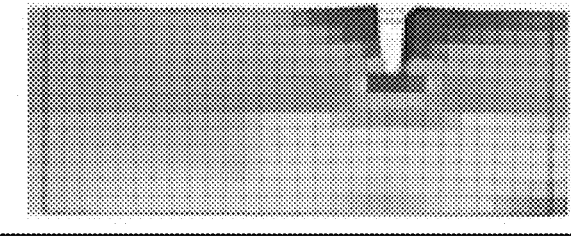
Figure 2:
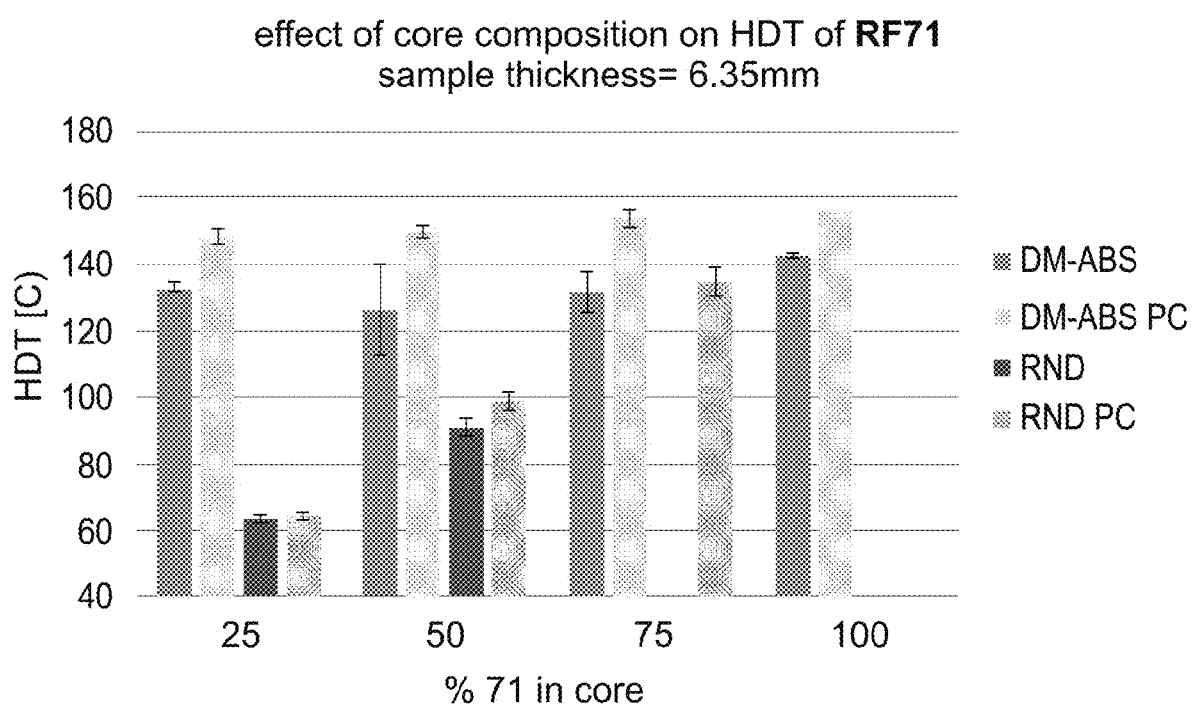
Figure 3:
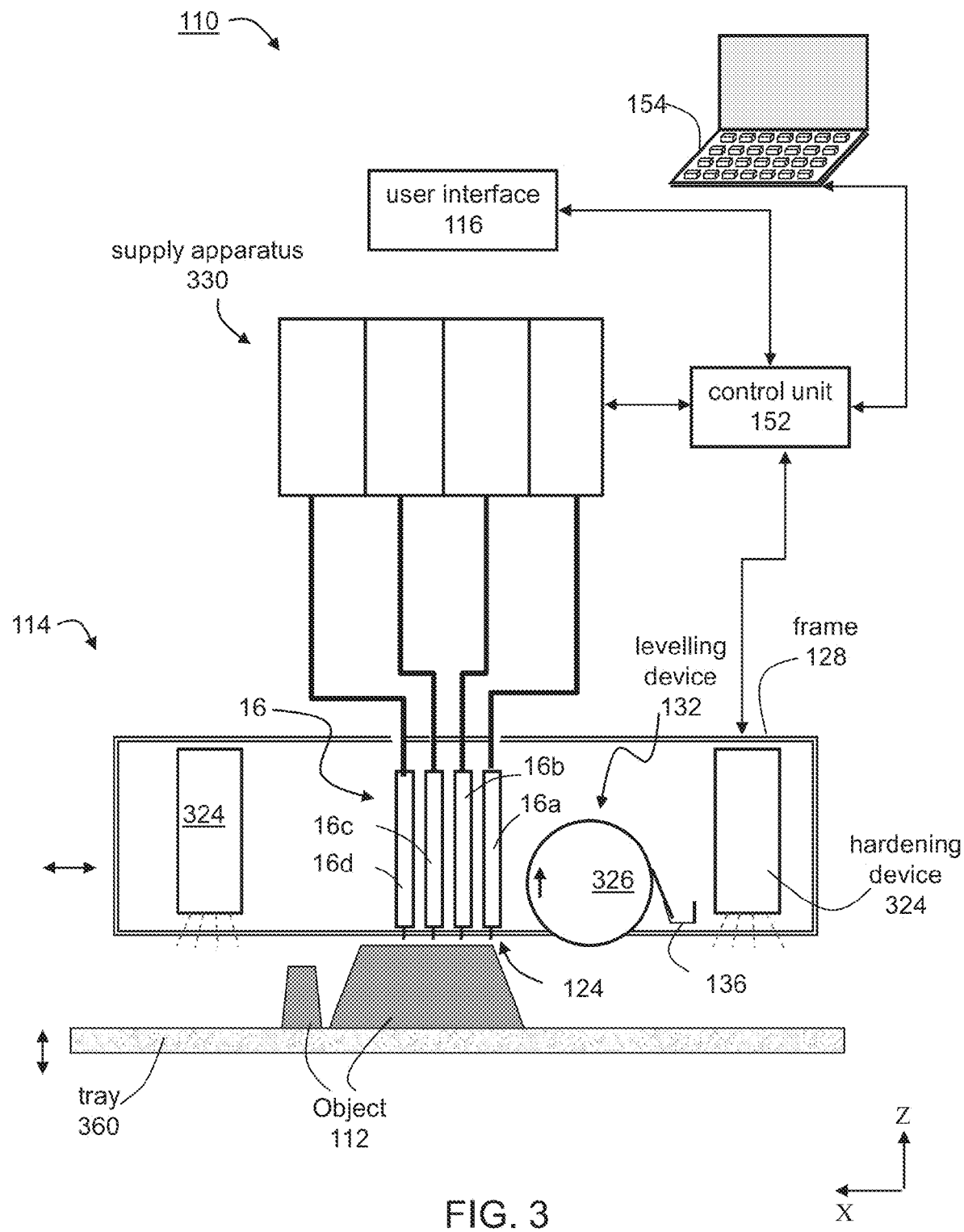
Figure 4A:
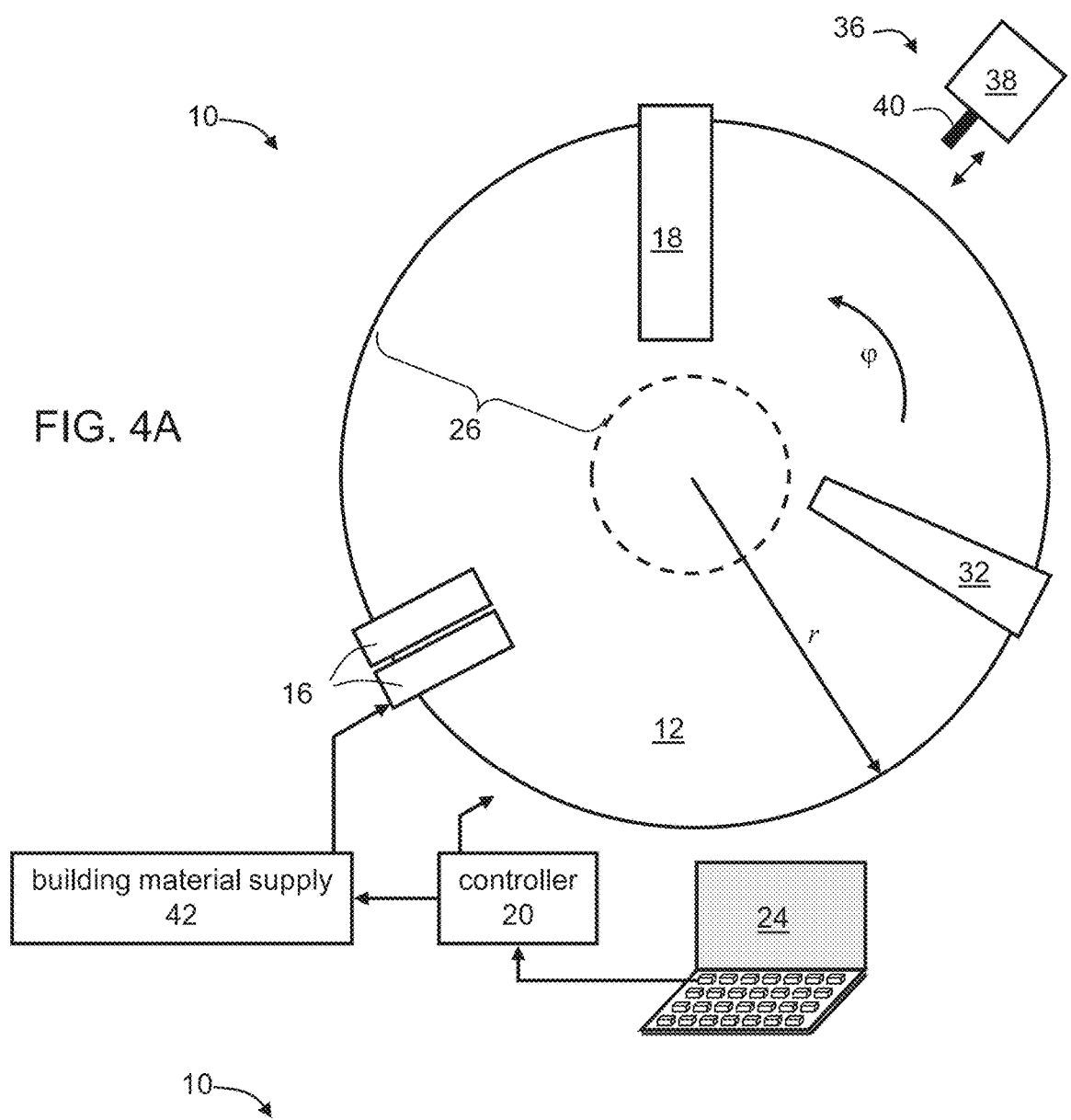
Figure 4B:
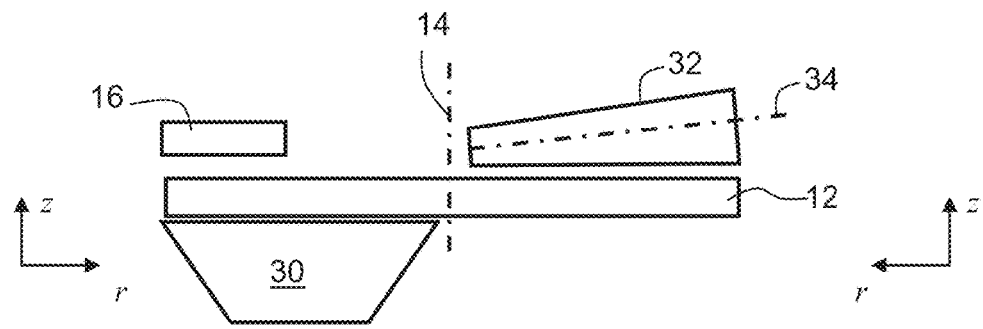
Figure 5:
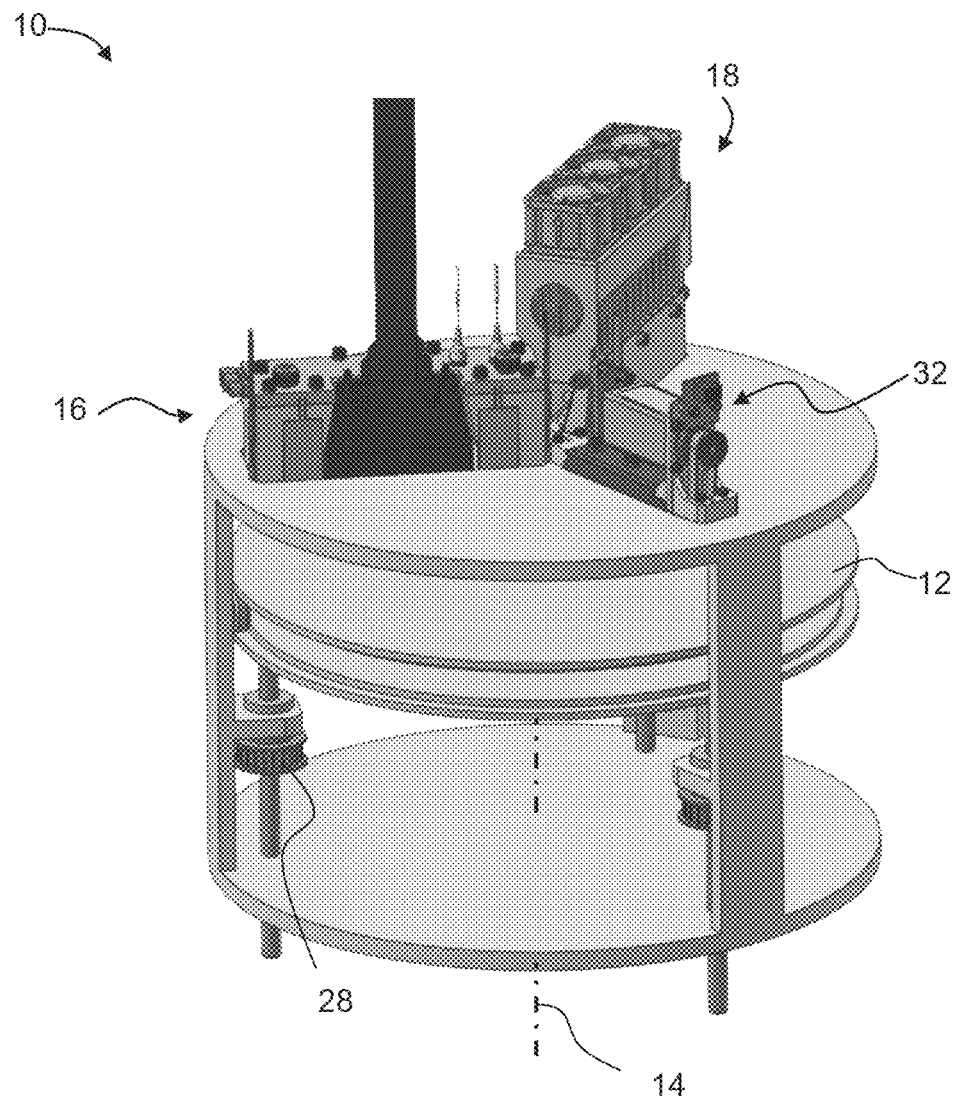
Figure 6A:
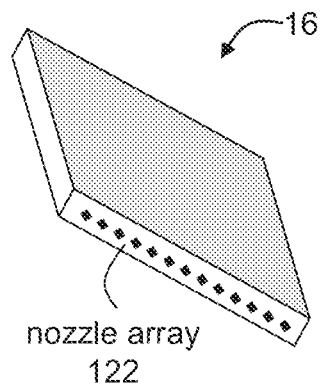
Figure 6B:
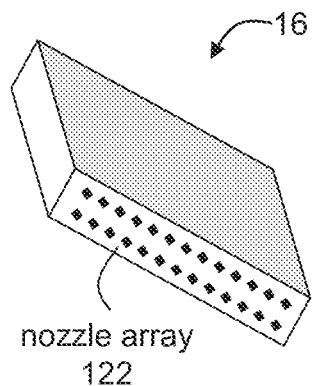
Figure 6C:
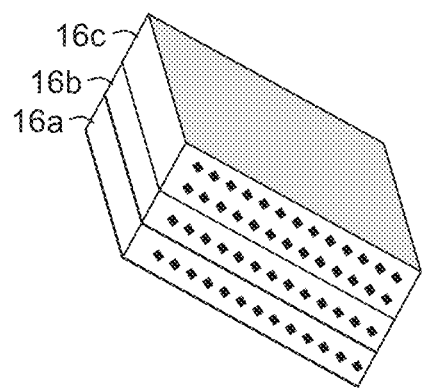
Figure 7:
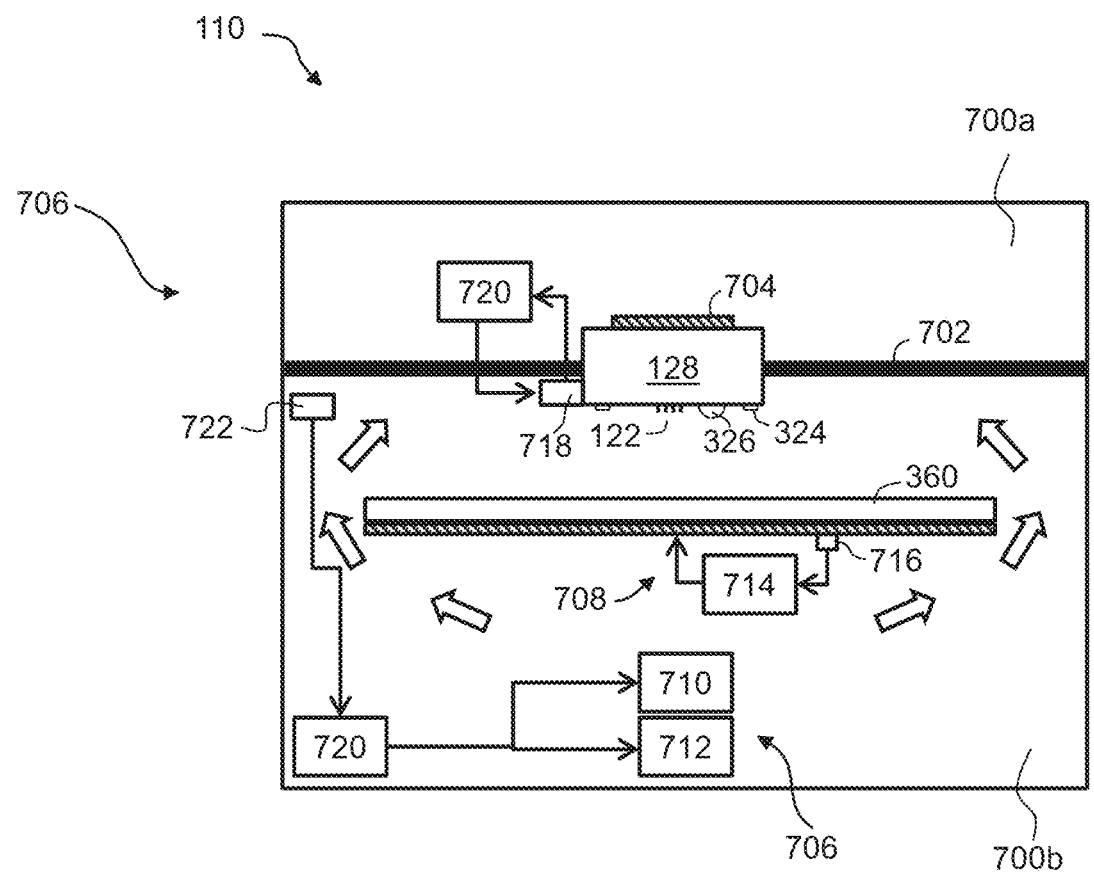
Figure 8:
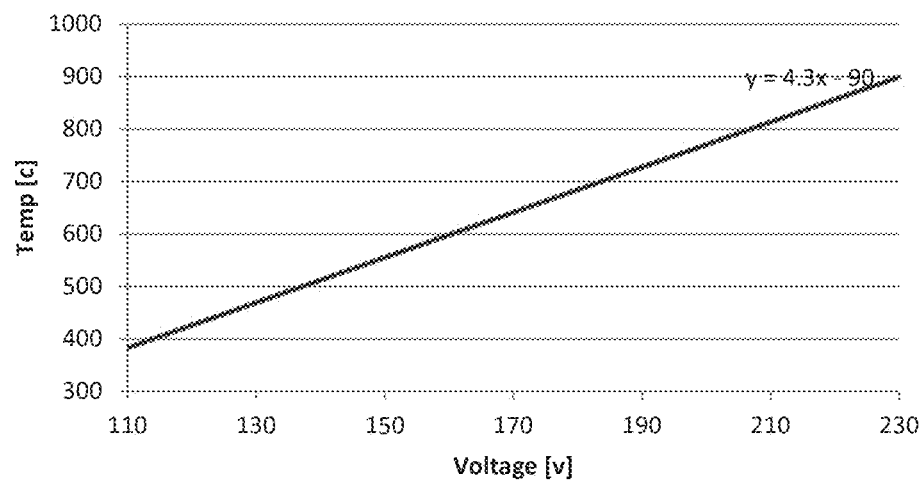
Figure 10A:
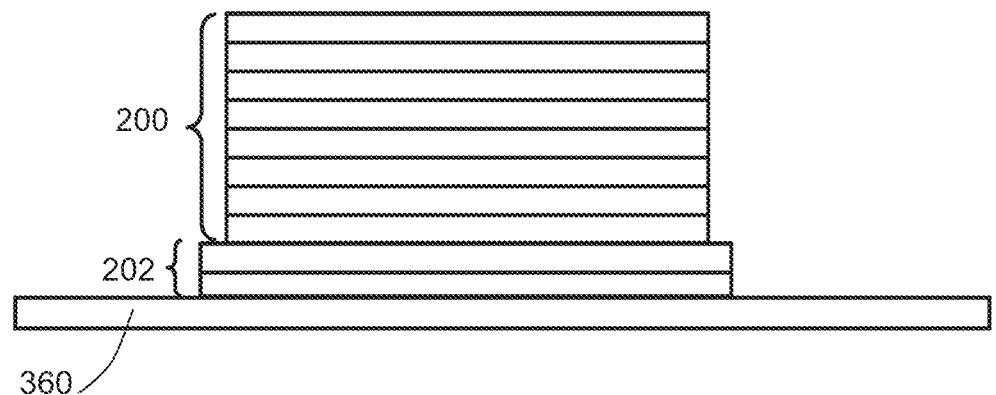
Figure 10B:
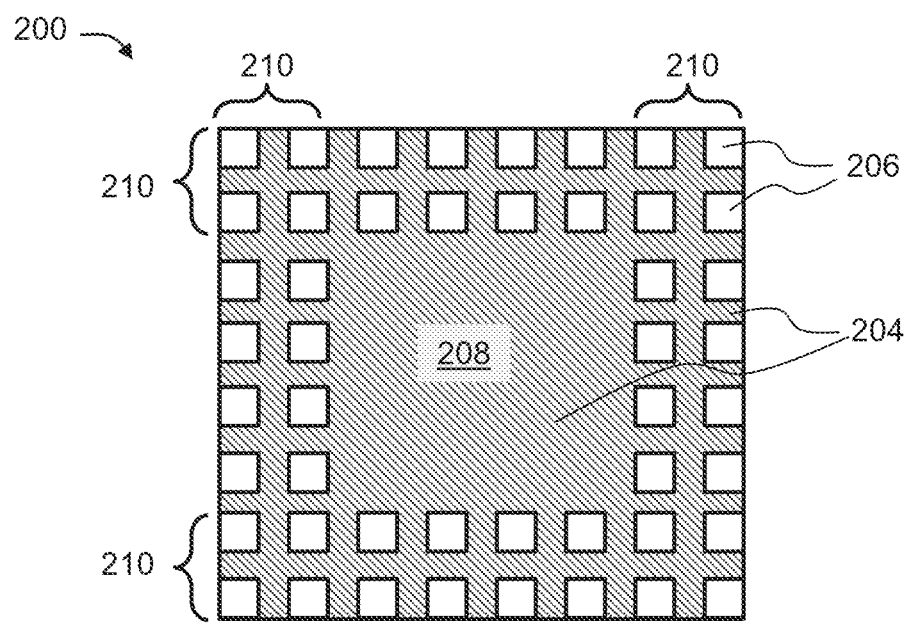
Figure 11:
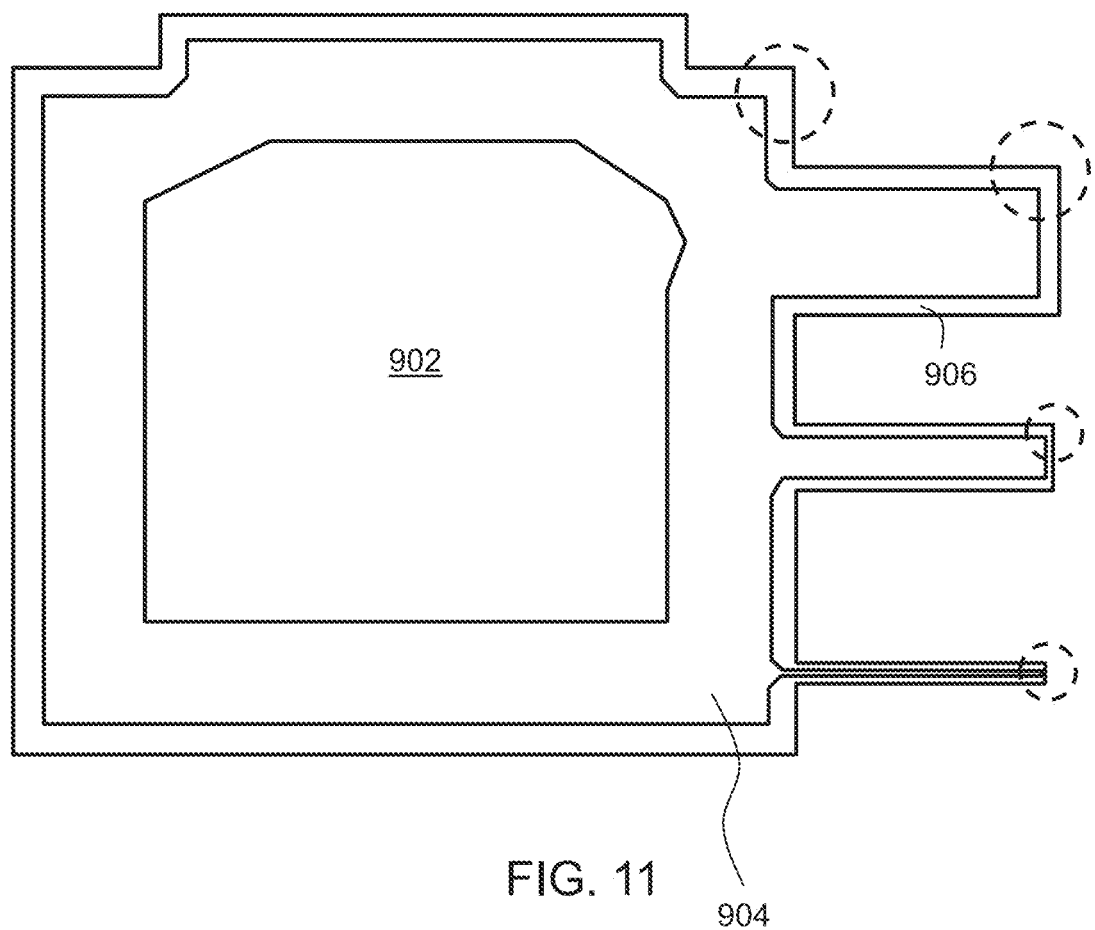
Figure 12:
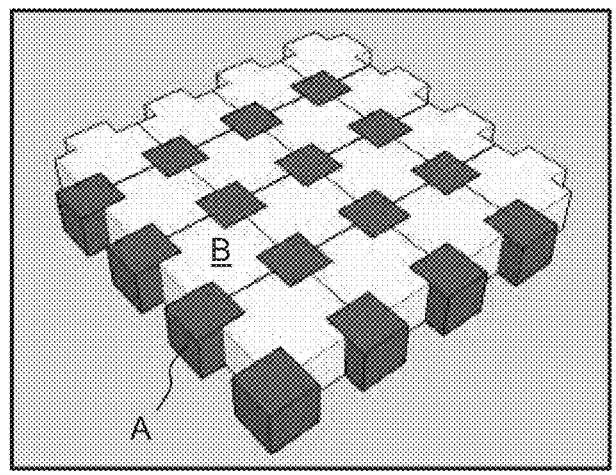

FIGS. 1A-G show results of computer simulations performed in accordance with some embodiments of the present invention to analyze stress distribution resulting from a crack in a modeling formulation;

FIG. 2 shows the effect of various concentrations of a formulation in a core on the HDT of the various printed objects;

FIG. 3 is a schematic illustration of an additive manufacturing system according to some embodiments of the invention;

FIGS. 4A and 4B are schematic illustrations of a top view (FIG. 4A) and a side view (FIG. 4B) of additive manufacturing system employing rotary motion, according to some embodiments of the invention;

FIG. 5 is a schematic illustration of an isometric view of an additive manufacturing system employing rotary motion according to some embodiments of the invention;

FIGS. 6A-C are schematic illustrations of printing heads according to some embodiments of the present invention;

FIG. 7 is a schematic illustration of an additive manufacturing system in embodiments of the invention in which the system comprises a thermal screen;

FIG. 8 is a graph showing a typical linear dependence of a temperature on voltage applied to an infrared source;

FIGS. 9A-F are schematic illustrations of shelled structures, according to some embodiments of the present invention;

FIGS. 10A-B are schematic illustrations of an object formed on a pedestal, according to some embodiments of the present invention;

FIG. 11 is a schematic illustration of a shelled structure having parts that are devoid of a core region, according to some embodiments of the present invention;

FIG. 12 is a schematic illustration of a region which includes interlaced modeling materials according to some embodiments of the present invention; and FIGS. 13A-E show results of a dynamic mechanical analysis performed to analyze an object fabricated according to some embodiments of the present invention.

DESCRIPTION OF SPECIFIC EMBODIMENTS OF THE INVENTION

The present invention, in some embodiments thereof, relates to Additive Manufacturing (AM) of an object, and, more particularly, but not exclusively, to methods and systems for additive manufacturing of a layered object.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object or a part thereof.

Each layer is formed by additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material, and which type of building material is to be delivered thereto. The decision is made according to a computer image of the surface.

In preferred embodiments of the present invention the AM comprises three-dimensional printing, more preferably three-dimensional inkjet printing. In these embodiments a building material is dispensed from a dispensing head having a circuit for controllably dispensing building material in layers on a supporting structure. Typically, each dispensing head optionally and preferably has a set of nozzles to deposit building material in layers on a supporting structure. The AM apparatus thus dispenses building material in target locations which are to be occupied and leaves other target locations void. The apparatus typically includes a plurality of dispensing heads, each of which can be configured to dispense a different building material. Thus, different target locations can be occupied by different building materials. The types of building materials can be categorized into two major categories: modeling material and support material. The support material serves as a supporting matrix or construction for supporting the object or object parts during the fabrication process and/or other purposes, e.g., providing hollow or porous objects. Support constructions may additionally include modeling material elements, e.g. for further support strength.

The modeling material is generally formed of a one or more formulations which are formulated for use in additive manufacturing and which are able to form, once cured, a three-dimensional object on its own, i.e., without having to be mixed or combined with any other substance.

The final three-dimensional object is made of the modeling material or a combination of modeling materials or modeling and support materials or modification thereof (e.g., following curing). All these operations are well-known to those skilled in the art of solid freeform fabrication.

In some exemplary embodiments of the invention an object is manufactured by dispensing a building material (uncured) which comprises two or more different modeling material formulations, each formulation from a different dispensing head of the AM. The formulations are optionally and preferably deposited in layers during the same pass of the dispensing heads. The formulations and combination of formulations within the layer are selected according to the desired properties of the object.

A representative and non-limiting example of a system 110 suitable for AM of an object 112 according to some embodiments of the present invention is illustrated in FIG. 3. System 110 comprises an additive manufacturing apparatus 114 having a dispensing unit 16 which comprises a plurality of dispensing heads. Each head preferably comprises an array of one or more nozzles 122, as illustrated in FIGS. 6A-C described below, through which a liquid (uncured) building material 124 is dispensed.

Preferably, but not obligatorily, apparatus 114 is a three-dimensional printing apparatus, in which case the dispensing heads are printing heads, and the (uncured) building material is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material deposition apparatus.

Each dispensing head is optionally and preferably fed via a building material reservoir which may optionally include a temperature control unit (e.g., a temperature sensor and/or a heating device), and a material level sensor. To dispense the (uncured) building material, a voltage signal is applied to the dispensing heads to selectively deposit droplets of material via the dispensing head nozzles, for example, as in piezoelectric inkjet printing technology. The dispensing rate of each head depends on the number of nozzles, the type of nozzles and the applied voltage signal rate (frequency). Such dispensing heads are known to those skilled in the art of solid freeform fabrication.

Preferably, but not obligatorily, the overall number of dispensing nozzles or nozzle arrays is selected such that half of the dispensing nozzles are designated to dispense support material formulation and half of the dispensing nozzles are designated to dispense modeling material formulation(s), i.e. the number of nozzles jetting modeling material formulation(s) is the same as the number of nozzles jetting support material formulation. In the representative example of FIG. 3, four dispensing heads $16a$, $16b$, $16c$ and $16d$ are illustrated. Each of heads $16a$, $16b$, $16c$ and $16d$ has a nozzle array. In this Example, heads $16a$ and $16b$ can be designated for modeling material/s and heads $16c$ and $16d$ can be designated for support material. Thus, head $16a$ can dispense a first modeling material formulation, head $16b$ can dispense a second modeling material formulation and heads $16c$ and $16d$ can both dispense a support material formulation. In an alternative embodiment, heads $16c$ and $16d$, for example, may be combined in a single head having two nozzle arrays for depositing a support material formulation.

Yet it is to be understood that it is not intended to limit the scope of the present invention and that the number of modeling material formulation depositing heads (modeling heads) and the number of support material formulation depositing heads (support heads) may differ. Generally, the number of modeling heads, the number of support heads and the number of nozzles in each respective head or head array are selected such as to provide a predetermined ratio, a, between the maximal dispensing rate of the support material formulation and the maximal dispensing rate of modeling material formulation(s). The value of the predetermined ratio, a, is preferably selected to ensure that in each formed layer, the height of dispensed modeling material formulation(s) equals the height of dispensed support material formulation(s). Typical values for a are from about 0.6 to about 1.5.

As used herein throughout, the term "about" refers to ±10% or to ±5%.

For example, for a=1, the overall dispensing rate of a support material formulation is generally the same as the overall dispensing rate of the modeling material formulation(s) when all modeling heads and support heads operate.

In a preferred embodiment, there are M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material level sensor of its own, and receives an individually controlled voltage for its operation.

Apparatus 114 can further comprise a hardening device 324 which can include any device configured to emit light, heat or the like that may cause the deposited material (dispensed formulations) to harden. For example, hardening device 324 can comprise one or more radiation sources, which can be, for example, an ultraviolet or visible or infrared lamp, or other sources of electromagnetic radiation, or electron beam source, depending on the modeling material formulations and/or support material formulations being used. In some embodiments of the present invention, hardening device 324 serves for curing or solidifying the curable material(s) in the formulation(s).

The dispensing head and radiation source are preferably mounted in a frame or block 128 which is preferably operative to reciprocally move over a tray 360, which serves as the working surface. In some embodiments of the present invention the radiation sources are mounted in the block such that they follow in the wake of the dispensing heads to at least partially cure or solidify the curable materials just dispensed by the dispensing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material generated during leveling. Waste collection device 136 may comprise any mechanism that delivers the material to a waste tank or waste cartridge.

In use, the dispensing heads of unit 16 move in a scanning direction, which is referred to herein as the X direction, and selectively dispense (uncured) building material in a predetermined configuration in the course of their passage over tray 360. The building material typically comprises one or more types of support material formulation(s) and one or more types of modeling material formulation(s). The passage of the dispensing heads of unit 16 is followed by the curing of the dispensed modeling material formulation(s) by radiation source 126. In the reverse passage of the heads, back to their starting point for the layer just deposited, an additional dispensing of (uncured) building material may be carried out, according to predetermined configuration. In the forward and/or reverse passages of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the dispensing head of unit 16, within the layer. Such Z displacement is carried out in order to cause contact of the leveling device with the surface in one direction and prevent contact in the other direction.

System 110 optionally and preferably comprises a building material supply system 330 which comprises the building material containers or cartridges and supplies a plurality of building materials to fabrication apparatus 114.

A control unit 340 controls fabrication apparatus 114 and optionally and preferably also supply system 330. Control unit 340 typically includes an electronic circuit configured to perform the controlling operations. Control unit 340 preferably communicates with a data processor 154 which transmits digital data pertaining to fabrication instructions based on computer object data, e.g., a CAD configuration represented on a computer readable medium in a form of a Standard Tessellation Language (STL) format or the like. Typically, control unit 340 controls the voltage applied to each dispensing head or nozzle array and the temperature of the building material in the respective printing head.

Once the manufacturing data is loaded to control unit 340 it can operate without user intervention. In some embodiments, control unit 340 receives additional input from the operator, e.g., using data processor 154 or using a user interface 116 communicating with unit 340. User interface 116 can be of any type known in the art, such as, but not limited to, a keyboard, a touch screen and the like. For example, control unit 340 can receive, as additional input, one or more building material types and/or attributes, such as, but not limited to, color, characteristic distortion and/or transition temperature, viscosity, electrical property, magnetic property. Other attributes and groups of attributes are also contemplated.

Another representative and non-limiting example of a system 10 suitable for AM of an object according to some embodiments of the present invention is illustrated in FIGS. 4A-B and 5. FIGS. 4A-B illustrate a top view (FIG. 4A) and a side view (FIG. 4B) and FIG. 5 illustrates an isometric view of system 10.

In the present embodiments, system 10 comprises a tray 12 and a plurality of inkjet printing heads 16, each having a plurality of separated nozzles. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While the embodiments below are described with a particular emphasis to configuration (i) wherein the tray is a rotary tray that is configured to rotate about vertical axis 14 relative to heads 16, it is to be understood that the present application contemplates also configurations (ii) and (iii). Any one of the embodiments described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction $\varphi$, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a supporting structure for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights), different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 4A tray replacement device 36 is illustrated as a drive 38 with a movable arm 40 configured to pull tray 12, but other types of tray replacement devices are also contemplated.

Exemplified embodiments for the printing head 16 are illustrated in FIGS. 6A-6C. These embodiments can be employed for any of the AM systems described above, including, without limitation, system 110 and system 10.

FIGS. 6A-B illustrate a printing head 16 with one (FIG. 6A) and two (FIG. 6B) nozzle arrays 22. The nozzles in the array are preferably aligned linearly, along a straight line. In embodiments in which a particular printing head has two or more linear nozzle arrays, the nozzle arrays are optionally and preferably can be parallel to each other.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1$-$\varphi_2$, and the angle between the linear nozzle arrays of the two heads is also $\varphi_1$-$\varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 6C.

In some embodiments, system 10 comprises a support structure 30 positioned below heads 16 such that tray 12 is between support structure 30 and heads 16. Support structure 30 may serve for preventing or reducing vibrations of tray 12 that may occur while inkjet printing heads 16 operate. In configurations in which printing heads 16 rotate about axis 14, support structure 30 preferably also rotates such that support structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, support structure 30 preferably also moves vertically together with tray 12. In configurations in which the vertical distance is varied by heads 16 along the vertical direction, while maintaining the vertical position of tray 12 fixed, support structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can has an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

The transformation of coordinates allows three-dimensional printing over a rotating tray. In conventional three-dimensional printing, the printing heads reciprocally move above a stationary tray along straight lines. In such conventional systems, the printing resolution is the same at any point over the tray, provided the dispensing rates of the heads are uniform. Unlike conventional three-dimensional printing, not all the nozzles of the head points cover the same distance over tray 12 during at the same time. The transformation of coordinates is optionally and preferably executed so as to ensure equal amounts of excess material at different radial positions.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material in layers, such as to print a three-dimensional object on tray 12.

System 10 optionally and preferably comprises one or more radiation sources 18, which can be, for example, an ultraviolet or visible or infrared lamp, or other sources of electromagnetic radiation, or electron beam source, depending on the modeling material being used. Radiation source can include any type of radiation emitting device, including, without limitation, light emitting diode (LED), digital light processing (DLP) system, resistive lamp and the like. Radiation source 18 serves for curing or solidifying or hardening the dispensed modeling material formulation(s) and/or support material formulation(s). In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 4B).

The conical roller can have the shape of a cone or a conical frustum.

The opening angle of the conical roller is preferably selected such that there is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different formulations, comprising, e.g., different curable materials, from different dispensing heads. These embodiments provide, inter alia, the ability to select curable materials or combinations of curable materials from a given number of materials and define desired combinations of the selected curable materials and their properties. According to the present embodiments, the spatial locations of the deposition of each curable material or combinations of curable materials with the layer is defined, either to effect occupation of different three-dimensional spatial locations by different materials or different combinations of materials, or to effect occupation of substantially the same three-dimensional location or adjacent three-dimensional locations by two or more different curable materials or different combinations of curable materials so as to allow post deposition spatial combination of the materials within the layer, thereby to form a composite material at the respective location or locations.

Any post deposition combination or mix of modeling material formulations is contemplated. For example, once a certain modeling material formulation is dispensed it may preserve its original properties. However, when it is dispensed simultaneously with another modeling material formulation or other dispensed (curable) materials which are dispensed at the same or nearby locations, a composite material having a different property or properties to the dispensed materials is formed.

The present embodiments thus enable the deposition of a broad range of material combinations, and the fabrication of an object which may consist of multiple different combinations of materials, in different parts of the object, according to the properties desired to characterize each part of the object.

Further details on the principles and operations of an AM system suitable for the present embodiments are found in U.S. Published Application No. 20100191360, and International Publication No. WO2016/009426, the contents of which are hereby incorporated by reference.

The systems of the present embodiments (system 10 and system 110) are optionally and preferably supplemented with a thermal screen for thermally separating the circuits of the dispensing or printing heads from the space between the heads and the tray. A representative schematic illustration of this embodiment is shown in FIG. 7. FIG. 7 illustrates the system for the case of linear relative motion between the tray and the heads, but the ordinarily skilled person, provided with the details described herein, would know how to adjust the drawing for the case in which the relative motion is rotary (for example, by replacing tray 360 of with tray 12, and printing block 128 by at least one of printing head 16, radiation source 18 and leveling device 32). For clarity of presentation, several features of the systems such as the supply apparatus, the user interface and the controller have been omitted from FIG. 7.

Shown in FIG. 7 is a printing chamber 700 having therein the tray 360 and the printing block 128. Block 128 represents all the elements that are used for dispensing and hardening the building materials, including, without limitation, the printing heads, leveling devices and hardening devices. The electronic circuits of block 128 (e.g., the electronic circuit of the printing heads, leveling devices and/or hardening devices) are located at the upper part of block 128 and are collectively shown at 704. The lower part of block 128 can include the nozzles 122 of the printing heads, the mechanical parts of leveling device 326 and the output of the hardening device 324).

A thermal screen 702 separates between the upper part 700a and lower part 700b of chamber 700, such that the upper part of block 128, including electronic circuits 704, is above thermal screen 702, and the lower part of block 128 is below thermal screen 702. This ensures that the electronic circuits 704 are thermally separated from the components of block 128 that dispense or otherwise interact (mechanically or by way of radiation) with the building material. This embodiment is useful when the system is used to dispense the first and/or second modeling formulations described herein, particularly when heat is applied to the formulations, for example, for reducing the curling effect.

Thermal screen 702 is optionally and preferably collapsible and expandable, and is positioned to simultaneously fold at one side of block 128 and expand at an opposite side of block 128 during the motion of block 128. For example, screen 702 can be structured as an accordion folding screen or as a telescopic screen, e.g., a concentric coupling of a series of nested and axially interlocking hollow structures of gradually reducing dimensions. Screen 702 can be made of, or coated by, a thermally reflective material.

In some embodiments of the present invention system 110 (or system 10) comprises a heating system 706 that heats the lower part 700b of chamber 700, particularly the space between the printing head and the tray. Heating system 706 can be embodied in more than one way. In some embodiments of the present invention, heating system 706 comprises a tray heater 708 in thermal contact with a back side of tray 360 for delivering heat to the modeling material that is dispensed on the front side of the tray by heat conduction.

Tray heater 708 can comprises one or more heating panels having resistance filament. When tray heater 708 is employed, tray 360 is made of a heat conductive material, such as a metal, e.g., aluminum. Typically, but not necessarily, the resistance filament can be coated by or embedded in an encapsulation, such as, but not limited to, a silicon encapsulation or the like. The heating panel(s) are preferably disposed so as to cover the entire back side of the working area of tray 360. The temperature of heater 708 can be controlled by a temperature control circuit 714, such as, but not limited to, a proportional-integral-derivative (PID) controller. Temperature control circuit 714 can receive temperature data from a temperature sensor 716, such as, but not limited to, a thermocouple, positioned in contact with heater 708 and control the voltage on the resistance filament responsively to the received temperature data and to control signals received from the main controller (not shown, see 152 in FIGS. 3 and 20 in FIG. 4A).

Typical operational parameters of tray heater 708 are, without limitation, temperature range of 40-100° C., maximal flux about 1-2 w/cm$^2$, e.g., about 1.5 w/cm$^2$, maximal applied voltage about 360-400 volts, e.g., about 380 volts, or from about 150 volts to about 230 volts.

In some embodiments of the present invention heating system 706 comprises a radiation source 718 that delivers heat to the dispensed modeling material formulation(s) by radiation (e.g., infrared radiation). Radiative heat is optionally and preferably applied from the top side of the tray so as to allow heating dispensed material that is farther from the tray. For example, source 718 can be mounted on block 128 (e.g., alongside device 324), so as to allow it to move reciprocally over the tray. The radiation source 718 can be controlled by a temperature control circuit 720, such as, but not limited to, a (PID) controller, which receives temperature data from a temperature sensor (not shown) that is mounted on the source 718, and provides voltage pulses to the source responsively to the received temperature data and to control signals received from the main controller (not shown, see 152 in FIGS. 3 and 20 in FIG. 4A). Alternatively, an open loop control can be employed, in which case a constant voltage level is applied to the source without dynamically controlling the voltage based on temperature data.

Typical operational parameters of infrared source 718 are, without limitation, temp range of 40-900° C., wavelength range 2-10 µm, maximal flux 6-7 w/cm$^2$, e.g., about 6.4 w/cm$^2$, voltage 150-400 volts, e.g., about 180 volts. FIG. 8 is a graph showing a typical linear dependence of the temperature inside infrared source 718 as a function of the voltage applied to source 718.

In some embodiments of the present invention, heating system 706 comprises a chamber heater 712 for delivering heat to the modeling material that is dispensed on the front side of the tray by heat conduction. In some embodiments of the present invention, heating system 706 comprises a blower and/or fan 710 positioned outside the space between the block 128 and the tray 360 (e.g., below the tray) for delivering heat to the dispensed modeling material by convection. Heat convection (e.g., by air) is generally shown by block arrows. Use of chamber heater 712 optionally and preferably in combination with blower and/or fan 710 is advantageous because it allows heating also the side walls and the top of the printed object. Preferably, the chamber heater 712 is activated before (e.g., 10-60 minutes before) the dispensing of building material is initiated.

The chamber heater 712 and/or blower and/or fan 710 is or can be controlled by a temperature control circuit 722, such as, but not limited to, a (PID) controller, which receives temperature data from a temperature sensor 724 that is mounted in the space between block 128 and tray 360, and controls the temperature of chamber heater 712 and/or the fan speed of blower or fan 710 responsively to the received temperature data and to control signals received from the main controller (not shown, see 152 in FIGS. 3 and 20 in FIG. 4A). The maximal temperature of heater 712 is, without limitation 600-700° C., e.g., about 650° C., and the maximal air flow generated by blower or fan 710 is, without limitation 250-350 l/min, e.g., about 300 l/min.

Preferably, heating system 706 includes two or more of the above elements, so as to allow system 706 to deliver heat by at least two mechanisms selected from the group consisting of heat conduction, heat convection and radiation. In some embodiments of the present invention the controller (not shown, see 152 in FIGS. 3 and 20 in FIG. 4A) receives from the user interface a heating mode and operates heating system according to received mode. The mode can be selected from a predetermined list heating modes. For example, in one heating mode, the tray heater, infrared radiation, chamber heater and blower or fan are operated. In another heating mode, the tray heater, infrared radiation and chamber heater are operated, but the blower or fan is not operated. In another heating mode, the tray heater and infrared radiation are operated, but the chamber heater and blower or fan is not operated. In another heating mode, the tray heater, infrared radiation and blower or fan are operated, but the chamber heater is not operated. In another heating mode, the tray heater and chamber heater is operated, but the infrared radiation and blower or fan are not operated. In another heating mode, the tray heater, chamber heater is operated and blower or fan are operated, but the infrared radiation is not operated. Typically, but not necessarily the user interface displays this list of modes to the user and allows the user to select the desired mode.

Even though inkjet printing is widely practiced and has become a routine procedure for fabricating arbitrarily shaped structures throughout the world, it is not without certain operative limitations. For example, the range of thermo-mechanical properties obtainable from currently available modeling materials can be insufficient, in particular for those modeling materials which are related to UV polymerization, and which are formed of low molecular weight raw materials (e.g., monomers and oligomers), and especially if the raw materials polymerize by a radical mechanism, e.g., the addition reaction of acrylic functional groups.

The present inventors have devised a layered (e.g., polymeric) object or structure which enjoys thermo-mechanical properties which are improved compared to other objects fabricated via AM.

Generally, the structure according to various exemplary embodiments of the present invention is a layered shelled structure made of two or more modeling formulations (e.g., UV-polymerizable or UV-curable modeling formulations). The structure typically comprises a layered core which is at least partially coated by one or more layered shells such that at least one layer of the core engages the same plane with a layer of at least one of the shells. The thickness of each shell, as measured perpendicularly to the surface of the structure, is typically, but not necessarily, at least 10 µm. In various exemplary embodiments of the invention, the core and the shell are different from each other in their thermo-mechanical properties. This is readily achieved by fabricating the core and shell from different modeling formulations or different combinations of modeling formulations. The thermo-mechanical properties of the core and shell are referred to herein as "core thermo-mechanical properties" and "shell thermo-mechanical properties," respectively.

A representative and non-limiting example of a structure according to some embodiments of the present invention is shown in FIGS. 9A-D.

FIG. 9A is a schematic illustration of a perspective view of a structure 60, and FIG. 9B is a cross-sectional view of structure 60 along line A-A of FIG. 9A. For clarity of presentation a Cartesian coordinate system is also illustrated.

Structure 60 comprises a plurality of layers 62 stacked along the z direction. Structure 60 is typically fabricated by an AM technique, e.g., using system 10, whereby the layers are formed in a sequential manner. Thus, the z direction is also referred to herein as the "build direction" of the structure. Layers 62 are, therefore, perpendicular to the build direction. Although structure 60 is shown as a cylinder, this need not necessarily be the case, since the structure of the present embodiments can have any shape.

The shell and core of structure 60 are shown at 64 and 66, respectively. As shown, the layers of core 66 and the layers of shell 64 are co-planar. The AM technique allows the simultaneous fabrication of shell 64 and core 66, whereby for a particular formed layer, the inner part of the layer constitutes a layer of the core, and the periphery of the layer, or part thereof, constitutes a layer of the shell.

A peripheral section of a layer which contributes to shell 64 is referred to herein as an "envelope region" of the layer. In the non-limiting example of FIGS. 9A and 9B, each of layers 62 has an envelope region. Namely, each layer in FIGS. 9A and 9B contributes both to the core and to the shell. However, this need not necessarily be the case, since, for some applications, it may be desired to have the core exposed to the environment in some regions. In these applications, at least some of the layers do not include an envelope region. A representative example of such configuration is illustrated in the cross-sectional view of FIG. 9C, showing some layers 68 which contribute to the core but not to the shell, and some layers 70 which contribute to both the core and the shell. In some embodiments, one or more layers do not include a region with core thermo-mechanical properties and comprise only a region with shell thermo-mechanical properties. These embodiments are particularly useful when the structure has one or more thin parts, wherein the layers forming those parts of the structure are preferably devoid of a core region. A representative example of such a structure is illustrated in FIG. 11 described below. Also contemplated are embodiments in which one or more layers do not include a region with shell thermo-mechanical properties and comprise only a region with core thermo-mechanical properties.

The shell can, optionally and preferably, also cover structure 60 from above and/or below, relative to the z direction. In these embodiments, some layers at the top most and/or bottom most parts of structure 60 have at least one material property which is different from core 66. In various exemplary embodiments of the invention the top most and/or bottom most parts of structure 60 have the same material property as shell 64. A representative example of this embodiment is illustrated in FIG. 9D. The top/bottom shell of structure 60 may be thinner (e.g., 2 times thinner) than the side shell, e.g. when the top or bottom shell comprises a layer above or below the structure, and therefore has the same thickness as required for layers forming the object.

Figure 9E:
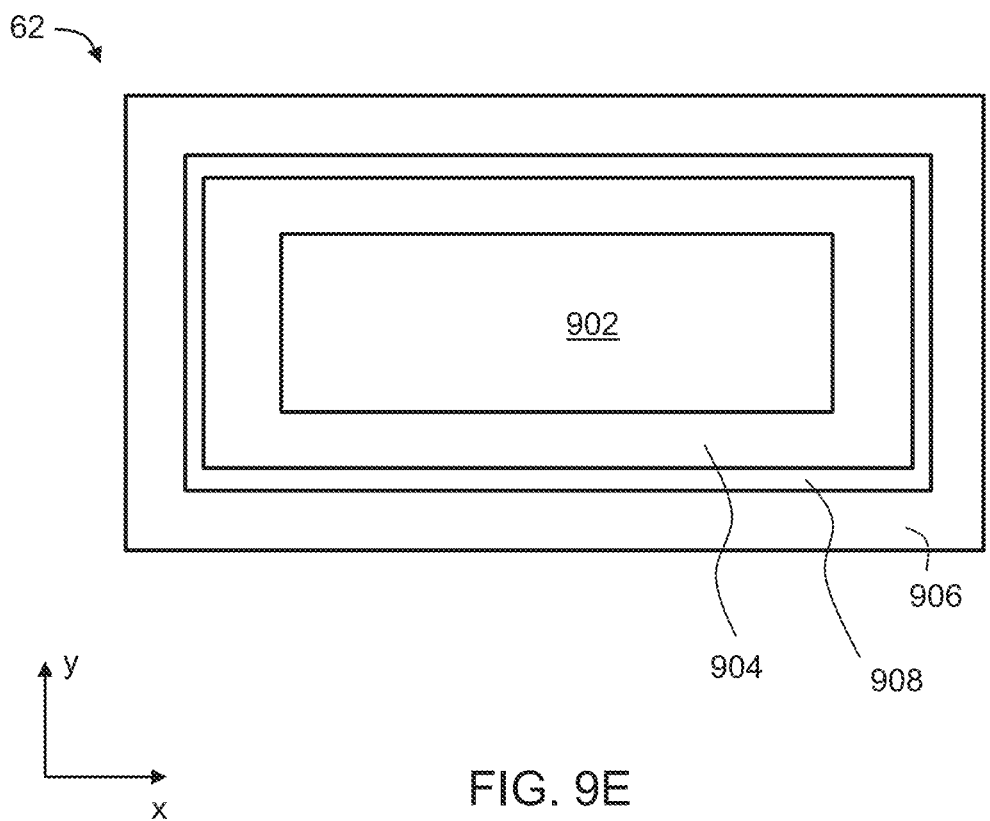

A representative example of a layer 62 suitable for some embodiments of the present invention is illustrated in FIG. 9E. In the schematic illustration of FIG. 9E, which is not to be considered as limiting, layer 62 has a core region 902, an inner envelope region 904, at least partially, more preferably completely, surrounding core region 902, and an outer envelope region 906, at least partially, more preferably completely, surrounding inner envelope region 904. Preferably, but not necessarily, outer envelope region 906 is the outermost region of layer 62.

Core region 902 preferably comprises a combination of at least two modeling formulations. The combination is optionally and preferably embodied in a voxelated manner wherein some voxels that form region 902 are made of one of the modeling material formulations, other voxels are made of another one of the modeling material formulations, and so on. In various exemplary embodiments of the invention core region 902 is made of a voxelated combination between a first modeling formulation and a second modeling formulation as described below. The voxelated combination can be according to any distribution by which voxels occupied by the first formulation are interlaced within voxels occupied by the second formulation, such as, but not limited to, a random distribution.

The ratio between the number of voxels within region 902 that are occupied by a first modeling formulation and the number of voxels within region 902 that are occupied by a second modeling formulation is optionally from about 0.25 to about 0.45, or from about 0.25 to about 0.4, or from about 0.3 to about 0.4, e.g., about 0.33. Other ratios, e.g., ratios in which the number of voxels within region 902 that are occupied by the first modeling formulation is equal to or larger (e.g., 1.5 times larger or 2 times larger or 2.5 times larger or 3 times larger) than the number of voxels within region 902 that are occupied by the second modeling are also contemplated in some embodiments. In any embodiment of the invention, including any embodiment that includes the above ratios, region 902 is optionally and preferably devoid of any material other than the first formulation and the second formulation described herein.

Further embodiments related to the ratio between the first modeling material formulation and the second modeling material formulation are provided hereinunder.

Inner envelope region 904 is preferably made of a single modeling formulation, for example, the first modeling formulation described below. Outer envelope region 906 is preferably made of a single modeling formulation, for example, the second modeling formulation described below.

The thickness of region 904, as measured within the plane of layer 62 and perpendicularly to the surface of structure 60, is preferably from about 0.1 mm to about 4 mm, or from about 0.1 mm to about 3.5 mm, or from about 0.1 mm to about 3 mm, or from about 0.1 mm to about 2.5 mm, or from about 0.1 mm to about 2 mm, or from about 0.2 mm to about 1.5 mm, or from about 0.3 mm to about 1.5 mm, or from about 0.4 mm to about 1.5 mm, or from about 0.4 mm to about 1.4 mm or from about 0.4 mm to about 1.3 mm or from about 0.4 mm to about 1.2 mm or from about 0.4 mm to about 1.1 mm. The thickness of region 906, as measured within the plane of layer 62 and perpendicularly to the surface of structure 60, is preferably from about from about 150 microns to about 600 microns, or from about from about 150 microns to about 550 microns, or from about from about 150 microns to about 500 microns, or from about from about 150 microns to about 450 microns, or from about from about 150 microns to about 400 microns, or from about from about 150 microns to about 350 microns, or from about 180 microns to about 320 microns, or from about 200 microns to about 300 microns, or from about 220 microns to about 280 microns, or from about 240 microns to about 260 microns.

In some embodiments of the present invention, layer 62 comprises an additional envelope region 908 between inner envelope region 904 and outer envelope region 906. Region 908 is preferably made of a combination, e.g., voxelated combination, of two or more modeling formulations. Typically, but not exclusively, region 908 is made of a voxelated combination including the modeling formulation making region 904 (the first modeling formulation in the above example) and the modeling formulation making region 906 (the second modeling formulation in the above example). It was found by the Inventors of the present invention that such configuration allows region 908 to serve as a stitching region that bonds region 906 to region 904.

The ratio between the number of voxels within region 908 that are occupied by the first modeling formulation and the number of voxels within region 902 that are occupied by the second modeling formulation is preferably from about 0.9 to about 1.1, e.g., about 1. In any embodiment of the invention, including any embodiment that includes these ratios, region 908 is optionally and preferably devoid of any material other than the first formulation and the second formulation described herein. The thickness of region 908, as measured within the plane of layer 62 and perpendicularly to the surface of structure 60, is preferably less than the thickness of region 904 and also less than the thickness of region 906. For example, the thickness of region 908 can be from about 70 microns to about 100 microns or from about 75 microns to about 95 microns or from about 80 microns to about 90 microns.

In some embodiments, one or more layers do not include a core region and comprise only envelope regions. These embodiments are particularly useful when the structure has one or more thin parts, wherein the layers forming those parts of the structure are preferably devoid of a core region. A representative example of such a structure is illustrated in FIG. 11, in which regions marked by dashed circles are devoid of core 902.

Figure 9F:
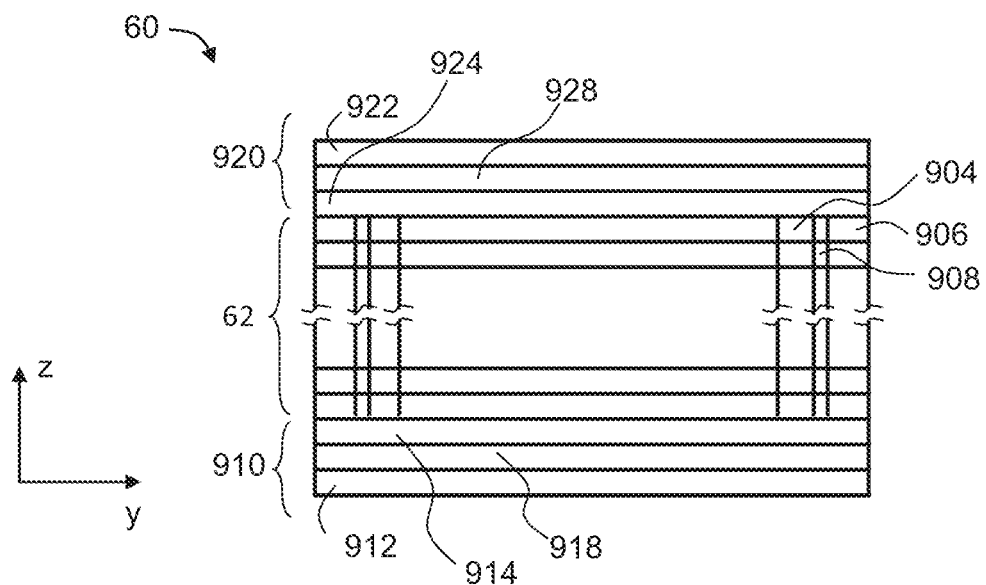

FIG. 9F is a schematic illustration of a side view of structure 60 in embodiments of the invention in which at least some of the layers 62 of structure 60 comprise core region 902, envelope regions 904 and 906 and optionally also an additional envelope region 908 between regions 904 and 906. In these embodiments structure 60 optionally and preferably comprises a base section 910 and/or a top section 920, each optionally and preferably comprises a plurality of layers.

The layers of sections 910 and 920 can be arranged such that one or more of the topmost layers 922 of top section 920 and one or more of the bottommost layers 912 of base section 910 are made of the same formulation at envelope region 906 described above. Alternatively, or more preferably additionally, the layers of sections 910 and 920 can be arranged such that one or more of the bottommost layers 924 of top section 920 and one or more of the topmost layers 914 of base section 910 are made of the same formulation at envelope region 904 described above. In some embodiments of the present invention at least one of base section 910 and top section 920 comprises one or more intermediate layers (respectively shown at 918, 928) that is made of the same or similar combination of formulations as region 908 described above.

For clarity of presentation, FIG. 9F shows a single layer for each of layers 912, 914, 918, 922, 924 and 928, however, this need not necessarily be the case, since, for some applications, at least one of these layers is embodied as a stack of layers. The number of layers in each stack is preferably selected such that the thickness, along the build direction (the z direction, in the present illustration) of the stack is a proximately the same as the thickness of the respective envelope region. Specifically, the number of layers in stacks 912 and 922 is preferably selected such that the overall thickness of these stacks along the build direction is approximately the same (e.g., within 10%) as the thickness of outer envelope region 906 as measured in the plane of layer 62 and perpendicularly to the surface of structure 60, the number of layers in stacks 914 and 924 is preferably selected such that the overall thickness of these stacks along the build direction is approximately the same (e.g., within 10%) as the thickness of inner envelope region 904 as measured in the plane of layer 62 and perpendicularly to the surface of structure 60, and the number of layers in stacks 918 and 928 is preferably selected such that the overall thickness of these stacks along the build direction is approximately the same (e.g., within 10%) as the thickness of additional envelope region 908 as measured in the plane of layer 62 and perpendicularly to the surface of structure 60, The present embodiments thus provide a method of layerwise fabrication of a three-dimensional object, in which for each of at least a few (e.g., at least two or at least three or at least 10 or at least 20 or at least 40 or at least 80) of the layers or all the layers, a building material comprising two or more modeling formulations is dispensed, optionally and preferably using system 10 or system 110. The building material, according to the present embodiments, comprises at least a first modeling material formulation and a second modeling material formulation, which are dispensed so as to form a core region using both the first and the second modeling material formulations, an inner envelope region at least partially surrounding the core region using the first modeling formulation but not the second modeling formulation, and an outer envelope region at least partially surrounding the inner envelope region using the second modeling formulations but not the first modeling formulation, as described herein in any of the respective embodiments. Each modeling formulation is preferably dispensed by jetting it out of a plurality of nozzles of a print head (e.g., print head 16). The dispensing is optionally and preferably in a voxelated manner.

The core region is optionally and preferably formed from a first modeling formulation as well as a second modeling formulation, as described herein in any of the respective embodiments. This is optionally and preferably, but not necessarily, achieved by interlacing voxels of the first modeling formulation and voxels of the second modeling formulation within the core according to a predetermined voxel ratio. In some embodiments of the present invention the amount of the first modeling formulation in the core region is 25%, or higher than 25% or higher than 26% or higher than 27% or higher than 28% or higher than 29% or higher than 30% of a total weight of core region. In some embodiments of the present invention the ratio between the weight of the first modeling formulation in the core region and the weight of the second modeling formulation in the core region is from about 0.1 to about 10, or from about 0.2 to about 5, or from about 0.2 to about 2, or from about 0.2 to about 1, or from about 0.2 to about 0.5, or from about 1 to about 10, or from about 2 to about 10, or from about 5 to about 10.

Once formed, the layer including the two modeling formulations is preferably exposed to a curing condition (e.g., curing energy) so as to harden the formulations. This is optionally and preferably executed using hardening device 324 or radiation source 18. Alternatively, a curing condition can be exposure to the environment and/or to a chemical reagent.

In some of any of the embodiments described herein, the building material further comprises a support material formulation.

In some of any of the embodiments described herein, dispensing a building material formulation (uncured building material) further comprises dispensing support material formulation(s) which form the support material upon application of curing energy.

Dispensing the support material formulation, in some embodiments, is effected by inkjet printing head(s) other than the inkjet printing heads used for dispensing the first and second (and other) compositions forming the modeling material.

In some embodiments, exposing the dispensed building material to a curing condition (e.g., curing energy) includes applying a curing condition (e.g., curing energy) that affects curing of a support material formulation, to thereby obtain a cured support material.

In some of any of the embodiments described herein, once a dispensed building material is cured, the method further comprises removing the cured support material. Any of the methods usable for removing a support material can be used, depending on the materials forming the modeling material and the support material. Such methods include, for example, mechanical removal of the cured support material and/or chemical removal of the cured support material by contacting the cured support material with a solution in which it is dissolvable (e.g., an alkaline aqueous solution).

As used herein, the term "curing" describes a process in which a formulation is hardened or solidifies, and is also referred to herein as "hardening". This term encompasses polymerization of monomer(s) and/or oligomer(s) and/or cross-linking of polymeric chains (either of a polymer present before curing or of a polymeric material formed in a polymerization of the monomers or oligomers). This term alternatively encompasses solidification of the formulation that does not involve polymerization and/or cross-linking.

The product of a curing reaction is typically a polymeric material and in some cases a cross-linked polymeric material. This term, as used herein, encompasses also partial curing, for example, curing of at least 20% or at least 30% or at least 40% or at least 50% or at least 60% or at least 70% of the formulation, as well as 100% of the formulation.

A "curing energy" typically includes application of radiation or application of heat, as described herein.

A curable material or formulation that undergoes curing upon exposure to electromagnetic radiation is referred to herein interchangeably as "photopolymerizable" or "photoactivatable" or "photocurable".

A curable material or formulation that undergoes curing upon exposure to UV radiation is referred to herein interchangeably as "UV-curable" or "UV-polymerizable".

When the curing energy comprises heat, the curing is also referred to herein and in the art as "thermal curing" and comprises application of thermal energy. Applying thermal energy can be effected, for example, by heating a receiving medium onto which the layers are dispensed or a chamber hosting the receiving medium, as described herein. In some embodiments, the heating is effected using a resistive heater.

In some embodiments, the heating is effected by irradiating the dispensed layers by heat-inducing radiation. Such irradiation can be effected, for example, by means of an IR lamp or Xenon lamp, operated to emit radiation onto the deposited layer.

In some of any of the embodiments described herein, the method further comprises exposing the cured or solidified modeling material, either before or after removal of a cured support material, if a support material formulation has been included in the building material, to a post-treatment condition. The post-treatment condition is typically aimed at further hardening the cured modeling material. In some embodiments, the post-treatment hardens a partially-cured material to thereby obtain a completely cured material.

In some embodiments, the post-treatment is effected by exposure to heat or radiation, as described in any of the respective embodiments herein. In some embodiments, when the condition is heat, the post-treatment can be effected for a time period that ranges from a few minutes (e.g., 10 minutes) to a few hours (e.g., 1-24 hours).

The post-treatment condition is also referred to herein as post hardening treatment of post curing treatment.

In some embodiments of the present invention, the layer, once formed and hardened, is subjected to a post hardening treatment. Preferably, the post hardening treatment is a thermal treatment, more preferably heating. In a preferred embodiment, the post curing treatment includes maintaining a temperature of at least 120° C., for a time period of at least 1 hour.

The term "post-treatment" is also referred to herein interchangeably as "post-curing treatment" or simply as "post-curing", or as "post-hardening treatment".

In some embodiments of the present invention the layers are exposed to heat, during the dispensing of the formulation and/or during the exposure to curing energy. This can be executed using heating system 706. The heating is preferably to a temperature which is below the HDT of the first modeling formulation, for example, at least 10° C. below the HDT of the first formulation. The heating can be to a temperature which above the HDT of the second modeling formulation. More preferably, the heating is to a temperature which is below (e.g., at least 10° C. below) the HDT of the first modeling formulation and above an HDT of second modeling formulation.

Typical temperatures to which the layer is heated, including, without limitation, at least 40° C., or from about 40° C. to about 60° C.

According to some of any of the embodiments described herein, each of the modeling material formulations comprises one or more curable materials.

Herein throughout, a "curable material" or a "solidifiable material" is a compound (e.g., monomeric or oligomeric or polymeric compound) which, when exposed to curing condition (e.g., curing energy), as described herein, solidifies or hardens to form a cured modeling material as defined herein. Curable materials are typically polymerizable materials, which undergo polymerization and/or cross-linking when exposed to suitable energy source.

In some of any of the embodiments described herein, a curable material is a photopolymerizable material, which polymerizes or undergoes cross-linking upon exposure to radiation, as described herein, and in some embodiments the curable material is a UV-curable material, which polymerizes or undergoes cross-linking upon exposure to UV-vis radiation, as described herein.

In some embodiments, a curable material as described herein is a polymerizable material that polymerizes via photo-induced radical polymerization.

In some of any of the embodiments described herein, a curable material can be a monomer, an oligomer or a short-chain polymer, each being polymerizable as described herein.

In some of any of the embodiments described herein, when a curable material is exposed to curing energy (e.g., radiation), it polymerizes by any one, or combination, of chain elongation and cross-linking.

In some of any of the embodiments described herein, a curable material is a monomer or a mixture of monomers which can form a polymeric modeling material upon a polymerization reaction, when exposed to curing energy at which the polymerization reaction occurs. Such curable materials are also referred to herein as monomeric curable materials.

In some of any of the embodiments described herein, a curable material is an oligomer or a mixture of oligomers which can form a polymeric modeling material upon a polymerization reaction, when exposed to curing energy at which the polymerization reaction occurs. Such curable materials are also referred to herein as oligomeric curable materials.

In some of any of the embodiments described herein, a curable material is a mixture of one or more monomers and one or more oligomers which can form a co-polymeric modeling material upon a polymerization reaction, when exposed to curing energy at which the polymerization reaction occurs.

In some of any of the embodiments described herein, a curable material, whether monomeric and/or oligomeric, can be a mono-functional curable material or a multi-functional curable material.

Herein, a mono-functional curable material comprises one functional group that can undergo polymerization when exposed to curing energy (e.g., radiation).

A multi-functional curable material comprises two or more, e.g., 2, 3, 4 or more, functional groups that can undergo polymerization when exposed to curing energy. Multi-functional curable materials can be, for example, di-functional, tri-functional or tetra-functional curable materials, which comprise 2, 3 or 4 groups that can undergo polymerization, respectively. The two or more functional groups in a multi-functional curable material are typically linked to one another by a linking moiety. When the linking moiety is an oligomeric moiety, the multi-functional group is an oligomeric multi-functional curable material.

Multi-functional curable materials typically effect cross-linking, for example, of polymeric chains formed of mono-functional or multi-functional curable materials, and can therefore function as cross-linking agents. It is to be noted that curable formulations described herein (e.g., first and/or second modeling formulations) can include such curable cross-linking agents, or, alternatively or in addition, non-curable cross-linking agents.

In some embodiments, at least some, or each of, the curable materials in each of the first and second formulations, are (meth)acrylic materials.

Hereinthroughout, the term "(meth)acrylic" or "(meth)acrylate" and diversions thereof encompasses both acrylic and methacrylic materials.

Acrylic and methacrylic materials encompass materials bearing one or more acrylate, methacrylate, acrylamide and/or methacrylamide group.

Each of the curable materials can independently be a monomer, an oligomer or a polymer (which may undergo, for example, cross-linking, when cured).

Each of the curable materials can independently be a mono-functional, or multi-functional material.

The curable materials included in the first and second formulations described herein may be defined by the properties provided by each material, when hardened. That is, the materials are defined by properties of a material formed upon exposure to curing energy, namely, upon polymerization. These properties (e.g., Tg), are of a polymeric material formed upon curing any of the described curable materials alone.

The present embodiments contemplate several types of formulations for each of the first and second modeling formulations that are dispensed to form the layers of the object, as described herein in any of the respective embodiments. Before providing a further detailed description of the modeling formulations according to some embodiments of the present invention, attention will be given to the advantages and potential applications offered thereby.

The present inventors have devised a layered manufacturing AM technology that allows building objects with improved thermo-mechanical properties, even when those properties are not possessed by any one of the modeling formulations used for fabricating the object. For example, embodiments of the present invention provide AM structures, more preferably structures manufactured by jetting two modeling formulations via 3D inkjet printing technology, with high temperature resistance as well as high toughness. Embodiments of the present invention also allow fabricating structures with, for example, high temperature resistance as well as low curling.

The present embodiments thus provide objects that are preferably fabricated by AM, more preferably by 3D inkjet printing technology, and that are characterized by HDT of at least 100° C., or at least 130° C., or at least 140° C. The present embodiments can provide objects that are preferably fabricated by AM, more preferably by 3D inkjet printing technology, and that are characterized by Izod notch impact resistance of at least 100 J/m or at least 110 J/m or at least 120 J/m or at least 130 J/m. The present embodiments can provide objects that are preferably fabricated by AM, more preferably by 3D inkjet printing technology, and that feature curling of less than 4 mm, or less than 3 mm.

In any of the methods and systems described herein, and objects formed thereby, at least a first modeling material formulation and a second modeling material formulation are utilized.

The present inventors have uncovered that using the layered structure as described herein in any of the respective embodiments allows, while selecting a first modeling material formulation and a second modeling material formulation that feature certain properties, can be used to provide at least a desired stiffness and strength of the obtained object. For example, increasing the content of the first formulation in the core region can increase the strength and stiffness of the fabricated object without increasing the HDT. In another example, increasing the content of the first formulation in the core region and/or selecting a first modeling formulation which features high Tg sum (as defined herein) can increase the damping of the core and optionally and preferably of the fabricated object.

The present inventors have devised a layered manufacturing SFF technology which permits building objects with improved thermo-mechanical properties, even when those properties are not possessed by any one of the modeling materials used for fabricating the object. For example, embodiments of the present invention permit fabricating structures with high temperature resistance as well as high toughness. In the field of SFF using thermosetting materials (e.g., UV curable materials) such properties are not possessed by any of the known modeling materials, since a modeling material with high temperature resistance is relatively brittle, whereas modeling material with high toughness has relatively low temperature resistance. Embodiments of the present invention also permit fabricating structures with, for example, high temperature resistance as well as low curling. Embodiments of the present invention also permit fabrication of structures based on elastomeric materials. For example, embodiments of the present invention permit the fabrication of an elastomeric structure with relatively fast return time as well as increased tear resistance (TR).

The modeling material can be a material contained in a particular container or cartridge of a solid freeform fabrication apparatus or a combination of modeling materials deposited from different containers of the apparatus. The modeling materials from which the core and the shell of the present embodiments are formed, may, by themselves, have the desired thermal and mechanical properties, according to one or more of the embodiments described above. This, however, need not necessarily be the case since the Inventors of the present invention have devised a technique for obtaining the desired properties from a combination of materials. This technique will now be explained.

Suppose, for example, that it is desired to have a core having a desired HDT. Suppose further that there is a commercially available modeling material formulation, denoted formulation A, which has an HDT which is more than the desired HDT, and another commercially available modeling material formulation, denoted formulation B, which has a HDT which is less than the desired HDT. According to some embodiments of the present invention the core is formed from both these modeling formulations, wherein for each layer of the structure, formulations A and B are interlaced over the core region of the layer in a voxelated manner, such as to provide a combination which is characterized by the desired HDT. Thus, rather than mixing the materials composing a formulation in advance using the mixture for forming the layer, the formulations A and B occupy different spatial locations which are laterally displaced from each other over the core region of the layer, wherein the elementary displacement unit of each of the materials is a single voxel. Such combination is referred to as digital material (DM). A representative example of a digital material is illustrated in FIG. 12, showing modeling formulations A and B which are interlaced over a region of a layer in a voxelated manner.

As a representative example, consider a formulation A characterized (when hardened) by HDT of about 40° C. and a formulation B characterized (when hardened) by HDT of about 75° C. When formulations A and B are deposited at a relative surface density ratio of A:B=3:1, namely three pixels of formulation A for each pixel of formulation B, a DM characterized, when hardened, by HDT of about 50° C. can be obtained. For any predetermined surface density ratio of the materials, a digital material can be formed for example, by ordered or random interlacing. Also contemplated are embodiments in which the interlacing is semi-random, for example, a repetitive pattern of sub-regions wherein each sub-region comprises random interlacing.

While the embodiments above were described with a particular emphasis to a DM for the core of the structure, it is to be understood that more detailed reference to the core is not to be interpreted as limiting the scope of the invention in any way. Specifically, any of the core and the shell can be formed from a DM.

In some optional embodiments of the invention the thickness of the shell, as measured in the x-y plane (perpendicularly to the build direction z) is non-uniform across the build direction. In other words, different layers of the structure may optionally have envelope regions of different widths. For example, the thickness of the shell along a direction parallel to the x-y plane can optionally be calculated as a percentage of the diameter of the respective layer along that direction, thus making the thickness dependent on the size of the layer. In some optional embodiments of the invention the thickness of the shell is non-uniform across a direction which is tangential to the outer surface of the shell and perpendicular to the build direction. In terms of the structure's layers, these optional embodiments correspond to an envelope region having a width which is non-uniform along the periphery of the respective layer.

In some optional embodiments of the present invention the shell of the structure, or part thereof, is by itself a shelled structure, comprising more than envelope region. Specifically in these optional embodiments, the structure comprises an inner core, at least partially surrounded by at least one intermediate envelope region, wherein the intermediate envelope(s) is surrounded by an outer envelope region. The thickness of the intermediate envelope region(s), as measured perpendicularly to the build direction, is optionally and preferably larger (e.g., 10 times larger) than the thickness of the outermost envelope region. In these embodiments, the intermediate envelope region(s) serves as a shell of the structure and therefore has the properties of the shell as further detailed hereinabove. The outermost envelope shell may optionally also serve for protecting the intermediate envelope(s) from breakage under load.

It was found by the present inventors that irregularity at the outermost interface of the intermediate envelope region and the outermost envelope may cause the appearance of cracks under load, such cracks spread into the shell and possibly into the core. In some optional embodiments of the invention the outermost envelope provides a protective covering to prevent or reduce propagation appearance cracks at the interface between the intermediate envelope and the outermost envelope regions. The outermost envelope can optionally also function to dissipate cracks starting at the outermost envelop-air interface. It was also found by the present inventors that while the capability of outermost envelope to impede cracks appearance at the envelope-envelop interface is related to the envelope-envelope materials moduli ratio, the capability of the outermost envelope to withstand crack propagation from the envelope-air interface, is related to the outermost envelope toughness. Thus, denoting the elastic modulus of the outermost envelope by $\varepsilon_1$, and the elastic modulus of the next-to-outermost envelope by $\varepsilon_2$, according to some optional embodiments of the present invention the ratio $\varepsilon_2/\varepsilon_1$ is from about 1.3 to about 5, and the impact resistance of the outermost envelope is at least 40 J/m or at least 50 J/m or at least 60 J/m or at least 70 J/m, e.g., about 80 J/m or more.

Any one or combination of the above optional mechanical and thermal properties can be achieved by a judicious selection of the properties and makeup of the modeling materials from which the core and shell are formed.

In some optional embodiments of the present invention the shell has lower stiffness than the core. In some experiments performed by the present inventors, it was found that improved thermo-mechanical properties can be obtained by selecting the elastic modulus ratio between two adjacent shells materials or between the shell (covering the core) material and the core material, to be from about 1 to about 20. In some embodiments, the ratio is from about 1.3 to about 5.

When it is desired to fabricate a structure with enhanced toughness, the material with the lowest modulus is optionally used as the outer shell material and the material with the higher modulus is optionally used as the inner shell or core material.

When it is desired to fabricate a structure with enhanced thermal resistance and reduced contribution to curling, the material with the higher modulus is optionally used as the shell and the material with the lower modulus is optionally used as the core. Also contemplated are optional embodiments in which an additional outermost shell is added, such that the structure has a core, and intermediate shell and an outermost shell characterized by low curling, high temperature resistance and high toughness, respectively.

According to some embodiments of the present invention, the first modeling material formulation and the second modeling material formulation are selected so as to differ from one another, when hardened, by at least one thermo-mechanical property. Using a combination of modeling material formulations which differ from one another, when hardened, by one or more thermo-mechanical properties within the layered structure as described herein in any of the respective embodiments allows obtaining a final object that features desirable properties in a controllable manner.

The first modeling formulation and the second modeling formulation can differ from one another by at least one of Heat Deflection Temperature (HDT), Izod Impact resistance, Tg sum, and elastic modulus or other tensile properties, as described herein.

As used herein, HDT refers to a temperature at which the respective formulation or combination of formulations deforms under a predetermined load at some certain temperature. Suitable test procedures for determining the HDT of a formulation or combination of formulations are the ASTM D-648 series, particularly the ASTM D-648-06 and ASTM D-648-07 methods. In various exemplary embodiments of the invention the core and shell of the structure differ in their HDT as measured by the ASTM D-648-06 method as well as their HDT as measured by the ASTM D-648-07 method. In some embodiments of the present invention the core and shell of the structure differ in their HDT as measured by any method of the ASTM D-648 series. In the majority of the examples herein, HDT at a pressure of 0.45 MPa was used.

As used herein, the term "Izod impact resistance" refers to the loss of energy per unit of thickness following an impact force applied to the respective formulation or combination of formulations. Suitable test procedures for determining the Izod impact resistance of a formulation or combination of formulations are the ASTM D-256 series, particularly the ASTM D-256-06 series. In some embodiments of the present invention the core and shell of the structure differ in their Izod impact resistance value as measured by any method of the ASTM D-256-06 series. It is noted that in the standard ASTM methods there is need to machinate a notch. However, in many cases, this process cuts the shell and exposes the core to the notch tip. Therefore, this standard method is less preferred for evaluating the impact resistance of a structure built according to some embodiments of the present invention. Preferred procedures for determining the impact resistance will now be described. These procedures are particularly useful when the AM includes comprises three-dimensional printing.

According to a first procedure, a test specimen is printed with a rectangular patch made of the shelling formulation or combination of formulations. The dimensions of the patch are calculated in such way that after the notch preparation (as required by the standard ASTM procedure) a 0.25 mm layer of the shelling formulation or combination of formulations remains complete.

According to a second procedure, a test specimen is printed with notch instead of cutting the notch after the specimen is printed. The orientation of the specimen on the tray is vertical, for example, in the Z-Y plane (referred to herein as "orientation F").

Tensile properties described herein (e.g., elastic modulus, elongation at failure, recovery) are determined in accordance with ASTM international standard (e.g., ASTM D638). Tensile testing characterizes an amount of tensile stress applied to the tested material as a function of tensile strain (increase in length due to tensile stress, as a percentage of the original length) of the material.

Herein throughout, the phrase "elastic modulus" refers to Young's modulus, as determined by response of a material to application of tensile stress.

The elastic modulus is determined as the gradient of stress as a function of strain over ranges of stress and strain wherein stress is a linear function of strain (e.g., from a stress and strain of zero, to the elastic proportionality limit, and optionally from zero strain to a strain which is no more than 50% of the elongation at failure).

The elongation at failure, which is also referred to herein and in the art as elongation at break, $\varepsilon_R$, is determined as the maximal strain (elongation) which can occur (upon application of tensile stress equal to the ultimate tensile strength) before failure of the tested material occurs (e.g., as rupture or necking).

Recovery is determined by releasing the tensile stress after subjecting the tested material as the ratio of the decrease in length to a prior strain after a material (e.g., elastic layer) is subjected to a prior strain which is almost equal to the elongation at failure (optionally about 90% of the elongation at failure, optionally about 95% of the elongation at failure, optionally about 98% of the elongation at failure, optionally about 99% of the elongation at failure, wherein the elongation at failure can be determined using an equivalent sample). Thus, for example, a material extended to an elongation at failure which is 200%, and which upon release of tensile stress returns to a state characterized by a strain of 20% relative to the original length, would be characterized as having a recovery of 90% (i.e., 200%−20% divided by 200%).

Herein, "Tg" refers to glass transition temperature defined as the location of the local maximum of the E" curve, where E" is the loss modulus of the material as a function of the temperature. Broadly speaking, as the temperature is raised within a range of temperatures containing the Tg temperature, the state of a material, particularly a polymeric material, gradually changes from a glassy state into a rubbery state.

Herein, "Tg range" is a temperature range at which the E" value is at least half its value (e.g., can be up to its value) at the Tg temperature as defined above.

Without wishing to be bound to any particular theory, it is assumed that the state of a polymeric material gradually changes from the glassy state into the rubbery within the Tg range as defined above. The lowest temperature of the Tg range is referred to herein as Tg(low) and the highest temperature of the Tg range is referred to herein as Tg(high).

In any of the embodiments described herein, the term "temperature higher than Tg" means a temperature that is higher than the Tg temperature, or, more preferably a temperature that is higher than Tg(high).

Herein, "Tg sum" describes the total calculated Tg of a formulation (e.g., a modeling formulation), as calculated by summing individual Tg values of polymeric components of the formulation. The summation is optionally and preferably a weight sum, wherein each Tg value is multiplied by the relative amount (e.g., weight percentage) of the respective polymeric components of first modeling formulation. The polymeric components can be the respective curable components that provide a polymeric component featuring a Tg, or non-curable polymeric components added to the formulation.

According to some of any of the embodiments described herein, an HDT of the first modeling material formulation, when hardened, is higher than an HDT of the second modeling material formulation, when hardened.

The HDT of the first modeling material formulation can be higher than the HDT of the second modeling material formulation by at least 10, or at least 20, or at least 30, or at least 40, or at least 50, or at least 60, or at least 70, or at least 80, or at least 90, or at least 100° C., including any intermediate values, and including any subranges between these values.

In some embodiments an HDT of the second modeling material formulation, when hardened, is lower than 50° C., and can be, for example, any value is the range of from about 30 to about 45° C., or from about 35 to about 45° C.

In some embodiments, an HDT of the first modeling material formulation, when hardened, is higher than 50° C., and can be, for example, higher than 60, or higher than 70, or higher than 80, preferably higher than 90, or higher than 100, or higher than 110° C., or even higher.

In some embodiments an HDT of the second modeling material formulation, when hardened, is lower than 50° C. and an HDT of the first modeling material formulation, when hardened, is higher than 50° C.

In some embodiments, an Izod Impact Resistance of the second modeling material formulation, when hardened, is higher than an Izod Impact Resistance of the first modeling material formulation, when hardened.

The Izod Impact Resistance of the second modeling material formulation, when hardened, can higher than the Izod Impact Resistance of the first modeling material formulation by, for example, at least 5, or at least 10, or at least 15, or at least 20, or at least 25, or at least 30, or at least 35, or at least 40, or at least 45, or at least 50, J/m, or more, including any intermediate values and subranges between these values.

In some embodiments, an Izod Impact Resistance of the second modeling material formulation, when hardened, is higher than 20, or higher than 25, or higher than 30, or higher than 35, or higher than 40, or higher than 45, J/m, or even higher, and can range, for example, from 40 to 120 J/m, including any intermediate value and subranges therebetween.

In some embodiments, an Izod Impact Resistance of the first modeling material formulation, when hardened, ranges, for example, from 10 to 40 J/m or from 10 to 30 J/m, or from 10 to 20 J/m, including any intermediate value and subranges therebetween.

In some embodiments, the first and second modeling material formulations are such that a ratio between elastic moduli of the first modeling material formulation and the second modeling formulation, when hardened, ranges from 1 to 20, or from 1 to 10, or from 1 to 5, or from 2 to 5, or from 2 to 3, or from 2.5 to 3, or from 2.7 to 2.9.

According to some embodiments of the invention the first modeling material formulation is characterized, when hardened, by at least one property selected from the group consisting of an impact resistance from about 10 J/m to about 20 J/m, a heat distortion temperature at 0.45 MPa from about 51° C. to about 150° C., a strain at break from about 2% to about 15%, elastic modulus from about 2.3 GPa to about 3.5 GPa, and glass transition temperature from about 70° C. to about 170° C.

According to some embodiments of the invention the second modeling material is characterized by at least one property selected from the group consisting of an impact resistance of about 45-120 J/m, a heat distortion temperature at 0.45 MPa of about 25 to 39° C., a strain at break of about 40 to 100%, elastic modulus of about 0.5 to 1.5 GPa, and glass transition temperature from about 25 to 40° C.

According to some embodiments of the invention the first modeling material formulation is characterized by at least one property selected from the group consisting of a tensile strength from about 3 MPa to about 5 MPa, a strain at break from about 45% to about 50%, tensile tear resistance from about 8 Kg/cm to about 12 Kg/cm, and glass transition temperature from about 0° C. to about 4° C.

According to some embodiments of the invention the second modeling material formulation is characterized by at least one property selected from the group consisting of a tensile strength from about 1 MPa to about 2 MPa, a strain at break higher than 50%, and glass transition temperature from about −12° C. to about 0° C.

According to some embodiments of the invention the first modeling material formulation is characterized by at least one property selected from the group consisting of heat distortion temperature from about 45° C. to about 51° C. and Izod impact resistance value from about 20 J/m to about 30 J/m.

According to some embodiments of the invention the first modeling material formulation is characterized by at least one property selected from the group consisting of heat distortion temperature at 0.45 MPa from about 34° C. to about 38° C. and Izod impact resistance value from about 40 J/m to about 50 J/m.

In some embodiments of the present invention the first modeling formulation is characterized, when hardened, by HDT of at least 90° C., in some embodiments of the present invention the second modeling formulation is characterized, when hardened, by Izod impact resistance (IR) value of at least 45 J/m, in some embodiments of the present invention the second modeling formulation is characterized, when hardened, by HDT lower than 50° C., or lower than 45° C., and in some embodiments of the present invention a ratio between elastic moduli of first and second modeling formulations, when hardened, is from about 2.7 to about 2.9.

According to some of any of the embodiments described herein the first modeling formulation is characterized by, features, or selected such that it features, when hardened, heat deflection temperature (HDT) of at least 90° C.

According to some of any of the embodiments described herein, the second modeling formulation is characterized by, features, or selected such that it features, when hardened, Izod impact resistance (IR) value of at least 45 J/m.

According to some of any of the embodiments described herein the first modeling formulation is characterized by, features, or selected such that it features, when hardened, heat deflection temperature (HDT) of at least 90° C., and the second modeling formulation is characterized by, features, or selected such that it features, when hardened, Izod impact resistance (IR) value of at least 45 J/m.

In some embodiments, the HDT of the first formulation, when hardened, is at least 100° C., or at least 110° C., or at least 120° C., or at least 130° C., or at least 135° C., or at least 140° C., or higher.

In some embodiments, the Impact resistance (Izod impact resistance) of the second formulation is at least 47, or at least 48, or a least 49, or at least 50, or at least 51, or at least 52, or at least 53, or at least 54, or at least 55, J/m, or higher.

In some of any of the embodiments described herein, the second modeling formulation is characterized by, or features, or selected so as to feature, when hardened, by HDT lower than 50° C., or lower than 45° C.

In some embodiments the HDT of the second formulation, when hardened, ranges from 30 to 50° C., or from 35 to 50° C., or from 38 to 50° C., or from 40 to 50° C., or from 40 to 48° C., or from 40 to 45° C., or from 30 to 45° C., or from 35 to 45° C., including any intermediate value and subranges therebetween.

In some of any of the embodiments described herein, the first and second formulations are characterized by, feature, or selected so as to feature, when hardened, a ratio between elastic moduli which is less than 3.

In some embodiments, the ratio ranges from 2.7 to 2.9.

It was found by the present inventors that the viscoelastic properties of the fabricated object can be controlled by judicious selection of the modeling formulations and/or ratio between the first and second first modeling formulations in the various regions of the object, particularly the core region. For example, a predetermined damping range of the core, the shell or the entire object can be obtained by selecting one or more parameters characterizing the weight percentage of the first modeling formulation in the core, and/or by selecting one or more parameters characterizing the first formulation. The damping range can be expressed, for example, using the phase lag δ between the stress and the strain of the core, the shell or the entire object, for a particular temperature range.

In some of any of the embodiments described herein, the first and second formulations are characterized by, feature, or selected so as to feature, when hardened, the tangent of the phase lag between the stress and the strain of the respective structure (core, shell or the entire object), is at least 0.25 at a temperature range of from about 70° C. to about 90° C., or at least 0.20 at a temperature range of from about 90° C. to about 110° C., or at least 0.15 at a temperature range of from about 110° C. to about 160° C., or at least 0.15 at a temperature range of from about 130° C. to about 160° C.]. Thus, for example, the first and second formulations can be selected so as to provide a desired damping performance at the environmental temperature at which a printed object is to be used.

The selected characteristic parameter can be the extent of cross linking of the first formulation (expressed, for example, by the relative amount of a cross linking component (e.g., a multi-functional curable component) in the first formulation). The selected characteristic parameter can alternatively or additionally be a total calculated Tg of the first formulation, as calculated by summing individual Tg values of chemical components of first formulation. The summation is optionally and preferably a weight sum, wherein each Tg value is multiplied by the relative amount (e.g., weight percentage) of the respective chemical components of first modeling formulation.

The selection of the characteristic parameter(s) can be achieved, for example, by a look-up table having a plurality of entries, each including a value indicative of the damping (e.g., the tangent of the phase δ) and a corresponding parameter or set of parameters (weight percentage of the first modeling formulation in the core, extent of cross linking, total calculated Tg, etc.) corresponding to the damping. The selection of the characteristic parameter(s) can alternatively or additionally be achieved by one or more calibration curves describing a value indicative of the damping as a function of the respective parameter. Representative examples of such calibration curves are provided in the Examples section that follows (see, FIGS. 13A-E).

In various exemplary embodiments of the invention the selection is performed by a data processor, e.g., data processor 24 or 154. For example, the operator can enter, via a user interface, the desired damping or damping range, and the processor can access a memory medium storing a digital representation of the look-up table or calibration curve, and display or automatically select the parameter or set of parameters that provide the desired damping or damping range. The selection can optionally and preferably be based on the type of modeling formulations that are loaded to the fabrication system (e.g., the type of modeling formulations in supply apparatus 330), so that the data processor selects only the parameters that are applicable to modeling formulations already loaded into the system. Alternatively, the operator can also enter via the user interface, the desired modeling formulation, in which case the data processor selects only the parameters that are applicable to the modeling formulation that was entered by the operator.

In some embodiments of the present invention the total calculated Tg value of the first modeling formulation is from about 100° C. to about 115° C., e.g., about 107° C.

In some embodiments of the present invention the total calculated Tg value of the first modeling formulation is from about 120° C. to about 135° C., e.g., about 127° C.

In some embodiments of the present invention the total calculated Tg value of the first modeling formulation is from about 140° C. to about 152° C., e.g., about 146° C.

In some embodiments of the present invention the first modeling formulation includes one or more mono-functional curable material each featuring a relatively high Tg (e.g., higher than 80, or higher than 85, or higher than 90, or higher than 100,° C., or higher, and at least one multi-functional curable material, typically featuring a relatively low Tg (e.g., lower than 0° C. or lower than −10, −20, −30° C.).

In some embodiments of the present invention the ratio between the total amount (e.g., weight percentage) of the one or more monofunctional curable material(s) and the multi-functional curable material is from about 2 to about 2.8, or from about 2.2 to about 2.6, e.g., about 2.4.

In some embodiments of the present invention the ratio between the total amount (e.g., weight percentage) of the one or more monofunctional curable material(s) and the multi-functional curable material is from about 5 to about 6, or from about 5.2 to about 5.8, e.g., about 5.5.

In some of any of the embodiments described herein, the first modeling formulation comprises one or more curable (meth)acrylic material (e.g., a monomer and/or an oligomer) characterized, when hardened, by Tg of at least 50° C.

In some of any of the embodiments described herein, the first modeling formulation comprises one or more curable (meth)acrylic material (e.g., a monomer and/or an oligomer) characterized, when hardened, by Tg of at least 80° C.

In some of any of the embodiments described herein, the first modeling material formulation comprises two or more curable materials, at least one of the curable materials is characterized, when hardened, by Tg of at least 80° C.

In some of any of the embodiments described herein, the first modeling formulation comprises one or more curable (meth)acrylic material (e.g., a monomer and/or an oligomer) characterized, when hardened, by a high Tg, e.g., a Tg of at least 100° C., or at least 110, or at least 120, or at least 130, or at least 140, or at least 150° C.

In some of any of the embodiments described herein, the first modeling material formulation comprises two or more curable (meth)acrylic materials, at least one of the materials is characterized, when hardened, by a high Tg as described herein.

In some of these embodiments, the curable material featuring such a high Tg is a monomer, and in some embodiments it is a bifunctional monomer.

In some embodiments, the curable material featuring such a high Tg is a methacrylate monomer.

A non-limiting, exemplary methacrylic monomer which is characterized, when hardened, by Tg higher than 150° C., and/or by a curing rate as described herein, is SR 843 (Tricyclodecanedimethanol dimethacrylate (TCDDMDMA)). An additional exemplary such material is sold under the brand name SR-423D. See, for example Table 1.

In some of any of the embodiments described herein, the first modeling material formulation comprises: a curable (meth)acrylic material (e.g., a monomer and/or an oligomer) characterized, when hardened, by Tg of at least 50° C.; a curable (meth)acrylic material (e.g., a monomer and/or an oligomer) characterized, when hardened, by Tg of at least 80° C.; and a curable (meth)acrylic material (e.g., a monomer and/or an oligomer) characterized, when hardened, by a high Tg, e.g., a Tg of at least 100° C., or at least 110, or at least 120, or at least 130, or at least 140, or at least 150° C.

In some of any of the embodiments described herein, the first modeling material formulation comprises a curable acrylic monomer characterized, when hardened, by Tg of at least 85° C.;

a curable methacrylic monomer characterized, when hardened, by Tg of at least 150° C.; and a curable (meth)acrylic oligomer, characterized, when hardened, by Tg of at least 50° C.

In some of any of the embodiments described herein, the first modeling material formulation comprises: at least one curable (meth)acrylic monomer; at least one curable (meth)acrylic oligomer; and optionally, at least one curable (meth)acrylic monomer characterized, when hardened, by Tg lower than 0° C., or lower.

In some of any of the embodiments described herein, the first modeling material formulation comprises: at least one curable (meth)acrylic monomer characterized, when hardened, by Tg of at least 85° C.; at least one curable (meth)acrylic monomer characterized, when hardened, by Tg of at least 150° C.; at least one curable (meth)acrylic oligomer, characterized, when hardened, by Tg of at least 50° C.; and optionally, at least one curable (meth)acrylic monomer characterized, when hardened, by Tg lower than 0° C.

In some of the embodiments in which the first modeling material formulation comprises two or more (e.g., three) types of curable materials, a concentration of each of the curable materials in the formulation independently ranges from 10 to 60% by weight of the total weight of the first formulation.

In some embodiments, acrylic monomers characterized, when hardened, by Tg higher than 85° C. include mono-functional, difunctional, other multifunctional acrylate monomers, and any mixture thereof. In some embodiments, the Tg of the acrylate monomers ranges from 86 to about 300° C.

The acrylate monomers featuring such Tg can be, for example, commonly used monofunctional acrylate monomers such as ACMO and IBOA; multifunctional acrylate monomers such as, for example, Tris (2-hydroxyethyl) isocyanurate triacrylate (THEICTA), commercially available under the name SE368; short-chain alkylene glycol-containing (ethoxylated) difunctional and trifunctional acrylate monomers such as, for example, DPGDA (commercially available under the name SR508), ethoxylated 3 trimethylolpropane triacrylate (TMP3EOTA), commercially available under the name SR454, and long-chain or high-carbon ring multifunctional acrylate monomers such as, for example, Tricyclodecanedimethanol diacrylate (TCDDMDA), commercially available under the name SR833S.

Exemplary acrylic monomers characterized, when hardened, by Tg higher than 85° C. include, but are not limited to, those presented in Table 1 hereinbelow. Any other acrylic monomer featuring the indicated Tg is contemplated. Those skilled in the art would readily recognize additional acrylate monomers featuring Tg higher than 85° C.

The acrylic monomer featuring the indicated Tg, when hardened, can be a mixture of two or more such monomers.

In some embodiments, the (meth)acrylic oligomer is characterized, when hardened, by Tg of at least 50° C., is or comprises an acrylic oligomer, or, alternatively a mixture of two or more acrylic monomers or of one or more acrylic monomers and one or more methacrylic monomers.

Exemplary such oligomers include, but are not limited to, polyester urethane acrylates, epoxy acrylates, modified (e.g., amine modified) epoxy acrylates and the like. Any other acrylic oligomer featuring the indicated Tg is contemplated. Those skilled in the art would readily recognize additional acrylate oligomers featuring Tg higher than 50° C.

In some embodiments, the first modeling formulation may further comprise at least one curable (meth)acrylic monomer which provides, when hardened, a flexible material, characterized by Tg lower than 0° C., or lower than −10° C., or lower than −20° C.

In some embodiments, the (meth)acrylic monomer characterized, when hardened, by Tg lower than −10 or −20° C., is or comprises an acrylic monomer, or, alternatively a mixture of two or more acrylic monomers or of one or more acrylic monomers and one or more methacrylic monomers.

Acrylic and methacrylic monomers featuring such low Tg include, for example, ethoxylated monofunctional, or preferably multifunctional (e.g., difunctional or trifunctional), as described herein in any of the respective embodiments.

Exemplary such flexible acrylic monomers are presented in Table 1 below. Any other flexible acrylic (or methacrylic) monomers are contemplated. Those skilled in the art would readily recognize additional acrylate monomers featuring low Tg as indicated.

Herein, an "ethoxylated" material describes an acrylic or methacrylic compound which comprises one or more alkylene glycol groups, or, preferably, one or more alkylene glycol chains, as defined herein. Ethoxylated (meth)acrylate materials can be monofunctional, or, preferably, multifunctional, namely, difunctional, trifunctional, tetrafunctional, etc.

In multifunctional materials, typically, each of the (meth)acrylate groups are linked to an alkylene glycol group or chain, and the alkylene glycol groups or chains are linked to one another through a branching unit, such as, for example, a branched alkyl, cycloalkyl, aryl (e.g., bisphenol A), etc.

In some embodiments, the ethoxylated material comprises at least 5 ethoxylated groups, that is, at least 5 alkylene glycol moieties or groups. Some or all of the alkylene glycol groups can be linked to one another to form an alkylene glycol chain. For example, an ethoxylated material that comprises 30 ethoxylated groups can comprise a chain of 30 alkylene glycol groups linked to one another, two chains, each, for example, of 15 alkylene glycol moieties linked to one another, the two chains linked to one another via a branching moiety, or three chains, each, for example, of 10 alkylene glycol groups linked to one another, the three chains linked to one another via a branching moiety. Shorter and longer chains are also contemplated.

In some embodiments, the ethoxylated material comprises at least 8, or at least 10, or at least 12, or at least 15, or at least 18, or at least 20, or at least 25, or at least 30 ethoxylated (alkylene glycol) groups. The ethoxylated material can comprise one, two or more poly(alkylene glycol) chains, of any length, as long as the total number of the alkylene glycol groups is as indicated.

In some embodiments, a concentration of the flexible (meth)acrylic monomer, if present, in the first formulation, ranges from 4 to 30, or from 4 to 25, or from 4 to 20, or from 4 to 15, or from 4.5 to 13.5 weight percents, of the total weight of the formulation, including any intermediate values and subranges therebetween.

In some embodiments, the flexible monomer is a multifunctional ethoxylated monomer as described herein, in which each of the (meth)acrylate groups are linked to an alkylene glycol group or chain, and the alkylene glycol groups or chains are linked to one another through a branching unit, such as, for example, a branched alkyl, cycloalkyl, aryl (e.g., bisphenol A), etc., as described in further detail hereinunder.

In some of any of the embodiments described herein, the first modeling formulation further comprises an additional curable (meth)acrylic monomer which provides, when hardened, a flexible material, characterized by Tg lower than 0° C., or lower than −10° C., or lower than −20° C.

In some embodiments, the additional flexible monomer is a di-functional monomer which comprises an alkylene glycol chain (a poly(alkylene glycol), as defined herein) that terminates at both ends by an acrylate or methacrylate group.

In some embodiments, the poly(alkylene glycol) chain features at least 5, preferably at least 10, e.g., from 10 to 15, alkylene glycol groups.

In some embodiments, the concentration of the additional flexible monomer as described herein ranges from 5 to 20, or from 5 to 15, weight percents, of the total weight of the formulation, including any intermediate values and subranges therebetween.

In some of any of the embodiments described herein, the first formulation comprises, as a flexible monomer having a low Tg as indicated herein only the material described herein as "an additional flexible monomer".

In some embodiments, the first formulation is used in combination with any second formulation that features, when hardened, Impact resistance value and/or HDT, as defined herein.

In some embodiments, the second modeling formulation comprises one or more curable materials, at least one of the curable materials being a flexible curable (meth)acrylic material (e.g., a monomer or an oligomer), preferably an acrylic monomer, characterized, when hardened, by Tg lower than 0° C., or lower than −10° C. or lower than −20° C., as described herein.

In some embodiments, the second modeling material formulation comprises at least one curable (meth)acrylic material, preferably an acrylic monomer, characterized, when hardened, by Tg of at least 50° C., or at least 60° C., or at least 70° C.

In some embodiments, the second modeling material formulation comprises at least one curable (meth)acrylic material, preferably an acrylic oligomer, characterized, when hardened, by Tg of at least 10° C.

In some embodiments, the second modeling material formulation comprises at least two curable materials, at least one of the curable materials being a (meth)acrylic monomer characterized, when hardened, by Tg lower than −20° C.

In some of these embodiments, the second modeling material formulation further comprises at least one curable (meth)acrylic monomer characterized, when hardened, by Tg of at least 70° C.

In some of these embodiments, the second modeling material formulation further comprises at least one curable (meth)acrylic oligomer characterized, when hardened, by Tg of at least 10° C. In some embodiments, the second modeling formulation comprises:

at least one curable (meth)acrylic, preferably acrylic, monomer characterized, when hardened, by Tg of at least 50, or at least 60, or at least 70° C.;

at least one curable (meth)acrylic, preferably acrylic, oligomer characterized, when hardened, by Tg of at least 10° C.; and at least one flexible curable (meth)acrylic, preferably acrylic, monomer characterized, when hardened, by Tg lower than 0, or lower than −10 or lower than −20° C., as described herein.

In some of any of the embodiments described herein, the second formulation comprises at least one flexible curable material, as described herein; at least one curable (meth)acrylic, preferably acrylic, monomer characterized, when hardened, by Tg of at least 50, 60 or 70° C.; and at least one curable (meth)acrylic, preferably acrylic, oligomer characterized, when hardened, by Tg of at least 10° C.

In some embodiments, the curable (meth)acrylic, preferably acrylic, monomer characterized, when hardened, by Tg of at least 50° C., is characterized by Tg of at least 85° C., when hardened, and include monofunctional and multifunctional monomers, and any mixture of such monomers, as described herein.

Curable (meth)acrylic oligomers characterized, when hardened, by Tg of at least 10° C., include monofunctional, and preferably multifunctional oligomers such as, but not limited to, polyester urethane acrylates, epoxy acrylates, modified epoxy acrylates, etc. Those skilled in the art would readily recognize oligomers featuring the indicated Tg.

In some embodiments, when the second formulation comprises two or more types of curable materials, the concentration of each curable material independently ranges from 10 to 50% by weight of the total weight of the second modeling formulation.

Modeling material formulations featuring thermo-mechanical features as described herein include commercially available formulations and formulations designed so as to feature the indicated thermo-mechanical properties.

In some embodiments of the present invention, the first and second modeling material formulations are selected such that when used for forming a layered structure as described herein in any of the respective embodiments, the core has an HDT which is below 60° C., 50° C. or below 40° C. or below 30° C. and the shell has an HDT which is above 60° C. or above 50° C. or above 40° C. or above 30° C., as measured by an ASTM standard method, as further detailed herein. In such embodiments, an object with relatively low curling and high temperature resistance can be obtained, the low HDT core is responsible for the low curling tendency and the high HDT of the shell contributes to high temperature resistance of the fabricated object.

In some embodiments, the core and shell of the fabricated structure differ in their heat distortion temperature (HDT) and/or Izod impact resistance (IR). For example, the IR characterizing the core can be lower than the IR characterizing the shell, and the HDT characterizing the core is can be higher than the HDT characterizing the shell. In this embodiment, the high HDT core induces high temperature resistance and the high IR of the shell imparts toughness to the entire object produced with such core-shell structure and materials. Optionally and preferably both relations are fulfilled for the same structure, namely the IR value is lower for the core region than for the shell, but the HDT is higher for the core region than for the shell.

In some embodiments of the present invention the core is made of a material characterized by a HDT at pressure of 0.45 MPa which is from about 40° C. to about 50° C. A representative example of a modeling material having such thermal properties is a modeling material marketed by Objet Geometries under the trade name VeroGray™. In some embodiments of the present invention the shell is made of a material characterized by an IR value of from about 40 J/m to about 50 J/m, e.g., about 40 J/m. A representative example of a modeling material having such thermal properties is a modeling material marketed by Objet Geometries under the trade name DurusWhite™.

In some embodiments of the present invention both the core and the shell are or include formulations or combination of formulations that provide rubber-like polymeric materials (e.g., elastomeric materials).

As used herein, the term "rubber-like material" refers to a material which is characterized by Tg which is significantly lower than room temperature. For example Tg of about 10° C. or less.

When the core and shell are made of a rubber-like material, the core material may have a lower elongation at break value $\varepsilon_R$ than the shell material, e.g. $\varepsilon_R$>1%. Preferably, there is a difference of at least 30% or at least at least 60% or at least 90% or at least 120% between the $\varepsilon_R$ of the core and the $\varepsilon_R$ of the shell. For example, when the core has an $\varepsilon_R$ value of 50% the shell has an $\varepsilon_R$ value which is at least 30% larger, namely an $\varepsilon_R$ value of 80% or more. Typically, but not necessarily, the $\varepsilon_R$ value of the shell is at least 100%.

In some embodiments of the present invention the core is made of a material characterized by TR of from about 2 Kg/cm to about 12 Kg/cm, e.g., about 4 Kg/cm or about 10 Kg/cm, and an $\varepsilon_R$ value of from about 45% to about 50%. In some embodiments, the material also possesses one or more of the following properties:

tensile strength of from about 1 MPa to about 5 MPa, e.g., about 2 MPa or about 4.36 MPa, and glass transition temperature from about −12° C. to about 4° C., e.g., about −10.7° C. or about 2.6° C. Representative examples of modeling materials having such thermal properties are modeling materials marketed by Objet Geometries under the trade names TangoBlack™ and TangoGray™.

In some embodiments of the present invention the shell is made of a material characterized by TR from about 2 Kg/cm to about 4 Kg/cm, e.g., about 3 Kg/cm, and an $\varepsilon_R$ value from about 200% to about 236%. In some embodiments, the material also possesses one or more of the following properties: tensile strength of from about 1 MPa to about 2 MPa, and glass transition temperature from about −12° C. to about −8° C. Representative examples of modeling materials having such thermal properties are modeling materials marketed by Objet Geometries under the trade names TangoBlack Plus™ and Tango Plus™.

According to some embodiments of the invention for at least one pair of regions in the layer, a heat deflection temperature (HDT) characterizing an inner region of the pair is above 50° C., and an HDT characterizing an outer region of the pair is below 50° C.

According to some embodiments of the invention for at least one pair of regions in the layer, an outer region of the pair has a lower elastic modulus than an inner region of the pair.

According to some embodiments of the invention for at least one pair of regions in the layer, an outer region of the pair has a higher elastic modulus than an inner region of the pair.

According to some embodiments of the invention for at least one pair of regions in the layer, an outer region of the pair has a higher elastic modulus than an inner region of the pair.

According to some embodiments of the invention for any pair of regions in the layer, an outer region of the pair has a lower elastic modulus than an inner region of the pair.

According to some embodiments of the invention a heat deflection temperature (HDT) characterizing the core region is below about 50° C. and an HDT characterizing at least one of the envelope regions is above about 50° C. According to some embodiments of the invention for at least one pair of envelope regions, an HDT characterizing an inner envelope region of the pair is above 50° C., and an HDT characterizing an outer envelope region of the pair is below 50° C. According to some embodiments of the invention for at least one pair of envelope regions, an HDT characterizing an inner envelope region of the pair is above 50° C., and an HDT characterizing an outer envelope region of the pair is below 50° C. According to some embodiments of the invention for at least one pair of regions in the layer, a characteristic HDT is higher for an outer region of the pair than for an inner region of the pair.

According to some embodiments of the invention each of the core and envelope regions being characterized by an elongation-at-break value ($\varepsilon_R$), when hardened, wherein the characteristic $\varepsilon_R$ is higher for any of the envelope regions than for the core region. According to some embodiments of the invention for any pair of regions in the layer, the characteristic $\varepsilon_R$ is higher for an outer region of the pair than for an inner region of the pair. According to some embodiments of the invention for at least one pair of regions in the layer, the characteristic $\varepsilon_R$ of an outer region of the pair is higher by at least 30% than the characteristic $\varepsilon_R$ of an inner region of the pair. According to some embodiments of the invention for at least one pair of regions in the layer, a characteristic $\varepsilon_R$ of an outer region of the pair is at least 30%, and a characteristic $\varepsilon_R$ of an inner region of the pair is from about 2% to about 15%.

According to some embodiments of the invention the first modeling material and the second modeling material are characterized by a glass transition temperature (Tg) which is below 10° C. According to some embodiments of the invention for at least one pair of regions in the layer, the characteristic $\varepsilon_R$ of an outer region of the pair is at least 200%, and the characteristic $\varepsilon_R$ of an inner region of the pair is from about 1% to about 100%. According to some embodiments of the invention a characteristic tensile tear resistance (TR) of the core region is lower than a characteristic TR of at least one of the envelope regions.

According to some embodiments of the invention each of the regions is characterized by an Izod impact resistance (IR) value and an HDT, when hardened, wherein for at least one pair of regions in the layer, an inner region of the pair is characterized a lower IR value and higher HDT value relative to an outer region of the pair. According to some embodiments of the invention the inner region is characterized by an IR value of about 20 J/m. According to some embodiments of the invention the outer region is characterized by IR value of at least 40 J/m. According to some embodiments of the invention the inner region is characterized by HDT of at least 60° C. According to some embodiments of the invention the inner region is characterized by HDT of at most 50° C.

According to some embodiments of the invention for at least one pair of regions in the layer, an inner region of the pair is characterized a higher IR value and higher HDT value relative to an outer region of the pair.

According to some embodiments of the invention for at least one pair of regions in the layer, an inner region of the pair is characterized a higher IR value and lower HDT value relative to an outer region of the pair.

In some of any of the embodiments described herein, each of the first and second modeling material formulations independently comprises a photoinitiator, for initiating the polymerization or cross-linking (curing) upon exposure to curing energy (e.g., radiation).

In some embodiments, the photoinitiator is a free-radical initiator.

A free radical photoinitiator may be any compound that produces a free radical on exposure to radiation such as ultraviolet or visible radiation and thereby initiates a polymerization reaction. Non-limiting examples of suitable photoinitiators include benzophenones (aromatic ketones) such as benzophenone, methyl benzophenone, Michler's ketone and xanthones; acylphosphine oxide type photo-initiators such as 2,4,6-trimethylbenzolydiphenyl phosphine oxide (TMPO), 2,4,6-trimethylbenzoylethoxyphenyl phosphine oxide (TEPO), monoacyl phosphine oxides (MAPO's) and bisacylphosphine oxides (BAPO's); benzoins and benzoin alkyl ethers such as benzoin, benzoin methyl ether and benzoin isopropyl ether and the like. Examples of photoinitiators are alpha-amino ketone, alpha-hydroxy ketone, monoacyl phosphine oxides (MAPO's) and bisacylphosphine oxide (BAPO's).

A free-radical photo-initiator may be used alone or in combination with a co-initiator. Co-initiators are used with initiators that need a second molecule to produce a radical that is active in the UV-systems. Benzophenone is an example of a photoinitiator that requires a second molecule, such as an amine, to produce a curable radical. After absorbing radiation, benzophenone reacts with a ternary amine by hydrogen abstraction, to generate an alpha-amino radical which initiates polymerization of acrylates. Non-limiting example of a class of co-initiators are alkanolamines such as triethylamine, methyldiethanolamine and triethanolamine.

In some embodiments, a concentration of the initiator in the first and/or the second modeling material formulation independently ranges from 0.5 to 5%, or from 1 to 5%, or from 2 to 5%, by weight of the total weight of the respective formulation.

In some of any of the embodiments described herein, the first and/or second modeling material formulation independently further comprises one or more additional materials, which are referred to herein also as non-reactive materials (non-curable materials).

Such agents include, for example, surface active agents (surfactants), inhibitors, antioxidants, fillers, pigments, dyes, and/or dispersants.

Surface-active agents may be used to reduce the surface tension of the formulation to the value required for jetting or for printing process, which is typically around 30 dyne/cm. Such agents include silicone materials, for example, organic polysiloxanes such as PDMS and derivatives therefore, such as those commercially available as BYK type surfactants.

Suitable dispersants (dispersing agents) can also be silicone materials, for example, organic polysiloxanes such as PDMS and derivatives therefore, such as those commercially available as BYK type surfactants.

Suitable stabilizers (stabilizing agents) include, for example, thermal stabilizers, which stabilize the formulation at high temperatures.

The term "filler" describes an inert material that modifies the properties of a polymeric material and/or adjusts a quality of the end products. The filler may be an inorganic particle, for example calcium carbonate, silica, and clay.

Fillers may be added to the modeling formulation in order to reduce shrinkage during polymerization or during cooling, for example, to reduce the coefficient of thermal expansion, increase strength, increase thermal stability, reduce cost and/or adopt rheological properties. Nanoparticles fillers are typically useful in applications requiring low viscosity such as ink-jet applications.

In some embodiments, a concentration of each of a surfactant and/or a dispersant and/or a stabilizer and/or a filler, if present, ranges from 0.01 to 2%, or from 0.01 to 1%, by weight, of the total weight of the respective formulation. Dispersants are typically used at a concentration that ranges from 0.01 to 0.1%, or from 0.01 to 0.05%, by weight, of the total weight of the respective formulation.

In some embodiments, the first and/or second formulation further comprises an inhibitor. The inhibitor is included for preventing or reducing curing before exposure to curing energy. Suitable inhibitors include, for example, those commercially available as the Genorad type, or as MEHQ. Any other suitable inhibitors are contemplated.

The pigments can be organic and/or inorganic and/or metallic pigments, and in some embodiments the pigments are nanoscale pigments, which include nanoparticles.

Exemplary inorganic pigments include nanoparticles of titanium oxide, and/or of zinc oxide and/or of silica. Exemplary organic pigments include nanosized carbon black.

In some embodiments, the pigment's concentration ranges from 0.1 to 2% by weight, or from 0.1 to 1.5%, by weight, of the total weight of the respective formulation.

In some embodiments, the first formulation comprises a pigment.

In some embodiments, combinations of white pigments and dyes are used to prepare colored cured materials.

The dye may be any of a broad class of solvent soluble dyes. Some non-limiting examples are azo dyes which are yellow, orange, brown and red; anthraquinone and triarylmethane dyes which are green and blue; and azine dye which is black.

Any of the first and/or second formulations described herein, in any of the respective embodiments and any combination thereof, can be provided within a kit, in which the first and second formulations are individually packaged.

In some embodiments, all the components of each formulation are packaged together. In some of these embodiments, the formulations are packaged in a packaging material which protects the formulations from exposure to light or any other radiation and/or comprise an inhibitor.

In some embodiments, the initiator is packaged separately from other components of each formulation, and the kit comprises instructions to add the initiator to the respective formulation.

The present inventors have devised a technique that further reduces the curling effect. In this technique, a structure, referred to herein as "a pedestal" is dispensed directly on the tray, and the layers that make up the object are thereafter dispensed on the pedestal. This embodiment is illustrated in FIGS. 10A-B.

FIG. 10A shows a side view of a pedestal 202 on tray 360 wherein the layers of an object 200 are dispensed on pedestal 202. Object 200 can comprise, or be, a shelled structure (e.g., structure 60), made of the first and second modeling formulations as further detailed hereinabove. Alternatively, object 200 can be a non-shelled structure, or a shelled structure (e.g., structure 60), made of other modeling formulation, such as a commercially available modeling formulation.

Pedestal 202 optionally and preferably serves to ease the removal of object from the printing tray and thus may help prevent deformation by manual or mechanical damage. Pedestal 202 can also improve the object's accuracy in the Z direction (height), and/or may improve an object's accuracy in the X-Y directions.

Pedestal 202 preferably comprises a support formulation that includes a support material. Preferably the support formulation is soluble in liquid, e.g., in water. In various exemplary embodiments of the invention pedestal 202 comprises a combination of support formulation and modeling formulation (e.g., any of the first and second modeling formulations described herein). Preferably, the modeling formulation within pedestal 202 is of low Izod impact resistance, for example, less than 40 J/m. The advantage of this embodiment is that it reduces the tendency of the pedestal to lift from the tray.

Inaccuracies in Z may occur at the lowest layers of the printed object. This may be because the top surface of the tray at Z start level (the Z level of the tray when printing starts) may not be exactly at a height which enables the leveling device to reach and thus level the first layers deposited in the printing process, when the leveling device may be at its lowest point (e.g., because of inaccuracy in adjustments and/or incomplete flatness and horizon of the tray). As a result, the lower layers of object 200 may not be leveled by the leveling device and therefore their thickness may be greater than the designed layer thickness, therefore increasing the height of object 200 as printed in contrast to the object as designed. The use of pedestal 202 under the lowest point of the object solves this problem by specifying that the height at which the printing of the actual object starts may be the height at which the pedestal itself may be significantly leveled by the leveling device.

In various exemplary embodiments of the invention pedestal 202 has a core-shell structure, in which the shell comprises spaced pillars of modeling formulation with support formulation in-between, and the core comprises only soluble (e.g., water soluble) support formulation, and is devoid of any non-soluble modeling formulation. These embodiments are illustrated in FIG. 10B which is a top view illustration of a typical layer of pedestal 202, having a pedestal core (shown as a core region 208 in FIG. 10B) and pedestal shell (shown as an envelope region 210 in FIG. 10B). The support formulation is shown at 204 (patterned filling) and the modeling formulation pillars are shown at 206 (white filling).

The advantage of forming a pedestal with core-shell structure as defined above is that it solves the problems of Z inaccuracies and curling while minimizing the use of modeling formulation, which is typically more expensive, and tends to leave visible remnants at the bottom of object 200.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Herein throughout, the term "object" describes a final product of the additive manufacturing. This term refers to the product obtained by a method as described herein, after removal of the support material, if such has been used as part of the building material. The "object" therefore essentially consists (at least 95 weight percents) of a hardened (e.g., cured) modeling material.

The term "object" as used herein throughout refers to a whole object or a part thereof.

Herein throughout, the phrases "building material formulation", "uncured building material", "uncured building material formulation", "building material" and other variations therefore, collectively describe the materials that are dispensed to sequentially form the layers, as described herein. This phrase encompasses uncured materials dispensed so as to form the object, namely, one or more uncured modeling material formulation(s), and uncured materials dispensed so as to form the support, namely uncured support material formulations.

Herein throughout, the phrase "cured modeling material" or "hardened modeling material" describes the part of the building material that forms the object, as defined herein, upon exposing the dispensed building material to curing, and, optionally, if a support material has been dispensed, also upon removal of the cured support material, as described herein. The cured modeling material can be a single cured material or a mixture of two or more cured materials, depending on the modeling material formulations used in the method, as described herein.

The phrase "cured modeling material" or "cured modeling material formulation" can be regarded as a cured building material wherein the building material consists only of a modeling material formulation (and not of a support material formulation). That is, this phrase refers to the portion of the building material, which is used to provide the final object.

Herein throughout, the phrase "modeling material formulation", which is also referred to herein interchangeably as "modeling formulation", "model formulation" "model material formulation" or simply as "formulation", describes a part or all of the building material which is dispensed so as to form the object, as described herein. The modeling material formulation is an uncured modeling formulation (unless specifically indicated otherwise), which, upon exposure to curing energy, forms the object or a part thereof.

In some embodiments of the present invention, a modeling material formulation is formulated for use in three-dimensional inkjet printing and is able to form a three-dimensional object on its own, i.e., without having to be mixed or combined with any other substance.

The phrase "digital materials", as used herein and in the art, describes a combination of two or more materials on a microscopic scale or voxel level such that the printed zones of a specific material are at the level of few voxels, or at a level of a voxel block. Such digital materials may exhibit new properties that are affected by the selection of types of materials and/or the ratio and relative spatial distribution of two or more materials.

In exemplary digital materials, the modeling material of each voxel or voxel block, obtained upon curing, is independent of the modeling material of a neighboring voxel or voxel block, obtained upon curing, such that each voxel or voxel block may result in a different model material and the new properties of the whole part are a result of a spatial combination, on the voxel level, of several different model materials.

Herein throughout, whenever the expression "at the voxel level" is used in the context of a different material and/or properties, it is meant to include differences between voxel blocks, as well as differences between voxels or groups of few voxels. In preferred embodiments, the properties of the whole part are a result of a spatial combination, on the voxel block level, of several different model materials.

The term "branching unit" as used herein describes a multi-radical, preferably aliphatic or alicyclic moiety, and optionally an aryl or heteroaryl moiety. By "multi-radical" it is meant that the branching unit has two or more attachment points such that it links between two or more atoms and/or groups or moieties.

That is, the branching unit is a chemical moiety that, when attached to a single position, group or atom of a substance, creates two or more functional groups that are linked to this single position, group or atom, and thus "branches" a single functionality into two or more functionalities.

In some embodiments, the branching unit is derived from a chemical moiety that has two, three or more functional groups. In some embodiments, the branching unit is a branched alkyl or a branched linking moiety as described herein.

As used herein the term "about" refers to ±10% or ±5%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein, the term "amine" describes both a —NR'R" group and a —NR'— group, wherein R' and R" are each independently hydrogen, alkyl, cycloalkyl, aryl, as these terms are defined hereinbelow.

The amine group can therefore be a primary amine, where both R' and R" are hydrogen, a secondary amine, where R' is hydrogen and R" is alkyl, cycloalkyl or aryl, or a tertiary amine, where each of R' and R" is independently alkyl, cycloalkyl or aryl.

Alternatively, R' and R" can each independently be hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, carbonyl, C-carboxylate, O-carboxylate, N-thiocarbamate, O-thiocarbamate, urea, thiourea, N-carbamate, O-carbamate, C-amide, N-amide, guanyl, guanidine and hydrazine.

The term "amine" is used herein to describe a —NR'R" group in cases where the amine is an end group, as defined hereinunder, and is used herein to describe a —NR'— group in cases where the amine is a linking group or is or part of a linking moiety.

The term "alkyl" describes a saturated aliphatic hydrocarbon including straight chain and branched chain groups. Preferably, the alkyl group has 1 to 30, or 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. The alkyl group may be substituted or unsubstituted. Substituted alkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine.

The alkyl group can be an end group, as this phrase is defined hereinabove, wherein it is attached to a single adjacent atom, or a linking group, as this phrase is defined hereinabove, which connects two or more moieties via at least two carbons in its chain. When the alkyl is a linking group, it is also referred to herein as "alkylene" or "alkylene chain".

Herein, a C(1-4) alkyl, substituted by a hydrophilic group, as defined herein, is included under the phrase "hydrophilic group" herein.

Alkene and Alkyne, as used herein, are an alkyl, as defined herein, which contains one or more double bond or triple bond, respectively.

The term "cycloalkyl" describes an all-carbon monocyclic ring or fused rings (i.e., rings which share an adjacent pair of carbon atoms) group where one or more of the rings does not have a completely conjugated pi-electron system. Examples include, without limitation, cyclohexane, adamantine, norbornyl, isobornyl, and the like. The cycloalkyl group may be substituted or unsubstituted. Substituted cycloalkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The cycloalkyl group can be an end group, as this phrase is defined hereinabove, wherein it is attached to a single adjacent atom, or a linking group, as this phrase is defined hereinabove, connecting two or more moieties at two or more positions thereof.

Cycloalkyls of 1-6 carbon atoms, substituted by two or more hydrophilic groups, as defined herein, is included under the phrase "hydrophilic group" herein.

The term "heteroalicyclic" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofurane, tetrahydropyrane, morpholino, oxalidine, and the like.

The heteroalicyclic may be substituted or unsubstituted. Substituted heteroalicyclic may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroalicyclic group can be an end group, as this phrase is defined hereinabove, where it is attached to a single adjacent atom, or a linking group, as this phrase is defined hereinabove, connecting two or more moieties at two or more positions thereof.

A heteroalicyclic group which includes one or more of electron-donating atoms such as nitrogen and oxygen, and in which a numeral ratio of carbon atoms to heteroatoms is 5:1 or lower, is included under the phrase "hydrophilic group" herein.

The term "aryl" describes an all-carbon monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The aryl group can be an end group, as this term is defined hereinabove, wherein it is attached to a single adjacent atom, or a linking group, as this term is defined hereinabove, connecting two or more moieties at two or more positions thereof.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furan, thiophene, imidazole, oxazole, thiazole, pyrazole, pyridine, pyrimidine, quinoline, isoquinoline and purine. The heteroaryl group may be substituted or unsubstituted. Substituted heteroaryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroaryl group can be an end group, as this phrase is defined hereinabove, where it is attached to a single adjacent atom, or a linking group, as this phrase is defined hereinabove, connecting two or more moieties at two or more positions thereof. Representative examples are pyridine, pyrrole, oxazole, indole, purine and the like.

The term "halide" and "halo" describes fluorine, chlorine, bromine or iodine.

The term "haloalkyl" describes an alkyl group as defined above, further substituted by one or more halide.

The term "sulfate" describes a —O—S(=O)$_2$—OR' end group, as this term is defined hereinabove, or an —O—S(=O)$_2$—O— linking group, as these phrases are defined hereinabove, where R' is as defined hereinabove.

The term "thiosulfate" describes a —O—S(=S)(=O)—OR' end group or a —O—S(=S)(=O)—O— linking group, as these phrases are defined hereinabove, where R' is as defined hereinabove.

The term "sulfite" describes an —O—S(=O)—O—R' end group or a —O—S(=O)—O— group linking group, as these phrases are defined hereinabove, where R' is as defined hereinabove.

The term "thiosulfite" describes a —O—S(=S)—O—R' end group or an —O—S(=S)—O— group linking group, as these phrases are defined hereinabove, where R' is as defined hereinabove.

The term "sulfinate" describes a —S(=O)—OR' end group or an —S(=O)—O— group linking group, as these phrases are defined hereinabove, where R' is as defined hereinabove.

The term "sulfoxide" or "sulfinyl" describes a —S(=O)R' end group or an —S(=O)— linking group, as these phrases are defined hereinabove, where R' is as defined hereinabove.

The term "sulfonate" describes a —S(=O)$_2$—R' end group or an —S(=O)$_2$— linking group, as these phrases are defined hereinabove, where R' is as defined herein.

The term "S-sulfonamide" describes a —S(=O)$_2$—NR'R" end group or a —S(=O)$_2$—NR'— linking group, as these phrases are defined hereinabove, with R' and R" as defined herein.

The term "N-sulfonamide" describes an R'S(=O)$_2$—NR"— end group or a —S(=O)$_2$—NR'— linking group, as these phrases are defined hereinabove, where R' and R" are as defined herein.

The term "disulfide" refers to a —S—SR' end group or a —S—S— linking group, as these phrases are defined hereinabove, where R' is as defined herein.

The term "phosphonate" describes a —P(=O)(OR')(OR") end group or a —P(=O)(OR')(O)— linking group, as these phrases are defined hereinabove, with R' and R" as defined herein.

The term "thiophosphonate" describes a —P(=S)(OR')(OR") end group or a —P(=S)(OR')(O)— linking group, as these phrases are defined hereinabove, with R' and R" as defined herein.

The term "phosphinyl" describes a —PR'R" end group or a —PR'— linking group, as these phrases are defined hereinabove, with R' and R" as defined hereinabove.

The term "phosphine oxide" describes a —P(=O)(R')(R") end group or a —P(=O)(R')— linking group, as these phrases are defined hereinabove, with R' and R" as defined herein.

The term "phosphine sulfide" describes a —P(=S)(R')(R") end group or a —P(=S)(R')— linking group, as these phrases are defined hereinabove, with R' and R" as defined herein.

The term "phosphite" describes an —O—PR'(=O)(OR") end group or an —O—PH(=O)(O)— linking group, as these phrases are defined hereinabove, with R' and R" as defined herein.

The term "carbonyl" or "carbonate" as used herein, describes a —C(=O)—R' end group or a —C(=O)— linking group, as these phrases are defined hereinabove, with R' as defined herein.

The term "thiocarbonyl" as used herein, describes a —C(=S)—R' end group or a —C(=S)— linking group, as these phrases are defined hereinabove, with R' as defined herein.

The term "oxo" as used herein, describes a (=O) group, wherein an oxygen atom is linked by a double bond to the atom (e.g., carbon atom) at the indicated position.

The term "thiooxo" as used herein, describes a (=S) group, wherein a sulfur atom is linked by a double bond to the atom (e.g., carbon atom) at the indicated position.

The term "oxime" describes a =N—OH end group or a =N—O— linking group, as these phrases are defined hereinabove.

The term "hydroxyl" describes a —OH group.

The term "alkoxy" describes both an —O-alkyl and an —O-cycloalkyl group, as defined herein.

The term "aryloxy" describes both an —O-aryl and an —O-heteroaryl group, as defined herein.

The term "thiohydroxy" describes a —SH group. The term "thioalkoxy" describes both a —S-alkyl group, and a —S-cycloalkyl group, as defined herein.

The term "thioaryloxy" describes both a —S-aryl and a —S-heteroaryl group, as defined herein.

The "hydroxyalkyl" is also referred to herein as "alcohol", and describes an alkyl, as defined herein, substituted by a hydroxy group.

The term "cyano" describes a —C≡N group.

The term "isocyanate" describes an —N=C=O group.

The term "isothiocyanate" describes an —N=C=S group.

The term "nitro" describes an —NO$_2$ group. The term "acyl halide" describes a —(C=O)R"" group wherein R"" is halide, as defined hereinabove.

The term "azo" or "diazo" describes an —N=NR' end group or an —N=N— linking group, as these phrases are defined hereinabove, with R' as defined hereinabove.

The term "peroxo" describes an —O—OR' end group or an —O—O— linking group, as these phrases are defined hereinabove, with R' as defined hereinabove.

The term "carboxylate" as used herein encompasses C-carboxylate and O-carboxylate.

The term "C-carboxylate" describes a —C(=O)—OR' end group or a —C(=O)—O— linking group, as these phrases are defined hereinabove, where R' is as defined herein.

The term "O-carboxylate" describes a —OC(=O)R' end group or a —OC(=O)— linking group, as these phrases are defined hereinabove, where R' is as defined herein.

A carboxylate can be linear or cyclic. When cyclic, R' and the carbon atom are linked together to form a ring, in C-carboxylate, and this group is also referred to as lactone. Alternatively, R' and O are linked together to form a ring in O-carboxylate. Cyclic carboxylates can function as a linking group, for example, when an atom in the formed ring is linked to another group.

The term "thiocarboxylate" as used herein encompasses C-thiocarboxylate and O-thiocarboxylate.

The term "C-thiocarboxylate" describes a —C(=S)—OR' end group or a —C(=S)—O— linking group, as these phrases are defined hereinabove, where R' is as defined herein.

The term "O-thiocarboxylate" describes a —OC(=S)R' end group or a —OC(=S)— linking group, as these phrases are defined hereinabove, where R' is as defined herein.

A thiocarboxylate can be linear or cyclic. When cyclic, R' and the carbon atom are linked together to form a ring, in C-thiocarboxylate, and this group is also referred to as thiolactone. Alternatively, R' and O are linked together to form a ring in O-thiocarboxylate. Cyclic thiocarboxylates can function as a linking group, for example, when an atom in the formed ring is linked to another group.

The term "carbamate" as used herein encompasses N-carbamate and O-carbamate.

The term "N-carbamate" describes an R"OC(=O)—NR'— end group or a —OC(=O)—NR'— linking group, as these phrases are defined hereinabove, with R' and R" as defined herein.

The term "O-carbamate" describes an —OC(=O)—NR'R" end group or an —OC(=O)—NR'— linking group, as these phrases are defined hereinabove, with R' and R" as defined herein.

A carbamate can be linear or cyclic. When cyclic, R' and the carbon atom are linked together to form a ring, in O-carbamate. Alternatively, R' and O are linked together to form a ring in N-carbamate. Cyclic carbamates can function as a linking group, for example, when an atom in the formed ring is linked to another group.

The term "carbamate" as used herein encompasses N-carbamate and O-carbamate.

The term "thiocarbamate" as used herein encompasses N-thiocarbamate and O-thiocarbamate.

The term "O-thiocarbamate" describes a —OC(=S)—NR'R" end group or a —OC(=S)—NR'— linking group, as these phrases are defined hereinabove, with R' and R" as defined herein.

The term "N-thiocarbamate" describes an R"OC(=S)NR'— end group or a —OC(=S)NR'— linking group, as these phrases are defined hereinabove, with R' and R" as defined herein.

Thiocarbamates can be linear or cyclic, as described herein for carbamates.

The term "dithiocarbamate" as used herein encompasses S-dithiocarbamate and N-dithiocarbamate.

The term "S-dithiocarbamate" describes a —SC(=S)—NR'R" end group or a —SC(=S)NR'— linking group, as these phrases are defined hereinabove, with R' and R" as defined herein.

The term "N-dithiocarbamate" describes an R"SC(=S)NR'— end group or a —SC(=S)NR'— linking group, as these phrases are defined hereinabove, with R' and R" as defined herein.

The term "urea", which is also referred to herein as "ureido", describes a —NR'C(=O)—NR"R'" end group or a —NR'C(=O)—NR"— linking group, as these phrases are defined hereinabove, where R' and R" are as defined herein and R'" is as defined herein for R' and R".

The term "thiourea", which is also referred to herein as "thioureido", describes a —NR'—C(=S)—NR"R'" end group or a —NR'—C(=S)—NR"— linking group, with R', R" and R'" as defined herein.

The term "amide" as used herein encompasses C-amide and N-amide.

The term "C-amide" describes a —C(=O)—NR'R" end group or a —C(=O)—NR'— linking group, as these phrases are defined hereinabove, where R' and R" are as defined herein.

The term "N-amide" describes a R'C(=O)—NR"— end group or a R'C(=O)—N— linking group, as these phrases are defined hereinabove, where R' and R" are as defined herein.

An amide can be linear or cyclic. When cyclic, R' and the carbon atom are linked together to form a ring, in C-amide, and this group is also referred to as lactam. Cyclic amides can function as a linking group, for example, when an atom in the formed ring is linked to another group.

The term "guanyl" describes a R'R"NC(=N)— end group or a —R'NC(=N)— linking group, as these phrases are defined hereinabove, where R' and R" are as defined herein.

The term "guanidine" describes a —R'NC(=N)—NR"R'" end group or a —R'NC(=N)—NR"— linking group, as these phrases are defined hereinabove, where R', R" and R'" are as defined herein.

The term "hydrazine" describes a —NR'—NR"R'" end group or a —NR'—NR"— linking group, as these phrases are defined hereinabove, with R', R", and R'" as defined herein.

As used herein, the term "hydrazide" describes a —C(=O)—NR'—NR"R'" end group or a —C(=O)—NR'—NR"— linking group, as these phrases are defined hereinabove, where R', R" and R'" are as defined herein.

As used herein, the term "thiohydrazide" describes a —C(=S)—NR'—NR"R'" end group or a —C(=S)—NR'—NR"— linking group, as these phrases are defined hereinabove, where R', R" and R'" are as defined herein.

As used herein, the term "alkylene glycol" describes a —O—[(CR'R")$_z$—O]$_y$—R'" end group or a —O—[(CR'R")$_z$—O]$_y$— linking group, with R', R" and R'" being as defined herein, and with z being an integer of from 1 to 10, preferably, from 2 to 6, more preferably 2 or 3, and y being an integer of 1 or more. Preferably R' and R" are both hydrogen. When z is 2 and y is 1, this group is ethylene glycol. When z is 3 and y is 1, this group is propylene glycol. When y is 2-4, the alkylene glycol is referred to herein as oligo(alkylene glycol).

When y is greater than 4, the alkylene glycol is referred to herein as poly(alkylene glycol). In some embodiments of the present invention, a poly(alkylene glycol) group or moiety can have from 10 to 200 repeating alkylene glycol units, such that z is 10 to 200, preferably 10-100, more preferably 10-50.

The term "silanol" describes a —Si(OH)R'R" group, or —Si(OH)$_2$R' group or —Si(OH)$_3$ group, with R' and R" as described herein.

The term "silyl" describes a —SiR'R"R'" group, with R', R" and R'" as described herein.

As used herein, the term "urethane" or "urethane moiety" or "urethane group" describes a Rx-O—C(=O)—NR'R" end group or a —Rx-O—C(=O)—NR'— linking group, with R' and R" being as defined herein, and Rx being an alkyl, cycloalkyl, aryl, alkylene glycol or any combination thereof. Preferably R' and R" are both hydrogen.

The term "polyurethane" or "oligourethane" describes a moiety that comprises at least one urethane group as described herein in the repeating backbone units thereof, or at least one urethane bond, —O—C(=O)—NR'—, in the repeating backbone units thereof.

It is expected that during the life of a patent maturing from this application many relevant curable materials featuring properties (e.g., Tg when hardened) as described herein, will be developed, and the scope of the respective curable materials is intended to include all such new materials a priori.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Materials and Methods

3D Inkjet printing of shelled objects is performed using Objet C2, C3 Systems, in a DM mode (e.g., a DM mode referred to as DM 5160 or 5130), according to the method described in U.S. Patent Application having Publication No. 2013/0040091. Generally, all printed objects are comprised of a core made of the first formulation (RF, Part A) and the second formulation (DLM, Part B), at a ratio as indicated, and two shells, wherein one shell comprises the first formulation, and another shell comprises the second formulation, as described herein for a layered structure.

HDT measurements are performed on Ceast vicat/HDT instrument according to ASTM D-648-06.

Print deformations (curling) are quantitatively assessed using a 230×10×10 mm printed bar. Upon printing, the bar is left within the printing system, in a closed cabinet, for 1 hour, and is thereafter stored at room temperature for 24 hours. The bar is then placed on a flat plane (flat table) and curling is measured by putting weight on one side of the bar and measuring the height of the bar edge from the plane in mm. For this study an elevation of 4 mm or less is considered as acceptable for most mainstream applications.

Tray temperature is measured directly by using Thermocouple connected to data logger apparatus.

Measurements of other properties were performed according to standard protocols, unless otherwise indicated.

All reagents and materials composing the modeling material formulations are obtained from known vendors.

Example 1

Exemplary Modeling Material Formulations

The following formulations present exemplary formulations successfully practiced in AM of layered objects featuring a layered structure as described herein in any of the respective embodiments.

A First Formulation:

Table 1 below presents exemplary materials suitable for inclusion in the first (Part A, RF) formulation, according to some embodiments of the present invention:

TABLE 1

| Component | Exemplary Materials | Percentage (%) |
|---|---|---|
| Curable acrylic monomer, characterized, when hardened, by Tg > 85° C. | ACMO (CAS: 5117-12-4) (Tg = 88° C.) IBOA (CAS: 5888-33-5) (Tg = 95° C.) SR 833S (CAS: 42594-17-2) (Tg = 185° C.) SR454 ethoxylated (3) TMPTA (CAS: 28961-43-5) (Tg = 103° C.) SR508 (CAS 57472-68-1) (Tg = 104° C.) SR368 (CAS: 40220-08-4) (Tg = 272° C.) | 10-40 |
| Curable Methacrylic monomer, characterized, when hardened, by Tg > 150° C. | SR 834 (CAS: 43048-08-4) SR-423D (CAS: 7534-94-3) | 35-50 |
| (Meth)acrylic Oligomer, characterized, when hardened, by Tg > 50° C. | BR-441 (Di functional Aliphatic polyester urethane Acrylate) (Tg = 71° C.) PH 6019 (Trifunctional Aliphatic urethane acrylate) (Tg = 51° C.) Eb3703 amine modified epoxy Diacrylate (Tg = 57° C.) | 10-40 |
| (Meth)acrylic flexible monomer, Having low Tg < −20° C | SR 9036 (Ethoxylated (30) bisphenol A dimethacrylate) (CAS: 41637-38-1) (Tg = −43° C.) SR415 (Ethoxylated (20) Trimethylol propane triacrylate) (CAS: 28961-43-5) (Tg = −40° C.) SR 9035 (Ethoxylated (15) Trimethylol propane triacrylate) (Tg = −30° C.) SR610 (Poly(ethylene glycol) (600) diacrylate) (Tg = −40° C.) | 5-30 |
| Photoinitiator | BAPO type (Bis Acyl Phosphine Oxide) Alpha Hydroxy ketone MAPO (Monoacylphosphine oxides) | 0.5-5 |
| Surfactant | BYK Type (PDMS derivatives) | 0.01-1 |
| Dispersing agent | BYK Type (PDMS derivatives) | 0.01-1 |
| Inhibitor | MEHQ Genorad Type | 0.1-1 |
| Inorganic Pigment | Nano scale Titanium Oxide Nano scale Zirconium Oxide Nano Silica | 0.1-0.3 |
| Organic pigment | Nano scale Carbon black | 0.1-0.15 |

Tables 2 and 3 below present chemical compositions of exemplary formulations suitable for use as the first formulation (RF), also referred to as RGD531 (Table 2), and GR-71-black2 or RF71 (Table 3A). Table 3B below presents a chemical composition of an exemplary RF formulation which comprises 90% by weight of a formulation referred to herein as RF71, to which 10% by weight of SR-610, as an exemplary additional flexible monomer, was added, and which is referred to herein as RF71*.

TABLE 2

| Material | Wt. percentage (%) |
|---|---|
| Mono functional Acrylic monomer Tg > 85° C. | 10-30 |
| Methacrylic monomer, Tg > 150° C. | 5-20 |
| Polyester based Urethane Acrylate | 5-20 |
| (Meth)acrylic Oilgomer, Tg > 50° C. | 10-20 |
| Acrylic multi functional monomer Tg > 85° C. | 20-30 |
| Inhibitor | 0.1-0.3 |
| Photoinitiator | 0.5-3 |
| Surfactant | 0.01-1 |

TABLE 2-continued

| Material | Wt. percentage (%) |
| --- | --- |
| Epoxy Acrylate | 1-5 |
| Dispersing agent | 0.01-0.05 |
| Inorganic pigment nanoscale | 0.2-0.6 |

TABLE 3A

| Material | Wt. percentage (%) |
| --- | --- |
| Mono functional Acrylic monomer Tg > 85° C. | 10-30 |
| Multi functional Acrylic monomer Tg > 85° C. | 10-20 |
| SR 834 | ≥35% |
| (Meth)acrylic Oligomer, Tg > 50° C. | 10-20 |
| (Meth)acrylic flexible monomer, Having low Tg < −20° C. | 5-15 |
| Inhibitor | 0.1-0.3 |
| Photoinitiator | 2-5 |
| Surfactant | 0.01-1 |
| Dispersant | 0.01-1 |
| Organic pigment | 0.5-0.15 |

TABLE 3B

| Material | Wt. percentage (%) |
| --- | --- |
| Mono functional Acrylic monomer Tg > 85° C. | 9-27 |
| Multi functional Acrylic monomer Tg > 85° C. | 9-18 |
| SR 834 | ≥32% |
| (Meth)acrylic Oligomer, Tg > 50° C. | 9-18 |
| (Meth)acrylic flexible monomer, Having low Tg < −20° C. | 4.5-13.5 |

TABLE 3B-continued

| Material | Wt. percentage (%) |
| --- | --- |
| Inhibitor | 0.09-0.3 |
| Photoinitiator | 1.8-4.5 |
| Surfactant | 0.01-1 |
| Dispersant | 0.01-1 |
| Organic pigment | 0.5-0.15 |
| An additional (Meth)acrylic flexible monomer, Having low Tg < −20° C. | 5-15 |

Table 4 below presents the chemical composition of an additional exemplary Part A formulation (RF4w).

TABLE 4

| Material | Wt. percentage (%) |
| --- | --- |
| Mono functional Acrylic monomer Tg > 85° C. | 10-30 |
| Multi functional Acrylic monomer Tg > 85° C. | 10-30 |
| SR834 | <35% |
| Polyester Urethane Acrylate | 5-15 |
| (Meth)acrylic flexible monomer, Having low Tg < −20° C. | 10-30 |
| Inhibitor | 0.1-0.3 |
| Photoinitiator | 1-5 |
| Surfactant | 0.01-1 |
| Dispersant | 0.01-1 |
| Inorganic pigment | 0.5-1 |

The Second Formulation:

Table 5 below presents exemplary materials suitable for inclusion in the second (Part B, DLM) formulation, according to some embodiments of the present invention:

TABLE 5

| Material | Examples | Percentage (%) |
| --- | --- | --- |
| Curable (meth)acrylic monomer, characterized, when hardened, by Tg > 85° C. | ACMO (CAS: 5117-12-4) (Tg = 88° C.)<br>IBOA(CAS: 5888-33-5) (Tg = 95° C.)<br>SR 833S (CAS: 42594-17-2) (Tg = 185° C.)<br>SR454 ethoxylated (3) TMPTA (CAS 28961-43-5) (Tg = 103° C.)<br>SR508 (CAS 57472-68-1) (Tg = 104° C.)<br>SR368 (CAS 40220-08-4) (Tg = 272° C.)<br>SR423 (CAS 7534-94-3) (Tg = 110° C.) | 10-50 |
| Curable (meth)acrylic oligomer characterized, when hardened, by Tg > 10° C. | CN-991 (Aliphatic polyester based Urethane diacrylate) (Tg = 40° C.)<br>PH 6019 Aliphatic Urethane TriAcrylate (Tg = 51° C.)<br>Eb3708 (Modified bisphenol-A epoxy diacrylate) (Tg = 21° C.) | 10-50 |
| Curable ethoxylated trifunctional (meth)acrylic monomer, characterized, when hardened, by Tg < −20° C. | SR 9036 (Ethoxylated (30) bisphenol A dimethacrylate) (CAS 41637-38-1) (Tg = −43° C.)<br>SR415 (Ethoxylated (20) Trimethylol propane triacrylate) (CAS 28961-43-5, Tg = −40° C.)<br>SR 9035 (Ethoxylated (15) Trimethylol propane triacrylate) (Tg = −30° C.)<br>SR610 (Poly (ethylene glycol) (600) diacrylate) (Tg = −40° C.)<br>*Other examples are shown in Table 6 below | 5-40 |
| Photoinitiator | BAPO type (Bis Acyl Phosphine Oxide)<br>Alpha Hydroxy ketone<br>MAPO (Monoacylphosphine oxides) | 0.5-5 |
| Surfactant | BYK Type (PDMS derivatives) | 0.01-1 |
| Dispersing agent | BYK Type (PDMS derivatives) | 0.01-1 |
| Inhibitor | MEHQ Genorad Type | 0.1-1 |

Table 6 below presents exemplary ethoxylated materials, and their properties, which are suitable for inclusion in the second formulation (Part B).

TABLE 6

| Material | | MW (gram/mol) | Number of Ethoxylated groups | Viscosity (Cp at 25° C.) |
|---|---|---|---|---|
| SR-9036 | Ethoxylated (30) bisphenol A dimethacrylate | 2156 | 30 | 610 |
| SR-415 | Ethoxylated (20) Trimethylolpropane Triacrylate | 1176 | 20 | 225 |
| SR430 | Ethoxylated 18 Tristyrylphenol acrylate (RSP(18EO)A) | 1249 | 18 | 825 |
| SR9035 | Ethoxylated 15 Trimethylolpropane Triacrylate | 956 | 15 | 177 |
| SR567P | Ethoxylated 25 C22 methacrylate | 1494 | 25 | 250 |
| SR480 | Ethoxylated 10 bisphenol A DMA | 808 | 10 | 410 |
| SR499 | Ethoxylated (6) Trimethylolpropane Triacrylate | 554 | 6 | 92 |
| SR610 | Poly(ethylene glycol) (600) diacrylate | 726 | 13 | 100 |

Elastic Moduli Ratio:

In some embodiments of the present invention, the first and the second modeling formulations are selected according to their characteristic elastic moduli. Computer simulations have been conducted in order to determine a preferred ratio between the elastic moduli of the two modeling formulations. The computer simulations were performed for various combinations in which the first modeling formulation is a formulation that is commercially available under the trade name RGD531, and having an elastic modulus of 3000 MPa. Seven types of formulations were tested as the second formulations. These are referred to as Soft-30, Soft-16, RGD515, M-1, M-2, M-3, and M-4.

The computer simulations included analysis of stress distribution resulting from a crack in the second modeling formulation. The results of the simulations are provided in Table 7 and FIGS. 1A-G. In FIGS. 1A-G, the lower layer corresponds to the first modeling formulation (RGD531, in the present Example), and the upper layer corresponds to the respective second modeling formulation (Soft-30, Soft-16, RGD515, M-1, M-2, M-3, and M-4, respectively)

TABLE 7

| Second Formulation | Young's modulus [MPa] | Max stress value and location |
|---|---|---|
| Soft-30 | 90 | 400 MPa in the first modeling formulation |
| Soft-16 | 550 | 283 MPa in the first modeling formulation |
| RGD515 | 1000 | 250 MPa in the first modeling formulation<br>250 MPa at the interface between the two formulations, under the crack |
| M-1 | 1330 | main stress of 250 MPa at the bottom of the crack and at the interface between the two formulations, under the crack<br>200 MPa in the first modeling formulation |
| M-2 | 1600 | main stress of 257 MPa at the bottom of the crack and at the interface between the two formulations under the crack 257 MPa in the first modeling formulation |
| M-3 | 1700 | main stress of 269 MPa at the bottom of the crack<br>220 MPa at the interface between the two formulations, under the crack |
| M-4 | 1800 | main stress of 285 MPa at the bottom of the<br>220 MPa at the interface between the two formulations, under the crack |

Table 7 demonstrates that there is a ratio between the elastic moduli for which the distribution of stress is optimal. In the present example, the optimal distribution of stress is achieved when the elastic modulus of the second modeling formulation is from about 1000 to about 1330, corresponding to a ratio between the elastic moduli of from 2.7 to 3.0.

Effect of RF Concentration in the Core:

Further the effect of the concentration of the first formulation (Part A, RF) in the core region on the HDT of the core and of the final object was tested.

In exemplary measurements, a Part A formulation referred to herein as RF71 was used in combination with a Part B formulation, referred to herein as DI-69.

Samples having a thickness of 6.35 mm were printed as follows:

DM-ABS: Full DM 5160 Structure
DM-ABS PC: same with thermal post curing
RND: Only the Core structure, Random DM
RND PC: Same with thermal post curing FIG. 2 presents the effect of various concentrations of RF71 in the core on the HDT of the various printed objects, 6.35 mm in thickness.

As can be seen in FIG. 2, increasing the amount of the Part A formulation in the core region increases the HDT of the core. However, in the ABS DM mode for obtaining a layered structure as described herein, when the core is surrounded by inner and outer envelope regions as described herein, the overall HDT is generally the same, irrespectively of the percentage of the first modeling formulation in the core, indicating that the HDT of the sample is not affected by the relative amount of Part A in the core.

Example 2

Controlling Viscoelastic Properties of the Object

Three types for the first modeling formulation, and several ratios between the amounts (weight, in the present example) of the first and second modeling formulations were experimented in the present Example, for the purpose of controlling the viscoelastic properties of the object. The experiments included fabrication of a rectangle of 3 mm overall thickness, overall length of 30 mm, with 17 mm between the two fixtures (span), and 13 mm width, by a three-dimensional inkjet printing system. The thickness of each layer was 32 μm. Each layer was printed by random interlacing of the respective first modeling formulation and a second modeling formulation to form a digital material. The respective first modeling formulation was selected to provide, when hardened, a cured material which is more rigid than the cured material provided by the second modeling formulation, when hardened, and wherein the respective first modeling formulation has a component with a higher Tg than any of the components of the second modeling formulation. By "component" it is meant either a non-curable polymeric material or a curable material that forms, when hardened, a polymeric material featuring the indicated Tg.

The three types of the first modeling formulation used in the experiments are denoted herein as RF 4w, RF 535 and RF 71. The total calculated Tg values for these three types of first modeling formulation (obtained by sum of the individual Tg values of the respective components, weighted by the respective weight percentage, of each modeling formulation) are 127° C., 107° C. and 146° C.

Formulation RF 4w included a mono-functional oligomeric curable methacrylic material, and a mono-functional oligomeric curable acrylic material, each featuring a relatively high Tg when hardened (such as, but not limited to, SR-834 and SR-833), and a di-functional oligomeric curable acrylic material featuring a low Tg, such as, but not limited to, SR-9036 (see Example 1), functioning, inter alia, as a cross-linking agent, with a ratio of about 2.4 between the total amount of the mono-functional curable materials and multi-functional curable material. Formulation RF71 included the same combination of mono-functional and di-functional curable materials featuring high Tg, with a ratio of about 5.5 between the total amount of the mono-functional curable materials and the multi-functional curable material. Formulation RF 535 was devoid of the methacrylic monofunctional curable material and of the di-functional curable material, and included the monofunctional acrylic curable material as in the other formulations in combination with another monofunctional methacrylic curable material featuring a lower Tg (e.g., IBOMA; CAS No. 7534-94-3). Thus RF 535 is less cross-linked compared to RF 4w and RF 71.

Dynamic mechanical analysis was performed for the fabricated layered cores. The dynamic mechanical analysis provided the trigonometric function tan($\delta$), where $\delta$ is the phase between the stress $\sigma$ and the strain $\varepsilon$. The function tan($\delta$) is a viscoelastic property that is correlated with the damping of the respective formulation, or, more specifically, the ability of the respective formulation to dissipate mechanical energy by converting the mechanical energy into heat. Measurements were performed using a digital mechanical analysis (DMA) system, model Q800, available from TA Instruments, Inc., of New Castle, Del. The DMA system was operated in a single cantilever mode, oscillation mode, temperature ramp, frequency of 1 Hz and heating rate of 3° C./min.

The results are shown in FIGS. 13A-E.

Figure 13A:
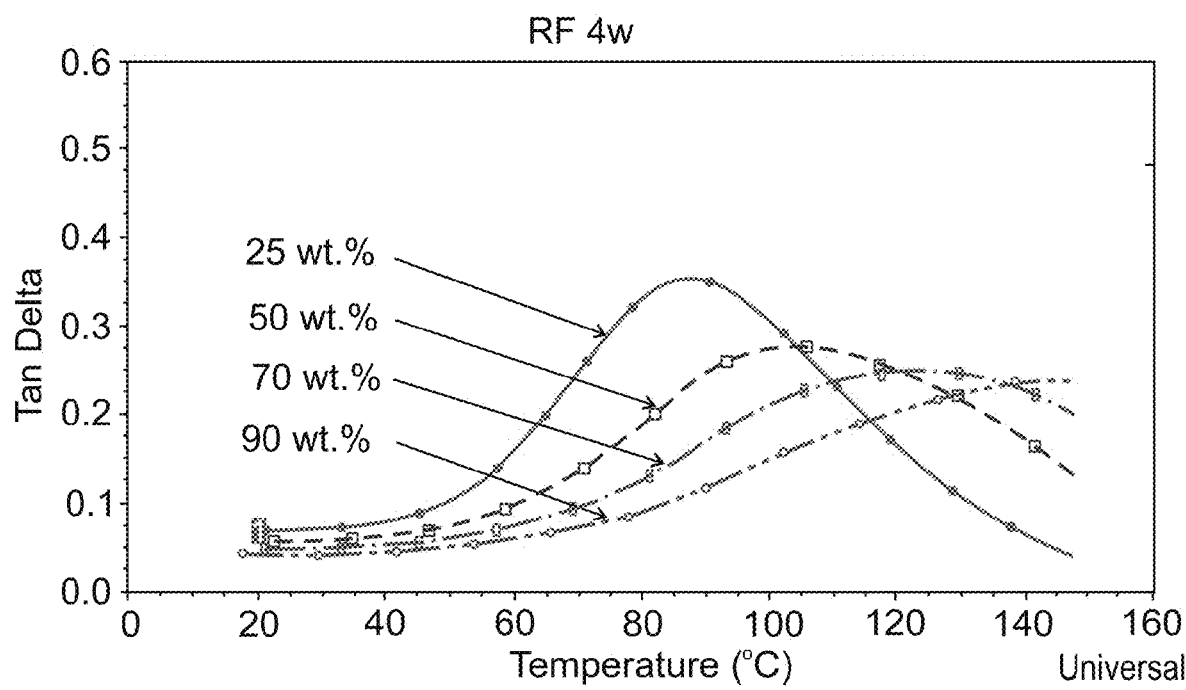
Figure 13B:
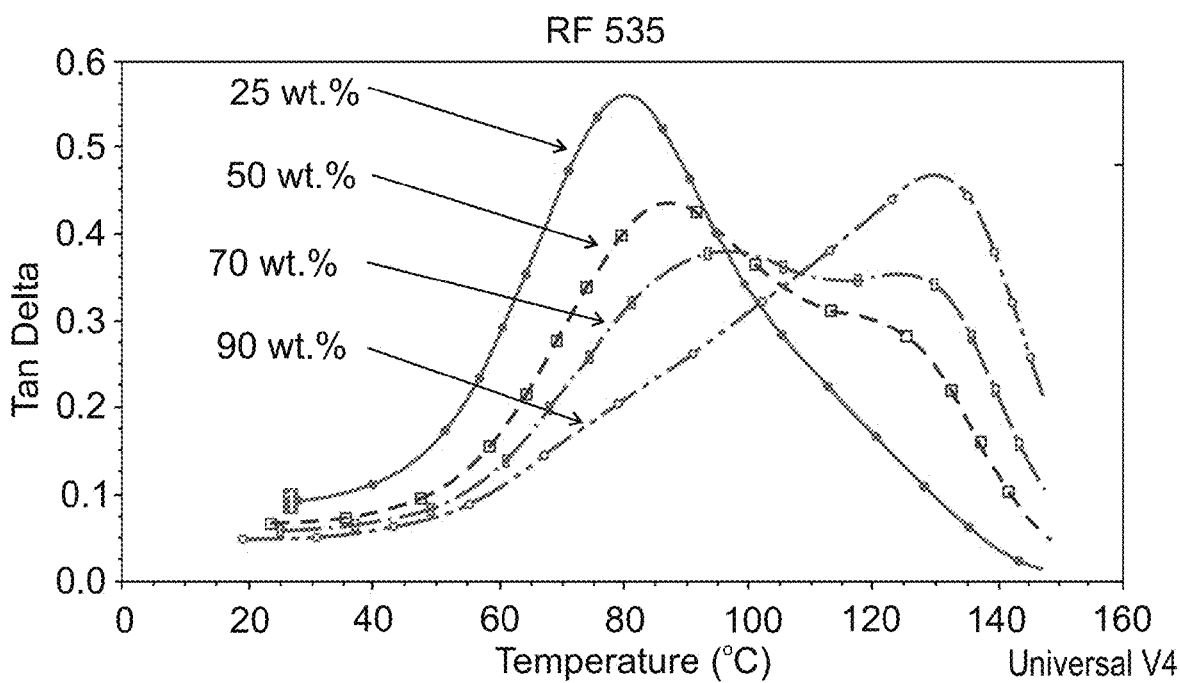
Figure 13C:
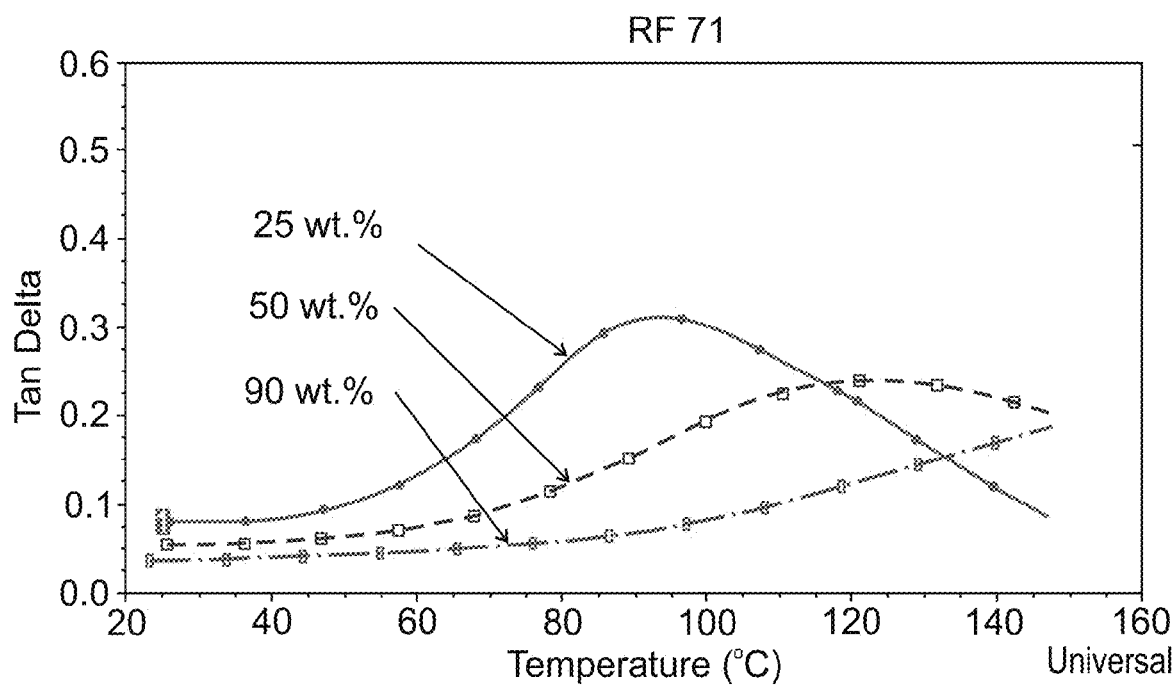

FIGS. 13A and 13B show tan($\delta$) as a function of the temperature, for 25, 50, 70 and 90 weight percentage of the first modeling formulation in the core. The first modeling formulation in FIG. 13A is RF 4w, and the first modeling formulation in FIG. 13B is RF 535. FIG. 13C is the same as FIGS. 13A and 13B, but for RF 71, and for 25, 50 and 90 weight percentage of the first modeling formulation in the layered core. As shown in FIGS. 13A, 13B and 13C, for all three types of the first modeling formulation, the location and width of the peak of tan($\delta$) as a function of the temperature vary smoothly and monotonically when the weight percentage of the first modeling formulation is increased.

Figure 13D:
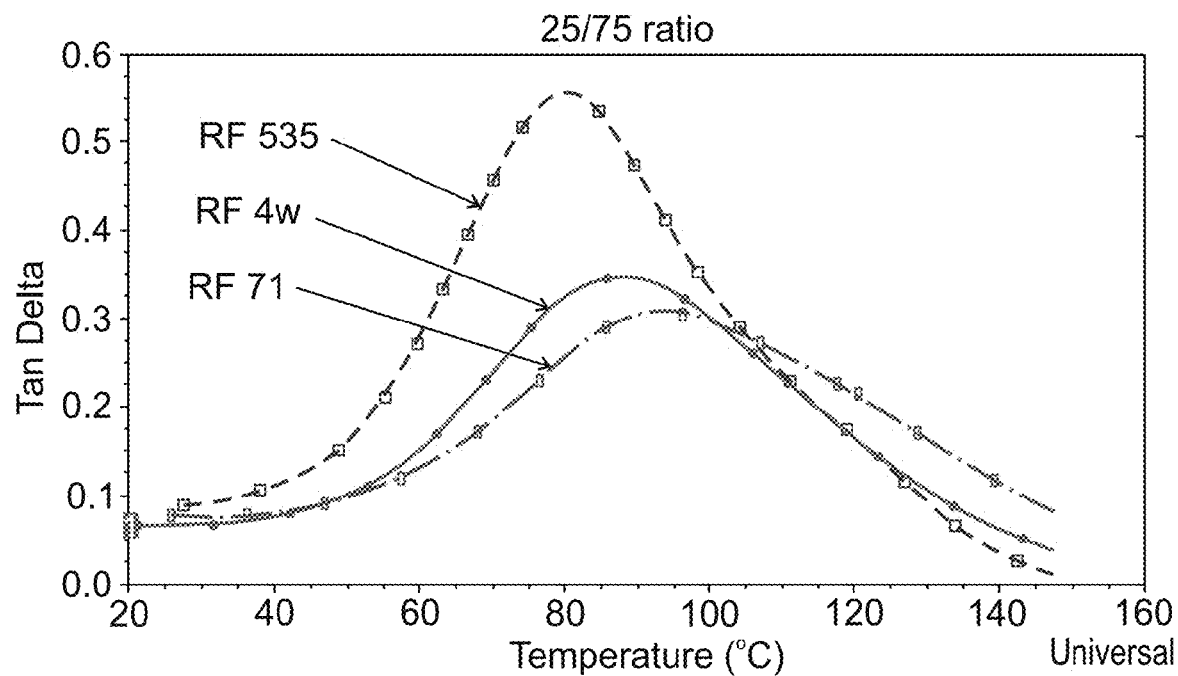
Figure 13E:
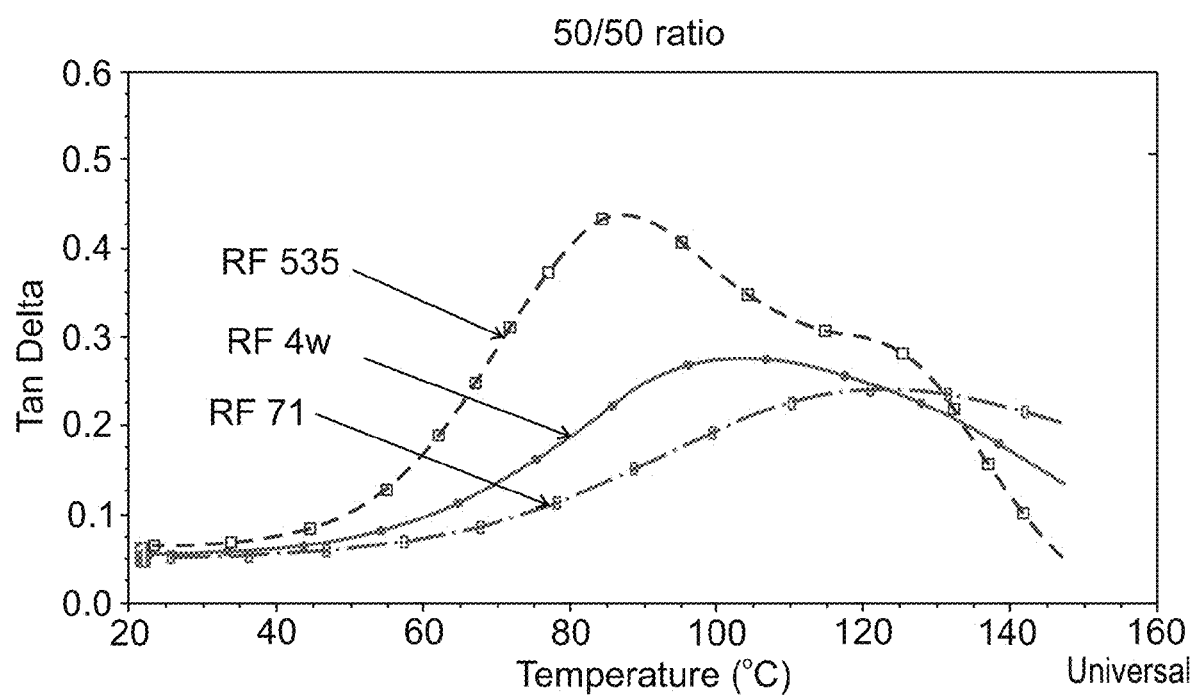

FIG. 13D shows tan($\delta$) as a function of the temperature for the three types of the first modeling formulation RF 4w, RF 535 and RF 71, at a 25/75 weight percentage ratio between the first and second modeling formulation. FIG. 13E is the same as FIG. 13D, but for a 50/50 weight percentage ratio. As shown in FIGS. 13D and 13E, formulation RF 535 exhibits a higher peak at lower temperature, both for the 25/75 ratio and for the 50/50.

This example demonstrates that one or more parameters characterizing the first formulation, and/or the relative amount of the first and second formulations can be selected to enhance or reduce the damping of the fabricated object. For example, selection of the first formulation and/or ratio that enhance the damping provides an object that is capable of dissipating energy, and that is less sensitive to internal stresses and crack propagation. The selected parameter characterizing the first formulation can be the extent of cross linking of the first formulation (e.g., the relative amount of a multi-functional curable material), the total calculated Tg of the first formulation as calculated by summing the individual Tg values of polymeric components and the like.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of layerwise fabrication of a three-dimensional object, the method comprising, for each of at least a few of the layers:

dispensing at least a first modeling formulation and a second modeling formulation to form a core region using both said first and said second modeling formulations, an inner envelope region at least partially surrounding said core region using said first modeling formulation but not said second modeling formulation, and an outer envelope region at least partially surrounding said inner envelope region using said second modeling formulations but not said first modeling formulation;

exposing said layer to curing energy, thereby fabricating the object, wherein each of said first modeling formulation and said second modeling formulation comprises at least one UV-curable material, and wherein said first modeling formulation and said second modeling formulation differ from one another, when hardened, by at least one of:

Heat Deflection Temperature (HDT), Izod Impact resistance, Tg and elastic modulus.

2. The method according to claim 1, wherein an HDT of said first modeling material formulation, when hardened, is higher than an HDT of said second modeling material formulation, when hardened.

3. The method according to claim 1, wherein an HDT of said second modeling material formulation, when hardened, is lower than 50° C. and an HDT of said first modeling material formulation, when hardened, is higher than 50° C.

4. The method according to claim 1, wherein an IzoD Impact Resistance of said second modeling material formulation, when hardened, is higher than an Izod Impact Resistance of said first modeling material formulation, when hardened.

5. The method according to claim 1, wherein a ratio between elastic moduli of said first modeling material formulation and said second modeling formulation, when hardened, ranges from 1 to 20, or from 1 to 10, or from 1 to 5, or from 2 to 5, or from 2 to 3, or from 2.5 to 3, or from 2.7 to 2.9.

6. The method according to claim 1, wherein said first modeling material formulation comprises at least one curable material that is characterized, when hardened, by Tg of at least 50° C.

7. The method according to claim 6, wherein said first modeling material formulation comprises at least two curable materials, at least one of said curable materials is characterized, when hardened, by Tg of at least 80° C.

8. The method according to claim 1, wherein said first modeling material formulation comprises at least two curable materials, at least one of said curable materials is characterized, when hardened, by Tg of at least 100° C., or at least 150° C.

9. The method according to claim 6, wherein said first modeling material formulation comprises:
at least one curable (meth)acrylic monomer;
at least one curable (meth)acrylic oligomer; and
optionally, at least one curable (meth)acrylic monomer characterized, when hardened, by Tg lower than 0° C.

10. The method according to claim 6, wherein said first modeling material formulation comprises:
at least one curable (meth)acrylic monomer characterized, when hardened, by Tg of at least 85° C.;
at least one curable (meth)acrylic monomer characterized, when hardened, by Tg of at least 150° C.;
at least one curable (meth)acrylic oligomer, characterized, when hardened, by Tg of at least 50° C.; and
optionally, at least one curable (meth)acrylic monomer characterized, when hardened, by Tg lower than 0° C.

11. The method according to claim 1, wherein said second modeling material formulation comprises at least two curable materials, at least one of said curable materials is a (meth)acrylic monomer characterized, when hardened, by Tg lower than −20° C.

12. The method according to claim 1, wherein a thickness of said inner envelope region, as measured within a plane of said layer and perpendicularly to a surface of the object, is preferably from about 0.1 mm to about 4 mm.

13. The method according to claim 1, wherein a thickness of said outer envelope region, as measured within a plane of said layer and perpendicularly to a surface of the object, is from about from about 150 microns to about 600 microns.

14. The method according to claim 1, wherein said dispensing is executed to form at least one additional envelope region between said inner envelope region and said outer envelope region.

15. The method according to claim 14, wherein said dispensing of said additional envelope region is using both said first and said second modeling formulations.

16. The method according to claim 14, wherein a thickness of said additional envelope, as measured within a plane of said layer and perpendicularly to a surface of the object, is less than a thickness of said inner envelope region and also less than a thickness of said outer envelope region.

17. The method according to claim 14, wherein a thickness of said additional envelope, as measured within a plane of said layer and perpendicularly to a surface of the object, is from about 70 microns to about 100 microns.

18. The method according to claim 15, wherein a ratio between a number of voxels within said additional envelope region that are occupied by said first modeling formulation and a number of voxels within said additional envelope region that are occupied by said second modeling formulation is about 1.

19. The method according to claim 1, further comprising dispensing a plurality of base layers to form a base section of the object, said plurality of base layers comprising at least one outer base layer made of said second modeling formulation but not said first modeling formulation, and at least one inner base layer made of said first modeling formulation but not said second modeling formulation.

20. The method according to claim 1, further comprising dispensing a plurality of top layers to form a top section of the object, said plurality of top layers comprising at least one outer top layer made of said second modeling formulation but not said first modeling formulation, and at least one inner top layer made of said first modeling formulation but not said second modeling formulation.

21. The method according to claim 1, wherein at least one parameter characterizing said first formulation is selected to provide a predetermined damping for said core.

22. The method according to claim 21, wherein said at least one parameter comprises an extent of cross linking of the first modeling formulation.

23. The method according to claim 22, wherein said at least one parameter comprises a total calculated Tg of said first formulation, as calculated by summing individual Tg values of polymeric materials included in said first modeling formulation, when hardened.

24. The method according to claim 1, wherein relative amounts of said first and said second formulations is selected to provide a predetermined damping for said core.

\* \* \* \* \*